(12) United States Patent
Demjanenko et al.

(10) Patent No.: US 12,744,798 B2
(45) Date of Patent: Sep. 22, 2026

(54) SYSTEMS AND METHODS FOR AUTOMATED DETECTION OF CYBERSECURITY THREATS ACROSS DIGITAL PLATFORMS

(71) Applicant: Permiso Security Inc., McClean, VA (US)

(72) Inventors: Stephen Demjanenko, San Francisco, CA (US); Wei Quan, San Jose, CA (US); Jason Martin, Reno, NV (US); Thomas Kurty, San Jose, CA (US); Andrew Shu, Sacramento, CA (US); Nihar Patel, Ahmedabad (IN); Charan Sunkara, Bangalore (IN); Xavier Chemla, Grenoble (FR); Nathan Eades, Raleigh, NC (US); Ian Ahl, Partlow, VA (US); Phani Modali, Campbell, CA (US)

(73) Assignee: Permiso Security Inc., McClean, VA (US)

( * ) Notice: Subject to any disclaimer, the term of this patent is extended or adjusted under 35 U.S.C. 154(b) by 0 days.

(21) Appl. No.: 19/547,437

(22) Filed: Feb. 23, 2026

(65) Prior Publication Data

US 2026/0189579 A1 Jul. 2, 2026

Related U.S. Application Data

(63) Continuation-in-part of application No. 19/394,310, filed on Nov. 19, 2025.

(60) Provisional application No. 63/762,366, filed on Feb. 24, 2025, provisional application No. 63/722,623, filed on Nov. 20, 2024.

(51) Int. Cl.
*H04L 29/06* (2006.01)
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC ............. H04L 63/1441; H04L 63/1408; H04L 63/1433; H04L 63/1425; H04L 43/062; H04L 41/22; H04L 41/16; H04L 63/1416; H04L 2463/146
See application file for complete search history.

(56) References Cited

U.S. PATENT DOCUMENTS

| | | | | |
|---|---|---|---|---|
| 2017/0063908 | A1* | 3/2017 | Muddu | G06N 20/20 |
| 2024/0045990 | A1* | 2/2024 | Boyer | G06F 21/6245 |
| 2025/0088517 | A1* | 3/2025 | Davraev | H04L 63/14 |

* cited by examiner

*Primary Examiner* — Yogesh Paliwal
(74) *Attorney, Agent, or Firm* — Padowithz Alce; Chandler Scheitlin; Alce PLLC

(57) ABSTRACT

A system, method, and computer-program product includes obtaining digital event data associated with a subscribing entity, generating, based on assessing the digital event data, a session object that includes a plurality of digital events performed by a digital account within a computing environment of the subscribing entity, generating, in real-time or near real-time, a plurality of suspicious event signal objects in response to assessing the plurality of digital events included in the session object against a corpus of suspicious event detection instructions, and generating, in real-time or near real-time, one or more security alerts for the session object based on assessing the plurality of suspicious event signal objects against predetermined alerting criteria.

21 Claims, 20 Drawing Sheets

200

Receiving a Corpus of Digital Event Data S210

Generating one or more Event Signals based on the Corpus of Digital Event Data S220

Constructing one or more Threat Alerts based on the one or more Event Signals S230

Constructing one or more Multi-Plane Alerts based on the one or more Threat Alerts S235

Transmitting one or more Threat Notifications based on the one or more Threat Alerts S240

Figure 2:
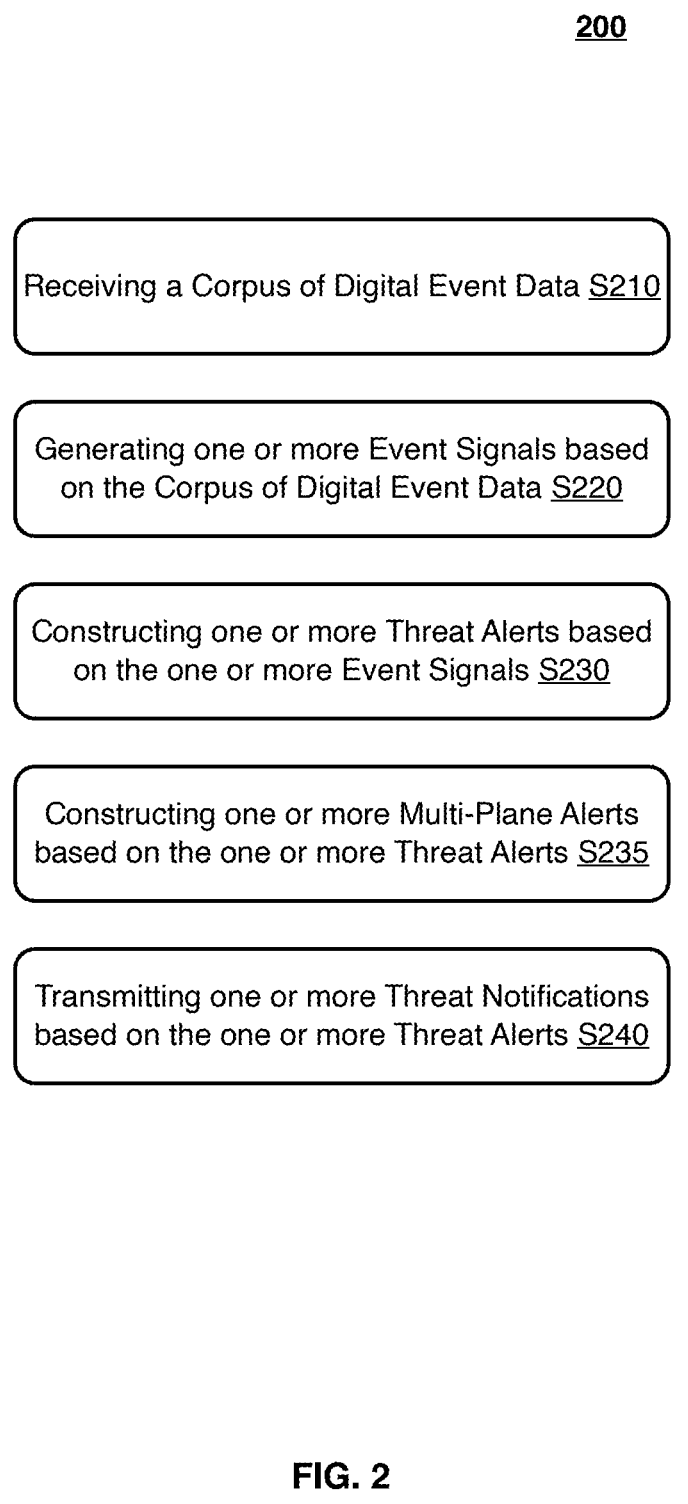

200

Receiving a Corpus of Digital Event Data S210

Generating one or more Event Signals based on the Corpus of Digital Event Data S220

Constructing one or more Threat Alerts based on the one or more Event Signals S230

Constructing one or more Multi-Plane Alerts based on the one or more Threat Alerts S235

Transmitting one or more Threat Notifications based on the one or more Threat Alerts S240

SYSTEMS AND METHODS FOR AUTOMATED DETECTION OF CYBERSECURITY THREATS ACROSS DIGITAL PLATFORMS

CROSS-REFERENCE TO RELATED APPLICATIONS

This application claims the benefit of U.S. Provisional Application No. 63/762,366, filed 24 Feb. 2025, and is a continuation-in-part of U.S. patent application Ser. No. 19/394,310, filed 19 Nov. 2025, which claims the benefit of U.S. Provisional Application No. 63/722,623, filed 20 Nov. 2024, which are incorporated in their entireties by this reference.

TECHNICAL FIELD

The embodiments of the present application herein relate generally to the digital event threat detection fields, and more specifically to a new and useful system and method for automated detection of threats across digital platforms in the digital event threat detection field.

BACKGROUND

Modern digital environments are becoming increasingly complex, involving interactions across a variety of cloud service providers, platforms, and systems. As organizations continue to adopt cloud-based services, they generate large volumes of data and metadata related to user activities, resource access, and operational changes. This expansion of digital infrastructure and user access presents significant challenges for organizations in tracking, analyzing, and attributing digital actions to specific actors, including entities or users. As the number of platforms and accounts an organization manages grows, so does the complexity in managing and securing digital events.

Additionally, many organizations seek to monitor and analyze user activity across cloud platforms to better understand patterns of behavior, identify potential security risks, and ensure compliance with organizational policies. However, the vast and often fragmented nature of digital event data, scattered across multiple sources such as cloud service providers, identity and access management systems, and security platforms, presents technical challenges. Each platform generates its own format of event logs and activity data, which complicates the task of tracking users within and across platforms.

Therefore, there is a need in the digital event monitoring field to create improved systems and methods for automatically detecting cybersecurity threats across diverse platforms.

The embodiments of the present application described herein provide technical solutions that address, at least, the need described above.

BRIEF SUMMARY OF THE EMBODIMENTS

In one embodiment, a computer-implemented method includes at an identity-based threat detection and response service implemented by a network of distributed computers: obtaining, by the network of distributed computers, digital event data associated with a subscribing entity; generating, based on assessing the digital event data, a session object that includes a plurality of digital events performed by a digital account within a computing environment of the subscribing entity; generating, in real-time or near real-time, a plurality of suspicious event signal objects in response to assessing the plurality of digital events included in the session object against a corpus of suspicious event detection instructions, wherein: a total number of the plurality of suspicious event signal objects generated by the identity-based threat detection and response service is less than a total number of the plurality of digital events included in the session object; generating, in real-time or near real-time, one or more security alerts for the session object based on assessing the plurality of suspicious event signal objects against predetermined alerting criteria; after generating the one or more security alerts for the session object: displaying a target security alert of the one or more security alerts on a graphical user interface accessible to the subscribing entity; receiving an input from the subscribing entity selecting an alert explanation button displayed on the graphical user interface; and in response to receiving the input from the subscribing entity selecting the alert explanation button: instantiating an alert explanation popover on the graphical user interface; automatically creating an alert explanation prompt that includes the plurality of suspicious event signal objects and the target security alert; generating, using a large language model, an alert explanation for the target security alert based on providing the alert explanation prompt as input to the large language model; and displaying, by the alert explanation popover, the alert explanation generated for the target security.

In one embodiment, the computer-implemented method further includes while the large language model is generating the alert explanation for the target security alert: streaming the alert explanation to the identity-based threat detection and response service; and updating, in real-time, the alert explanation displayed in the alert explanation popover as new portions of the alert explanation are received.

In one embodiment, the alert explanation popover includes a first distinct region and a second distinct region, the first distinct region of the alert explanation popover includes: an identifier of the computing environment where the plurality of digital events included in the session object occurred, a count of the plurality of suspicious event signal objects generated for the session object, an identifier of the digital account that performed the plurality of digital events included in the session object, and an identifier of a computing resource within the computing environment that is specified by the target security alert, and the second distinct region of the alert explanation popover includes the alert explanation generated for the target security alert, wherein the alert explanation generated for the target security alert includes: a first set of text strings that explains, in natural language, how a threat actor accessed the computing environment of the subscribing entity, a second set of text strings that explains, in natural language, what the threat actor did after accessing the computing environment of the subscribing entity, and a third set of text strings that explains, in natural language, how the plurality of suspicious event signal objects contributed to the generation of the target security alert.

In one embodiment, the graphical user interface displaying the target security alert includes: a first region that displays: a time and a date that the identity-based threat detection and response service generated the target security alert, an alert title specified within the target security alert, an alert severity score determined for the target security alert, an identifier of the computing environment where the plurality of digital events included in the session object occurred, a natural language description explaining the target security alert, and one or more recommended threat mitigation actions to mitigate a security threat associated with the target security alert, a second region that displays: an identifier of the digital account that performed the plurality of digital events included in the session object, an indication of whether the digital account is active or inactive within the computing environment of the subscribing entity, a blast radius that specifies a privilege level associated with the digital account, and access data associated with the plurality of digital events, and a third region that displays: an indication of one or more suspicious event signal objects of the plurality of suspicious event signal objects that contributed to the generation of the target security alert, and one or more computing resources of the computing environment referenced in the target security alert.

In one embodiment, the predetermined alerting criteria includes a plurality of distinct alert rules, each of the plurality of distinct alert rules includes: a condition for generating a respective security alert, and an alert explainability template explaining the respective security alert, at least a subset of the plurality of suspicious event signal objects satisfies the condition of a respective alert rule of the plurality of distinct alert rules, and the natural language description explaining the target security alert is automatically generated by the identity-based threat detection and response service by inserting at least one target piece of data included in the subset of the plurality of suspicious event signal objects into the alert explainability template of the respective alert rule.

In one embodiment, each suspicious event signal object of the plurality of suspicious event signal objects is generated based on a respective digital event of the plurality of digital events included in the session object satisfying at least one suspicious event detection instruction of the corpus of suspicious event detection instructions, and the computer-implemented method further includes: determining, by the identity-based threat detection and response service, a signal impact score and a signal suspicion score for a respective suspicious event signal object of the plurality of suspicious event signal objects, wherein: the signal impact score determined for the respective suspicious event signal object specifies a first distinct numerical value representing a degree to which the respective digital event corresponding to the respective suspicious event signal object changes an operating state of the computing environment of the subscribing entity, and the signal suspicion score determined for the respective suspicious event signal object specifies a second distinct numerical value representing a degree to which the respective digital event corresponding to the respective suspicious event signal object is suspicious; attributing, in real-time or near real-time, the signal impact score and the signal suspicion score determined for the respective suspicious event signal object to the respective suspicious event signal object; and displaying, on a session details graphical user interface, the signal impact score and the signal suspicion score determined for the respective suspicious event signal object in association with the session object.

In one embodiment, the computer-implemented method further includes: determining, by the identity-based threat detection and response service, at least one of a signal impact score and a signal suspicion score for each suspicious event signal object of the plurality of suspicious event signal objects; determining, by the identity-based threat detection and response service, a session impact score for the session object based on identifying a maximum signal impact score from a plurality of signal impact scores collectively corresponding to the plurality of suspicious event signal objects, wherein the session impact score determined for the session object specifies a first distinct numerical value representing a degree to which the plurality of digital events included in the session object changes an operating state of the computing environment of the subscribing entity; determining, by the identity-based threat detection and response service, a session suspicion score for the session object based on identifying a maximum signal suspicion score from a plurality of signal suspicion scores collectively corresponding to the plurality of suspicious event signal objects, wherein the session suspicion score determined for the session object specifies a second distinct numerical value representing a degree to which the plurality of digital events included in the session object are suspicious; and displaying, on a session details graphical user interface, the session impact score and the session suspicion score determined for the session object in association with the session object.

In one embodiment, the computer-implemented method further includes: generating a machine learning-informed suspicious event signal object for the session object based in part on the plurality of digital events included in the session object, wherein generating the machine learning-informed suspicious event signal object includes: providing the plurality of digital events included in the session object as input to one or more machine learning models; detecting, by the one or more machine learning models, that at least one access attribute associated with at least one digital event of the plurality of digital events has not been previously observed for the digital account within a predefined historical time period; and generating, in real-time or near real-time, the machine learning-informed suspicious event signal object that includes the at least one access attribute in response to detecting that the at least one access attribute has not been previously associated with the digital account within the predefined historical time period.

In one embodiment, in response to assessing the plurality of digital events included in the session object against the corpus of suspicious event detection instructions: generating a first suspicious event signal object of the plurality of suspicious event signal objects in response to detecting that a first distinct digital event of the plurality of digital events included in the session object satisfies a first suspicious event detection instruction included in the corpus of suspicious event detection instructions, generating a second suspicious event signal object of the plurality of suspicious event signal objects in response to detecting that a second distinct digital event of the plurality of digital events included in the session object satisfies a second suspicious event detection instruction included in the corpus of suspicious event detection instructions, generating a third suspicious event signal object of the plurality of suspicious event signal objects in response to detecting that the second distinct digital event of the plurality of digital events included in the session object satisfies a third suspicious event detection instruction included in the corpus of suspicious event detection instructions, and foregoing generating any suspicious event signal objects for a third distinct digital event included in the session object in response to detecting that the third distinct digital event fails to satisfy any suspicious event detection instruction included in the corpus of suspicious event detection instructions.

In one embodiment, the computer-implemented method further includes: displaying, on a threat hunting graphical user interface, a session object data table and an interactive heat map, wherein: the session object data table includes a plurality of session objects generated for the subscribing entity during a target time span, the interactive heat map includes: a first axis corresponding to discrete session impact score values, a second axis corresponding to discrete session suspicion score values, and a plurality of selectable cells arranged in a two-dimensional grid, wherein each cell of the plurality of selectable cells corresponds to a unique combination of (i) a respective session impact score value of the discrete session impact score values and (ii) a respective session suspicion score value of the discrete session suspicion score values; receiving a continuous input sequence from the subscribing entity, wherein the subscribing entity: selects, using a mouse cursor, a first selectable cell of the plurality of selectable cells included in the interactive heat map; moves the mouse cursor across the two-dimensional grid while the first selectable cell is selected; and releases the mouse cursor at a second selectable cell of the plurality of selectable cells included in the interactive heat map; displaying, in response to receiving the continuous input sequence, a rectangular boundary on the interactive heat map extending between the first selectable cell and the second selectable cell, wherein the first selectable cell and the second selectable cell define opposing corners of the rectangular boundary; and in response to receiving the continuous input sequence, updating, in real-time or near real-time, the session object data table to display a reduced subset of the plurality of session objects, wherein each session object included in the reduced subset has a session impact score and a session suspicion score corresponding to a respective selectable cell located within the rectangular boundary.

In one embodiment, generating the one or more security alerts for the session object includes generating a plurality of distinct security alerts for the session object, and the computer-implemented method further includes: in response to generating the plurality of distinct security alerts, electronically transmitting, in real-time or near real-time, the plurality of distinct security alerts to the subscribing entity using a bi-directional messaging service.

In one embodiment, generating the one or more security alerts for the session object includes generating a plurality of distinct security alerts for the session object, and the computer-implemented method further includes: in response to generating the plurality of distinct security alerts, electronically transmitting, in real-time or near real-time, the plurality of distinct security alerts to a target application programming interface endpoint specified by the subscribing entity.

In one embodiment, the computer-implemented method further includes: in response to generating the session object: providing the session object to an actor-type machine learning classification model; computing, using the actor-type machine learning classification model, an actor-type classification inference comprising a probability of a machine actor using the digital account to perform the plurality of digital events included in the session object; and assessing, in real-time or near real-time, a security threat of the session object using one of: a first set of suspicious event detection instructions of the corpus of suspicious event detections instructions operably configured to assess the plurality of digital events included in the session object as machine activity when the probability satisfies a predetermined threshold, and a second set of suspicious event detection instructions of the corpus of suspicious event detections instructions operably configured to assess the plurality of digital events included in the session object as human activity when the probability fails to satisfy the predetermined threshold.

In one embodiment, the computer-implemented method further includes: generating a plurality of additional session objects in response to obtaining additional digital event data associated with the subscribing entity; generating, for each additional session object of the plurality of additional session objects, a plurality of distinct security alerts; providing, as input to a multi-plane alert generation module, (i) the plurality of distinct security alerts generated for each of the plurality of additional session objects and (ii) the one or more security alerts generated for the session object; and in response to the multi-plane alert generation module assessing the plurality of distinct security alerts generated for each of the plurality of additional session objects and the one or more security alerts generated for the session object, generating, in real-time or near real-time, a multi-plane security alert that specifies a multi-stage attack performed across a plurality of distinct computing environments of the subscribing entity.

In one embodiment, the multi-plane alert generation module generates the multi-plane security alert in response to detecting that: the one or more security alerts generated for the session object and the plurality of distinct security alerts generated for each of the plurality of additional session objects are attributable to a single root actor, and the one or more security alerts generated for the session object and the plurality of distinct security alerts generated for each of the plurality of additional session objects occurred within a predetermined time span.

In one embodiment, the predetermined alerting criteria specifies a respective multi-plane alert instruction, the respective multi-plane alert instruction specifies generating a subject multi-plane security alert when the identity-based threat detection and response service generates, within a predetermined time span, a combination of security alerts associated with a subject subscribing entity that collectively correspond to a target combination of security alert types, and the respective multi-plane alert instruction automatically generates the multi-plane security alert in response to detecting that at least a subset of (a) the plurality of distinct security alerts generated for each of the plurality of additional session objects and (b) the one or more security alerts generated for the session object collectively correspond to the target combination of security alert types.

In one embodiment, the multi-stage attack performed across the plurality of distinct computing environments of the subscribing entity is attributable to a single root actor, the computer-implemented method further includes generating a multi-plane alert explainability artifact that corresponds to the multi-plane security alert, wherein the multi-plane alert explainability artifact includes: a graphical identity node corresponding to the single root actor, a plurality of graphical security alert nodes corresponding to the plurality of distinct security alerts generated for each of the plurality of additional session objects and the one or more security alerts generated for the session object, and a plurality of graphical alert connection links that directly or indirectly couple the plurality of graphical security alert nodes to the graphical identity node to form a connected alert sequence representing the multi-stage attack performed across the plurality of distinct computing environments of the subscribing entity.

In one embodiment, the single root actor is associated with a first distinct digital account, at least one graphical security alert node of the plurality of graphical security alert nodes corresponds to a respective security alert indicating that the first distinct digital account created a second distinct digital account, and a subset of the plurality of graphical alert connection links defines a plurality of diverging alert paths originating from the at least one graphical security alert node, wherein: a first distinct alert path of the plurality of diverging alert paths includes a first subset of the plurality of graphical security alert nodes representing security alerts generated based in part on digital activity performed by the second distinct digital account, and a second distinct alert path of the plurality of diverging alert paths includes a second subset of the plurality of graphical security alert nodes representing security alerts generated based in part on digital activity performed by the first distinct digital account after creation of the second distinct digital account.

In one embodiment, the computer-implemented method further includes: displaying, via a multi-plane alert graphical user interface, the multi-plane alert explainability artifact in association with the multi-plane security alert, wherein the multi-plane alert graphical user interface further includes a multi-plane alert summary region comprising: a total number of computing environments of the plurality of distinct computing environments involved in the multi-plane security alert, a total number of distinct digital identities involved in the multi-plane security alert, a total number of computing resources within the plurality of distinct computing environments that are involved in the multi-plane security alert, a total number of access credentials involved in the multi-plane security alert, and a total number of non-human identities involved in the multi-plane security alert.

In one embodiment, the computer-implemented method further includes: generating a plurality of additional session objects in response to obtaining additional digital event data associated with the subscribing entity; generating, for each additional session object of the plurality of additional session objects, a plurality of distinct security alerts; providing, as input to a multi-plane alert generation module, the plurality of distinct security alerts generated for each of the plurality of additional session objects and the one or more security alerts generated for the session object; in response to the multi-plane alert generation module assessing the plurality of distinct security alerts generated for each of the plurality of additional session objects and the one or more security alerts generated for the session object, generating, in real-time or near real-time, a multi-plane security alert that aggregates at least a subset of the plurality of distinct security alerts generated for each of the plurality of additional session objects and the one or more security alerts generated for the session object into a single security alert representing a cross-environment attack that occurred or is occurring across a plurality of distinct computing environments of the subscribing entity; and transmitting, over a computer network, the multi-plane security alert in real-time or near real-time to the subscribing entity.

In one embodiment, the predetermined alerting criteria specifies a respective alert rule, the respective alert rule specifies generating a subject security alert when the identity-based threat detection and response service generates a subject suspicious event signal object corresponding to a target type, and the respective alert rule generates one of the one or more security alerts in response detecting that one of the plurality of suspicious event signal objects corresponds to the target type.

In one embodiment, the predetermined alerting criteria specifies a respective alert rule, the respective alert rule specifies generating a subject security alert when the identity-based threat detection and response service generates a first subject suspicious event signal object of a first target type and a second subject suspicious event signal object of a second target type, and the respective alert rule generates one of the one or more security alerts in response detecting that a first suspicious event signal object of the plurality of suspicious event signal objects corresponds to the first target type and a second suspicious event signal object of the plurality of suspicious event signal objects corresponds to the second target type.

In one embodiment, the predetermined alerting criteria specifies a respective alert rule, the respective alert rule specifies generating a subject security alert when the identity-based threat detection and response service generates a first subject suspicious event signal object of a first target type and does not generate a second subject suspicious event signal object of a second target type, and the respective alert rule generates one of the one or more security alerts in response to detecting that a first suspicious event signal object of the plurality of suspicious event signal objects corresponds to the first target type and that no suspicious event signal objects of the plurality of suspicious event signal objects corresponds to the second target type.

In one embodiment, the predetermined alerting criteria specifies a respective alert rule, the respective alert rule specifies generating a subject security alert when the identity-based threat detection and response service generates a first subject suspicious event signal object of a first target type or a second subject suspicious event signal object of a second target type, and the respective alert rule generates one of the one or more security alerts in response detecting that a first suspicious event signal object of the plurality of suspicious event signal objects corresponds to the first target type or the second target type.

In one embodiment, a computer-implemented method includes at an identity-based threat detection and response service implemented by a network of distributed computers obtaining, by the network of distributed computers, digital event data that occurred on a plurality of disparate computing environments of a subscribing entity; in response to obtaining the digital event data, converting the digital event data into normalized digital event data that conforms to a target data schema specified by the identity-based threat detection and response service; constructing, for the subscribing entity in real-time or near real-time, a plurality of individual session objects detected across the plurality of disparate computing environments in response to the network of distributed computers executing one or more session construction instructions against the normalized digital event data, wherein: each individual session object of the plurality of individual session objects includes a distinct set of digital events (e.g., 2 distinct digital events, 20 distinct digital events, 100 distinct digital events, 500 distinct digital events, 1,000,000 distinct digital events, etc.) performed in a respective computing environment of the plurality of disparate computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, the digital event data obtained by the network of distributed computers is not received in temporal order, the computer-implemented method further includes resequencing the normalized digital event data into a normalized digital event data sequence that is in temporal order prior to constructing the plurality of individual session objects, and the normalized digital event data sequence includes the distinct set of digital events performed across the plurality of disparate computing environments in chronological order from earliest digital event occurrence to latest digital event occurrence.

In one embodiment, a first distinct set of logs obtained from a first distinct event monitoring service and a second distinct set of logs obtained from a second distinct event monitoring service includes a same piece of digital event data, the computer-implemented method further includes detecting the same piece of digital event data included in the first distinct set of logs and the second distinct set of logs, and converting the digital event data into normalized digital event data includes including a single instance of the same piece of digital event data in the normalized digital event data.

In one embodiment, the root actor is a benign human actor or a malicious human actor.

In one embodiment, the root actor is a benign machine actor or a malicious machine actor.

In one embodiment, the computer-implemented method further includes initiating, based on the detected root actor and the directional access sequence, a preventative action configured to restrict or terminate access by the root actor across one or more of the plurality of disparate computing environments.

In one embodiment, the computer-implemented method further includes generating, using the cross-environment session artifact and the detected root actor, a graphical access representation that displays additional computing environments accessible to the root actor.

In one embodiment, the computer-implemented method further includes generating a graphical access representation that displays additional or all computing environments accessible to the root actor.

In one embodiment, the computer-implemented method further includes generating a graphical representation that displays all computing environments accessible to the root actor and/or all (e.g., digital) identities associated with the root actor.

In one embodiment, the computer-implemented method further includes in response to constructing a respective individual session object of the plurality of individual session objects: providing the respective individual session object to an actor-type machine learning classification model; computing, using the actor-type machine learning classification model, an actor-type classification inference comprising a confidence score indicating a probability of a machine actor using the distinct digital account of the respective individual session object to perform the distinct set of digital events included in the respective individual session object; and assessing, in real-time or near real-time, a security threat of the respective individual session object using one of: a first set of threat detection instructions operably configured to assess the distinct set of digital events of the respective individual session object as machine activity when the confidence score satisfies a predetermined confidence score threshold, and a second set of threat detection instructions operably configured to assess the distinct set of digital events of the respective individual session object as human activity when the confidence score fails to satisfy the predetermined confidence score threshold.

In one embodiment, the computer-implemented method further includes in response to constructing a respective individual session object of the plurality of individual session objects: assessing the distinct set of digital events associated with the respective individual session object; detecting, based on the assessment, that the respective individual session object corresponds to one of: an application programming interface-type session when metadata included in the distinct set of digital events of the respective individual session object indicates that access to the respective computing environment of the respective individual session object was obtained using an application programming interface (API) key, and a console-type session when the distinct set of digital events of the respective individual session object is indicative of a human user using one or more graphical user interfaces of the respective computing environment of the respective individual session object to perform the distinct set of digital events associated with the respective individual session object; and attributing, using the network of distributed computers, one of: an API session label to the respective individual session object when the respective individual session object is detected to be the application programming interface-type session, and a console session label to the respective individual session object when the respective individual session object is detected to be the console-type session.

In one embodiment, executing the one or more session construction instructions causes the network of distributed computers to: partition the normalized digital event data into a plurality of distinct sets of normalized digital event data based in part on actor metadata and time metadata included in the normalized digital event data, and construct the plurality of individual session objects based on the plurality of distinct sets of normalized digital event data, wherein: each individual session object of the plurality of individual session objects corresponds to a single actor, and the single actor corresponding to a respective individual session object of the plurality of individual session objects performed the distinct set of digital events of the respective individual session object within an amount of time less than a maximum time duration permitted by the identity-based threat detection and response service.

In one embodiment, executing the one or more session construction instructions causes the network of distributed computers to: assess the normalized digital event data based in part on timestamp metadata and actor metadata included in the normalized digital event data; identify, based on the normalized digital event data, a sequence of digital events performed by a single actor that occurred on one of the plurality of disparate computing environments; construct a respective individual session object of the plurality of individual session objects based in part on the sequence of digital events performed by the single actor, wherein the respective individual session object includes: a session start time corresponding to a timestamp of a first digital event included in the sequence of digital events, a session end time corresponding to a timestamp of a last digital event included in the sequence of digital events, a session time duration determined from a difference between the session end time and the session start time, a digital account identifier indicating the distinct digital account used by the single actor to perform the sequence of digital events, a representation of the one of the plurality of disparate computing environments where the sequence of digital events occurred, the sequence of digital events performed by the single actor on the one of the plurality of disparate computing environments, and identity and access data associated with the single actor.

In one embodiment, the identity and access data included in the respective individual session object includes an internet protocol address from which the single actor accessed the one of the plurality of disparate computing environments, a geolocation derived from the internet protocol address, an autonomous system number identifying a network organization from which the internet protocol address originates, a user-agent identifying an interface or client application used by the single actor to perform the sequence of digital events, and an indication of whether the single actor used multi-factor authentication to access the one of the plurality of disparate computing environments.

In one embodiment, the computer-implemented method further includes generating, using the network of distributed computers, a session information graphical user interface based on a target individual session object of the plurality of individual session objects, wherein a single actor used the distinct digital account of the target individual session object to perform the distinct set of digital events included in the target individual session object; displaying, by the network of distributed computers, the session information graphical user interface to the subscribing entity, wherein: a first portion of the session information graphical user interface includes at least a session start time of the target individual session object, a session end time of the target individual session object, a session time duration of the target individual session object, and identity and access data associated with the single actor, and a second portion of the session information graphical user interface includes an interactive data table that includes a plurality of distinct interactive data rows, wherein each distinct interactive data row of the plurality of distinct interactive data rows: corresponds to a respective digital event of the distinct set of digital events included in the target individual session object, and includes a distinct column describing an event name of the respective digital event.

In one embodiment, the computer-implemented method further includes detecting an input from the subscribing entity hovering over the event name of a target interactive data row of the plurality of distinct interactive data rows; in response to detecting the input from the subscribing entity, displaying a digital event explainability user interface object in association with the target interactive data row, wherein the event explainability user interface object includes one or more text strings providing a natural-language explanation of the respective digital event corresponding to the target interactive data row.

In one embodiment, executing the one or more session construction instructions against the normalized digital event data causes the network of distributed computers to: detect a console login digital event that occurred within the normalized digital event data, wherein the console login digital event includes an account identifier indicating a subject computing environment where the console login digital event occurred; and commence the construction of a subject individual session object of the plurality of individual session objects in response to the detection of the console login digital event, wherein constructing the subject individual session object includes: appending the console login digital event to the subject individual session object; assigning a session start time to the subject individual session object that corresponds to a timestamp of the console login digital event; appending, to the subject individual session object, one or more subsequent digital events included in the normalized digital event data that follow the console login digital event and correspond to the account identifier of the console login digital event; and assigning a session end time to the subject individual session object that corresponds to a timestamp of a respective subsequent digital event of the one or more subsequent digital events determined to occur last in time among the one or more subsequent digital events.

In one embodiment, the computer-implemented method further includes obtaining, by the network of distributed computers, additional event data at a different time than the digital event data; in response to obtaining the additional event data, converting the additional event data into normalized event data that conforms to the target data schema specified by the identity-based threat detection and response service; detecting, by the identity-based threat detection and response service, that at least one event included in the normalized event data is associated with the console login digital event, wherein the at least one event occurred after the one or more subsequent digital events; appending, to the subject individual session object, the at least one event included in the normalized event data that is associated with the console login digital event; and updating the session end time from the timestamp of the respective subsequent digital event determined to occur last in time to a new time value that corresponds a timestamp of the at least one event.

In one embodiment, a single actor performed the console login digital event on the subject computing environment, the subject computing environment is provided by a cloud service provider, and the identity-based threat detection and response service detects the at least one event included in the normalized event data is associated with the console login digital event based on detecting at least one of: that a session identifier attributed to the at least one event by the cloud service provider is equivalent to a session identifier attributed to the console login digital event by the cloud service provider, the at least one event included in the normalized event data and the console login digital event originated from a same internet protocol address, and the at least one event included in the normalized event data and the console login digital event were performed using a same hardware device associated with the single actor.

In one embodiment, the computer-implemented method further includes obtaining, by the network of distributed computers, additional event data at a different time than the digital event data; in response to obtaining the additional event data, converting the additional event data into normalized event data that conforms to the target data schema specified by the identity-based threat detection and response service; detecting, by the identity-based threat detection and response service, that at least one new event included in the normalized event data is not associated with the console login digital event and the one or more subsequent digital events, and constructing a new individual session object different from the plurality of individual session objects in response to detecting that the at least new one event included in the normalized event data is not associated with the console login digital event and the one or more subsequent digital events, wherein constructing the new individual session object includes appending the at least one new event to the new individual session object.

In one embodiment, a single actor performed the console login digital event and the at least one new event on the subject computing environment; the identity-based threat detection and response service detects the at least one new event included in the normalized event data is not associated with the console login digital event and the one or more subsequent digital events based on detecting at least one of: an amount of time elapsed between the at least one new event and the one or more subsequent digital events is greater than a predetermined elapsed time threshold, and a change in access data associated with the single actor for the at least one new event relative to access data associated with the subject individual session object.

In one embodiment, a same actor performed the console login digital event and the at least one new event; the identity-based threat detection and response service detects the at least one new event included in the normalized event data is not associated with the console login digital event and the one or more subsequent digital events based on detecting at least one of: an amount of time elapsed between the at least one new event and the one or more subsequent digital events is greater than a predetermined elapsed time threshold, and a change in access data associated with the same actor between the at least one new event and the subject individual session object.

In one embodiment, a first user performed the console login digital event and the one or more subsequent digital events, a second user performed the least one new event, the first user is different from the second user, the identity-based threat detection and response service detects the at least one new event is not associated with the console login digital event and the one or more subsequent digital events based on detecting a difference between a digital account identifier corresponding to the at least one new event and the account identifier corresponding to the console login digital event and the one or more subsequent digital events.

In one embodiment, a computer-implemented system includes one or more processors; a memory; a computer-readable medium operably coupled to the one or more processors, the computer-readable medium having computer-readable instructions stored thereon that, when executed by the one or more processors, cause a computing device to perform operations including: obtaining digital event data that occurred on a plurality of disparate computing environments of a subscribing entity; in response to obtaining the digital event data, converting the digital event data into normalized digital event data that conforms to a target data schema specified by an identity-based threat detection and response service; constructing, for the subscribing entity in real-time or near real-time, a plurality of individual session objects detected across the plurality of disparate computing environments in response to executing one or more session construction instructions against the normalized digital event data, wherein: each individual session object of the plurality of individual session objects includes a distinct set of digital events performed in a respective computing environment of the plurality of disparate computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, generating the plurality of session correlation links includes generating a first session correlation link of the plurality of session correlation links that connects a first individual session object of the plurality of individual session objects to a second individual session object of the plurality of individual session objects based on detecting a chronological relationship between the first individual session object and the second individual session object, wherein the chronological relationship is detected based on identifying that an amount of time elapsed between a session end time of the first individual session object and a session start time of the second individual session object is less than a predetermined elapsed-time threshold, and generating a second session correlation link of the plurality of session correlation links that connects the second individual session object to a third individual session object of the plurality of individual session objects based on detecting a causal relationship between the second individual session object and the third individual session object, wherein the causal relationship is detected based on identifying that at least one digital event of the distinct set of digital events included in the second individual session object triggered or enabled the distinct set of digital events included in the third individual session object.

In one embodiment, the target set of individual session objects includes a first individual session object of the plurality of individual session objects, wherein the distinct set of digital events of the first individual session object are performed on a first disparate computing environment of the plurality of disparate computing environments, a second individual session object of the plurality of individual session objects, wherein the distinct set of digital events of the second individual session object are performed on a second disparate computing environment of the plurality of disparate computing environments, and a third individual session object of the plurality of individual session objects, wherein the distinct set of digital events of the third individual session object are performed on a third disparate computing environment of the plurality of disparate computing environments, and the computer-readable instructions, when executed by the one or more processors, cause the computing device to perform operations further comprising: displaying, via a user interface (UI), the cross-environment session artifact, wherein the cross-environment session artifact includes: a first session UI card representing the first individual session object, a second session UI card representing the second individual session object, a third session UI card representing the third individual session object, a first directional graphical connector extending in a direction from the first session UI card to the second session UI card, and a second directional graphical connector extending in a direction from the second session UI card to the third session UI card, wherein: the first directional graphical connector and the second directional graphical connector graphically illustrate the directional access sequence, and the directional access sequence indicates a directional flow of access by the root actor across the first disparate computing environment, the second disparate computing environment, and the third disparate computing environment.

In one embodiment, the computer-readable instructions, when executed by the one or more processors, cause the computing device to perform operations further including detecting the root actor accessed the distinct digital account of the first disparate computing environment using multi-factor authentication (MFA); and in response to detecting the use of MFA, displaying, within the first session UI card, an MFA UI badge that visually indicates that MFA was used by the root actor to access the first disparate computing environment.

In one embodiment, generating the plurality of session correlation links includes generating a first session correlation link of the plurality of session correlation links that connects a first individual session object of the plurality of individual session objects to a second individual session object of the plurality of individual session objects based on detecting the first individual session object and the second individual session object share at least a common internet protocol address, generating a second session correlation link of the plurality of session correlation links that connects a third individual session object of the plurality of individual session objects to a fourth individual session object of the plurality of individual session objects based on detecting the third individual session object and the fourth individual session object share at least a common hardware device identifier, and generating a third session link of the plurality of session correlation links that connects a fifth individual session object of the plurality of individual session objects to a sixth individual session object of the plurality of individual session objects based on Hypertext Transfer Protocol (HTTP) cookie data.

In one embodiment, the computer-readable instructions, when executed by the one or more processors, cause the computing device to perform operations further comprising detecting the root actor is a malicious actor based on assessing the cross-environment session artifact; receiving an input from the subscribing entity selecting one of the first session UI card, the second session UI card, and the third session UI card; and in response receiving the input from the subscribing entity, executing, in real-time or near real-time, one or more security threat mitigation tasks to mitigate a security threat associated with the root actor, wherein the one or more security threat mitigation tasks includes: automatically blocking, in real-time or near real-time, the root actor from accessing the plurality of disparate computing environments, and automatically disabling, in real-time or near real-time, one or more digital accounts associated with the root actor that were used to perform the distinct set of digital events over the target set of individual session objects.

In one embodiment, the computer-readable instructions, when executed by the one or more processors, cause the computing device to perform operations further comprising detecting the root actor is a malicious actor based on assessing the cross-environment session artifact; receiving an input from the subscribing entity selecting the first directional graphical connector or the second directional graphical connector; and in response receiving the input from the subscribing entity, automatically executing, in real-time or near real-time, one or more security threat mitigation tasks to mitigate a security threat associated with the root actor, wherein the one or more security threat mitigation tasks includes: automatically blocking, in real-time or near real-time, the root actor from accessing the plurality of disparate computing environments, and automatically disabling, in real-time or near real-time, one or more digital accounts associated with the root actor that were used to perform the distinct set of digital events over the target set of individual session objects.

In one embodiment, the computer-readable instructions, when executed by the one or more processors, cause the computing device to perform operations further comprising detecting, in real-time or near real-time, the distinct set of digital events performed across the target set of individual session objects is indicative of suspicious or malicious activity; automatically blocking, in real-time or near real-time, the root actor from accessing the plurality of disparate computing environments in response to detecting the distinct set of digital events performed across the target set of individual session objects is indicative of suspicious or malicious activity; and automatically revoking, in real-time or near real-time, authentication tokens or active session credentials associated with the root actor.

In one embodiment, a non-transitory computer-readable storage medium storing instructions that, when executed by one or more processors, cause the one or more processors to perform operations including: obtaining, via a network interface, digital event data that occurred on a plurality of disparate computing environments of a subscribing entity; converting, by an event normalization module executed by the one or more processors, the digital event data into normalized digital event data that conforms to a target data schema stored in memory and specified by an identity-based threat detection and response service; executing, by a session construction module, one or more session construction instructions against the normalized digital event data to generate a plurality of individual session objects, wherein: (a) each individual session object represents a distinct set of digital events performed in a respective computing environment of the plurality of disparate computing environments by a distinct digital account during a distinct time span; and (b) the plurality of individual session objects are stored in a session data repository maintained in the memory; executing, by a correlation engine, a plurality of correlation computations to generate a plurality of session correlation links that selectively connect a target set of individual session objects of the plurality of individual session objects based on shared identifiers, temporal proximity, or causal relationships; executing, by a visualization engine, generation of a cross-environment session artifact comprising graphical node representations of the target set of individual session objects and directional edge representations of the plurality of session correlation links; and displaying, via a display interface coupled to the one or more processors, the cross-environment session artifact on a graphical user interface, the cross-environment session artifact visually illustrating a directional access sequence across the plurality of disparate computing environments and identifying a root actor responsible for the distinct set of digital events performed across the target set of individual session objects.

In one embodiment, a computer-implemented method includes at an identity-based threat detection and response service implemented by a network of distributed computers: obtaining, by the network of distributed computers, digital event data that occurred on a plurality of disparate cloud computing environments of a subscribing entity; in response to obtaining the digital event data, converting the digital event data into normalized digital event data that conforms to a target data schema specified by the identity-based threat detection and response service; constructing, for the subscribing entity in real-time or near real-time, a plurality of individual session objects detected across the plurality of disparate cloud computing environments in response to the network of distributed computers executing one or more session construction instructions against the normalized digital event data, wherein: each individual session object of the plurality of individual session objects includes a distinct set of digital events performed in a respective cloud computing environment of the plurality of disparate cloud computing environments by a distinct digital account during a distinct time span; in response to constructing the plurality of individual session objects, generating, in real-time or near real-time, a plurality of session correlation links that selectively connect a target set of individual session objects of the plurality of individual session objects; generating, using the target set of individual session objects and the plurality of session correlation links, a cross-environment session artifact that graphically illustrates a directional access sequence associated with the target set of individual session objects; and detecting, using the cross-environment session artifact, a root actor responsible for the distinct set of digital events performed across the target set of individual session objects.

In one embodiment, the computer-implemented system further includes in response to constructing a respective individual session object of the plurality of individual session objects: assessing the respective individual session object against a plurality of actor-type classification heuristics; determining, in response to assessing the respective individual session object against the plurality of actor-type classification heuristics, the distinct set of digital events included in the respective individual session object was performed by a human actor or a non-human actor; assessing, in real-time or near real-time, a security threat of the respective individual session object using one of: a first set of threat detection instructions operably configured to assess the distinct set of digital events of the respective individual session object as machine activity when the plurality of actor-type classification heuristics determines the distinct set of digital events included in the respective individual session object was performed by the non-human actor, and a second set of threat detection instructions operably configured to assess the distinct set of digital events of the respective individual session object as human activity when the plurality of actor-type classification heuristics determines the distinct set of digital events included in the respective individual session object was performed by the human actor.

In one embodiment, the target set of individual session objects includes a first distinct individual session object and a second distinct individual session object, a first distinct digital account performed the distinct set of digital events of the first distinct individual session object, a second distinct digital account performed the distinct set of digital events of the second distinct individual session object, and the computer-readable instructions, when executed by the one or more processors, further cause the computing device to perform operations comprising: generating a first session correlation link of the plurality of session correlation links that connects the first distinct individual session object of the target set of individual session objects to the second distinct individual session object of the target set of individual session objects in response to detecting the root actor used the first distinct digital account to perform the distinct set of digital events of the first distinct individual session object and transitioned to using the second distinct digital account to perform the distinct set of digital events of the second distinct individual session object.

BRIEF DESCRIPTION OF THE FIGURES

FIG. 2 illustrates an example method 200 in accordance with one or more embodiments of the present application;

FIG. 3 illustrates an example interface for surfacing events and event signals in accordance with one or more embodiments of the present application;

FIG. 5 illustrates exemplary event signals in accordance with one or more embodiments of the present application;

FIG. 7 illustrates exemplary threat alerts in accordance with one or more embodiments of the present application;

DESCRIPTION OF THE PREFERRED EMBODIMENTS

Figure 1A:
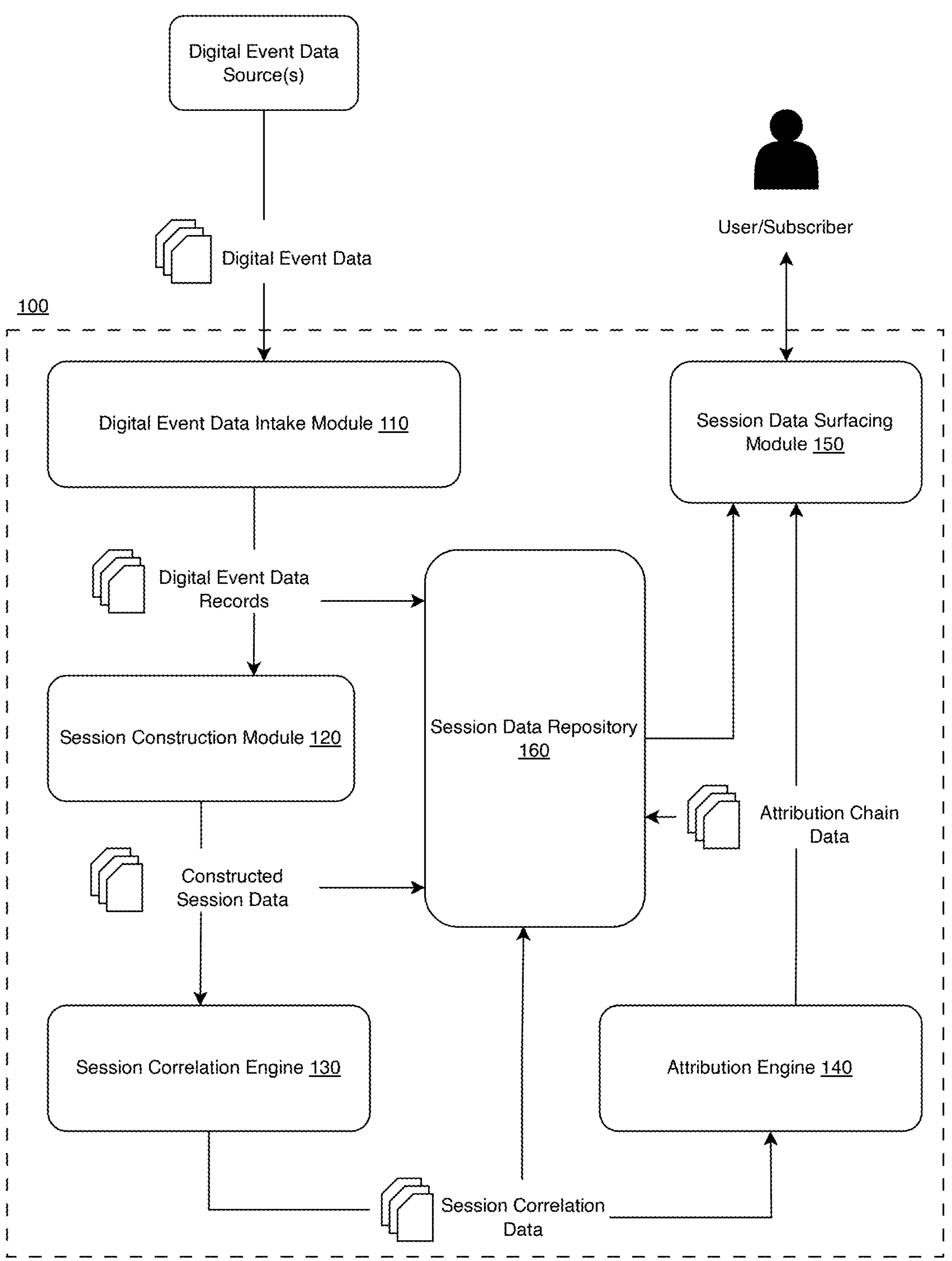
FIG. 1A illustrates a schematic representation of a system 100 in accordance with one or more embodiments of the present application.

The following description of the preferred embodiments of the present application are not intended to limit the present application to these preferred embodiments, but rather to enable any person skilled in the art to make and use these embodiments of the present application.

TECHNICAL BENEFITS

Embodiments of the present application achieve technical advancements and optimizations through the innovative use of session roll-ups, session constructs, and identity attribution chains, providing significant improvements in performance and security. Implementing session roll-ups allows the system to reduce data volume by consolidating individual digital events into groupings based on sessions. The reduction in data size, approximately 10-1000×, optimizes application performance by decreasing memory usage and compute processing demands, which is especially valuable in environments with extensive event logs. The resulting efficiency supports scalability and enhances system responsiveness.

The session construct adds a layer of context by aggregating multiple related activities (e.g., normalized digital events, etc.) within a specific timeframe, forming a comprehensive view of user actions. Unlike isolated event monitoring, the session construct captures sequences of interrelated actions, revealing access patterns and behavior over time. This type of data structure is essential for security monitoring, enabling the system to detect potential threats with greater accuracy by identifying anomalies or sequences indicative of malicious activities.

The identity attribution chain within the system further enhances clarity in tracking user activity by linking individual sessions to a consistent actor or identity across platforms. Correlation with an identity attribution chain allows for precise actor attribution and provides valuable context for compliance tracking, security audits, and forensic investigations. By assembling an identity attribution chain, the system can reveal what might otherwise appear as fragmented or unrelated sessions and/or digital events, offering a cohesive view crucial for identifying security events. The combination of session roll-ups, session constructs, and identity attribution chains enables comprehensive management, monitoring, and attribution of digital events across complex digital infrastructures, advancing operational efficiency, security posture, and data handling capabilities.

Another technical benefit of the systems and methods described herein enables real-time or near real-time detection of a root actor responsible for digital activity or digital events that occurred and/or is occurring across a plurality of disparate computing environments. Instead of viewing a digital event (e.g., digital activity or the like) in isolation, the systems and methods described herein assess streams of normalized digital event data to construct a plurality of distinct individual session objects (e.g., session objects or the like). Each individual session object, in some embodiments, may include a distinct set of digital events performed in a respective computing environment by a single actor and/or by one or more digital accounts used by the single actor. The systems and methods described herein may further digitally connect, in real-time or near real-time, at least a subset of the plurality of distinct individual session objects based on shared actor identities, temporal proximity, causal relationships, and/or other attribute-based similarities to generate a cross-environment session artifact that visually and/or programmatically represents correlated sessions across multiple disparate computing environments. The cross-environment session artifact provides a directional and contextual view of digital activity, enabling the system to trace and attribute distributed actions to a single root actor with minimal latency. In other words, the cross-environment session artifact may represent a unified and directional mapping of correlated sessions across multiple cloud service providers, providing a visual and/or programmatic representation of how digital events propagate through a subscribing entity's digital infrastructure. The cross-environment session artifacts may allow for immediate contextual understanding of complex multi-platform interactions, reduces latency in actor attribution, and enhances system responsiveness and threat detection accuracy relative to conventional event monitoring systems that evaluate discrete digital events asynchronously and/or without cross-environment correlation.

Another technical benefit of the systems and methods described herein is the ability to continuously receive and process large volumes of digital event data in real-time or near real-time, such as hundreds of thousands or even millions of log entries obtained from a plurality of disparate computing environments. As new digital event data is received, the systems and methods described herein may automatically normalize the incoming data and update existing session objects in real time or near real time or construct new session objects when appropriate. Such continuous updating allows the system and/or method to maintain an accurate and current representation of digital activity across all monitored computing environments without requiring batch-based processing or manual intervention. By dynamically updating the session objects and cross-environment session artifacts as new event data is received, the system and/or method may ensure that session correlations and actor attributions remain consistent and current, even as large-scale data changes occur. This capability enhances scalability, reduces processing delays, and improves the overall accuracy and responsiveness of root actor detection in high-volume, distributed computing environments.

In addition, embodiments of the present application provide a comprehensive, attribution-based approach to threat detection, enabling security teams and resources to correlate, analyze, and respond to cybersecurity incidents more effectively. By leveraging advanced event signal processing, automated threat alert generation, and multi-plane alerting, the system enhances visibility into security threats across multiple sessions, users, and environments. Linking related activities across sessions, identities, and cloud environments enables comprehensive cross-environment threat detection. The event signal framework enhances classification and prioritization by highlighting event features and assigning impact and suspicion scores, ensuring that security teams focus on high-risk incidents.

Multi-plane alerting aggregates security alerts across multiple sessions and identities, identifying larger attack campaigns that may go unnoticed with conventional detection methods (e.g., individually assessing security alerts in isolation). Threat alerts and digital event information are surfaced in a cybersecurity intelligence user interface, enabling comprehensive monitoring of digital activity and threats across diverse environments. In addition, automated notification transmission to security entities and resources (e.g., SOC teams) is integrated into a variety of messaging platforms, providing real-time threat notifications and contextual remediation recommendations to reduce response time.

By combining threat alerts and multi-plane alerting, automated event correlation across platforms, digital event signal generation, and real-time cybersecurity monitoring, embodiments of the present application provide a highly scalable, adaptable, and intelligence-driven approach to modern cybersecurity threats, ensuring faster detection, reduced response time, and improved threat mitigation across complex cloud environments.

1. System for Automatically Correlating Digital Events for Attribution Across Digital Platforms As shown in FIG. 1A, a system 100 for automatically correlating digital events for attribution across digital platforms includes a digital event data intake module 110, a session construction module 120, a session correlation engine 130, an attribution engine 140, and a session data surfacing module 150. Additionally, in some embodiments, system 100 may include a session data repository 160.

It shall be recognized that, in some embodiments, system 100 may interchangeably be referred to herein as an "identity-based threat detection and response service." The identity-based threat detection and response service, in some embodiments, may be implemented by a network of distributed computers.

1.10 Digital Event Data Intake Module

The digital event data intake module no preferably functions to collect or receive digital event data associated with one or more digital events (as detailed in 2.10). Preferably, the digital event data intake module may be in operable communication with one or more digital event data sources which may include, but are not limited to, one or more digital or computing service providers and/or platforms (as detailed in 2.10), and/or one or more digital event data streams (e.g., real-time data streams). In some embodiments, digital event data intake module no may function to parse and extract incoming digital event data into one or more digital event data records (as detailed in 2.10).

The digital event data intake module no functions to collect, parse, and organize incoming digital event data, ensuring a consistent structure across multiple data formats and sources. In various embodiments, digital event data intake module no may receive digital event data from diverse digital event data sources, including but not limited to one or more cloud platforms, non-cloud platforms (e.g., on-premises and hybrid environments), identity management systems, endpoint security tools, and user device logs. To standardize data ingestion, the module may implement data parsing functions to convert data into structured records known as "digital event data records," each associated with a unique digital event identifier. The structured records enable seamless integration with downstream modules, allowing efficient processing and analysis.

In one or more embodiments, digital event data intake module 110 defines a "digital event" as a distinct instance of user or system activity, associated with one or more attributes, including but not limited to timestamps, event type, actor identity, associated resources, and activity outcome. "Digital event data" refers to data and metadata associated with digital events, encompassing details like the event source (e.g., originating platform or service), event scope (e.g., access, modification, or execution), and system identifiers, such as IP addresses or device IDs.

It shall be recognized that system 100 described herein may be configured to correlate digital events not only across cloud platforms but also in non-cloud environments, including on-premises and hybrid infrastructures. By accommodating a range of digital providers, system 100 enables organizations to monitor, correlate, and attribute events across varied infrastructure types. In on-premises and hybrid environments, digital events are often managed within locally hosted servers, databases, and private networks, where event data may lack the native integrations present in cloud-based platforms. Digital event data intake module 110 may be designed to process event logs from diverse sources consistently, standardizing data structures and consolidating information from multiple environments. Integrating on-premises and hybrid systems into the correlation and attribution processes enhances a capacity of system 100 to deliver comprehensive monitoring across all digital activities and digital events, regardless of infrastructure type, supporting the needs of complex, multi-platform organizations.

To enhance consistency in digital event data processing, digital event data intake module 110 may incorporate data normalization processes. Normalization transforms disparate data formats into a unified schema, using predefined templates to create consistency across various data fields, such as timestamp formats, event categorization labels, and actor identifiers. Normalization allows system 100 to efficiently correlate and analyze data across different platforms, minimizing ambiguity when attributing actions to specific actors. That is, a feature and capability of digital event data intake module 110 is the normalization of event data across diverse digital event sources. Service providers and platforms generally generate event logs in unique formats, often with custom naming conventions for event attributes. To address inconsistencies, digital event data intake module 110 standardizes and structures incoming events by converting disparate data into a unified format using key/value pairs. By mapping event properties to a consistent set of attributes, such as event type, actor identity, timestamp, and resource identifier, the module achieves a standardized data structure that facilitates downstream processing and integration with other system components.

In addition to structural normalization, digital event data intake module 110 generates a unified set of metadata as key/value pairs to provide enhanced context for each event. Metadata may include derived attributes, such as user role, device location, and event impact level, which enriches the original event data. Normalizing events into standardized key/value pairs and supplementing them with metadata streamlines event data processing for subsequent modules, while improving the accuracy of event analysis, session correlation, and actor attribution across multi-platform environments.

In some preferred embodiments, the digital event data intake module 110 includes a "data enrichment" feature, which may augment incoming digital event records with contextual metadata. For example, digital event records may be enriched with geolocation details based on IP addresses or with user role details from identity management systems. Enriched metadata enhances the accuracy of downstream session construction and correlation processes, as described in sections 1.20 and 1.30, by providing additional context for identifying patterns in user behavior and access.

Additionally, or alternatively, digital event data intake module 110 is configured to generate a unique session identifier, referred to as "sessionId," for grouping related events. SessionId generation involves a fingerprinting process that uses event metadata and timestamp information to create a distinctive identifier for a set of digital activities associated with a specific actor or entity. This approach to session identification allows digital event data intake module 110 to capture and group relevant events into sessions that accurately represent user or system actions over time. In addition, digital event data intake module 110 may analyze time intervals between events and apply predefined time windows to divide large sessions into smaller, more manageable segments. By segmenting sessions with high event volume based on temporal thresholds, the module supports efficient handling and optimized processing of extensive event data.

The temporal thresholds applied during session chunking allow digital event data intake module 110 to create smaller, logically consistent sessions from continuous or prolonged user interactions. Each smaller session retains an independent sessionId while maintaining an association with the overall sequence of events, preserving continuity within the larger session context. This segmentation enables system 100 to maintain data organization and manage processing load while still providing an accurate depiction of digital actions within each defined time window. The generation and assignment of unique session identifiers across segmented sessions ensure that each chunked session remains traceable and identifiable, facilitating further processing and correlation in downstream modules.

In some embodiments, digital event data intake module 110 incorporates various machine learning models to enhance classification, correlation, and analysis of digital events. Machine learning techniques implemented may include supervised learning, unsupervised learning, reinforcement learning, and ensemble methods, among other approaches. Each technique is selected to suit specific requirements for processing complex digital event data from diverse sources.

Supervised learning algorithms, including logistic regression, random forests, and gradient boosting machines, may be implemented to classify and predict outcomes based on labeled historical data. Applying these algorithms allows for accurate classification of digital events, such as distinguishing routine activity from anomalous activity. Additional models, such as support vector machines and neural networks, provide capabilities for identifying patterns in large datasets, relying on labeled data to improve predictive accuracy over time.

Unsupervised learning techniques, including clustering methods like k-means and density-based spatial clustering of applications with noise (DBSCAN), enable grouping of related digital events and detection of patterns in unlabeled data. Clustering techniques support analysis across varied data sources and contribute foundational insights for session construction and correlation within session construction module 120.

Reinforcement learning approaches, such as Q-learning, enable adaptive decision-making processes in real-time, allowing the system to adjust to new patterns or behaviors in digital event data. Reinforcement learning contributes to continuous improvement in classification and attribution, especially in dynamic environments where digital events evolve in response to user and system interactions.

In various embodiments, ensemble methods, including boosting, bagging, and stacked generalization, combine multiple models to enhance classification accuracy and resilience to data variability. Random forests and gradient boosting methods prove effective for complex digital environments, where variability in data sources and structures requires a robust approach to correlation and attribution.

Natural language processing models, such as Bidirectional Encoder Representations from Transformers (BERT) and Generative Pre-trained Transformers (GPT), may be integrated to analyze unstructured digital event data. BERT and GPT models, adapted for event-specific terminology, process textual event data logs and extract key information relevant to attribution. Integrating these models allows the system to handle events recorded as descriptive text, expanding flexibility in data intake and analysis.

Digital event data intake module 110 may also employ model selection algorithms to determine optimal machine learning models for different types of digital event data. Model selection and evaluation criteria may include accuracy, precision, recall, and adaptability to new data inputs. A model selection approach ensures continuous improvement and application of current best practices across a wide range of data types and formats.

1.20 Session Construction Module

The session construction module 120 preferably functions to automatically construct one or more sessions based on digital event data. Preferably, session construction module 120 may function to construct each session to represent a series of digital events performed or initiated by a distinct actor or entity that may occur within a specific session timespan. In one or more preferred embodiments, session construction module 120 may be in operable communication with digital event data intake module 110. In some embodiments, session construction module 120 may function to continuously construct, update, and/or otherwise modify sessions as associated digital event data is received (e.g., from digital event data intake module 110). It shall be recognized that the term "session" may also be interchangeably referred to herein as a "session object" or the like.

In some embodiments, before event data is used in session construction, digital event data intake module 110 performs additional operations to optimize the quality and relevance of data passed to session construction module 120. Events undergo filtering to remove non-essential or redundant information, allowing each session to focus on digital actions that contribute to the accurate portrayal of user behavior. Enrichment processes add additional metadata to events, such as device information, network characteristics, or geolocation data, enhancing the context available for session analysis. The enrichment of events provides a comprehensive view of each action, facilitating precise session construction in later stages.

Additionally, or alternatively, digital event data intake module 110 may also perform resequencing of events to correct any chronological inconsistencies in event data. Resequencing organizes events into a strict chronological order, which is essential when events are received in a non-sequential arrangement from various sources. Ensuring accurate event sequencing enables session construction module 120 to maintain a faithful timeline of activities, capturing the correct sequence of user interactions within each session. The combination of filtering, enrichment, and resequencing allows digital event data intake module 110 to deliver optimized event data to session construction module 120, supporting high accuracy in session assembly and in downstream analysis and correlation processes. For instance, in a non-limiting example, the system may receive event data from multiple heterogeneous data sources that generate and transmit logs at different times or in varying network conditions, which may result in out-of-order or asynchronous event arrival. The system may automatically analyze timestamp metadata, sequence identifiers, or other temporal indicators associated with the received digital events and reorganize the digital events into a strict chronological order. Resequencing in such a manner ensures that the system maintains an accurate and consistent temporal record of digital activities across all monitored computing environments. By preserving the true order of occurrence, the system improves the fidelity of reconstructed user activity timelines and enhances the accuracy of subsequent session construction, event correlation, and actor attribution processes. For instance, in a non-limiting example, when the system receives log data from multiple cloud service providers having overlapping authentication, API, and access events, the system may automatically resequence the digital events according to their associated timestamps to reflect the actual sequence of actions (e.g., digital events) performed by an actor. This capability allows the system to generate more accurate session objects and cross-environment correlations, thereby improving the precision and effectiveness of real-time root actor detection and security analysis.

In some embodiments, session construction module 120 may function to determine whether the actor type for a constructed session is a machine actor or a human actor. That is, in some embodiments, session construction module 120 may function to determine whether the digital events of a constructed session are initiated by a machine (e.g., a computer or server) or a human. In some such embodiments, session construction module 120 may function to determine the human or machine actor type of a session based on one or more algorithms, heuristics, and/or other logic.

Additionally, or alternatively, in some embodiments, session construction module 120 may function to implement one or more machine learning models to determine the human or machine actor type of a constructed session. Additionally, or alternatively, session construction module 120 may perform various other types of machine learning to enhance security and contextual awareness. For example, machine learning models may detect anomalous access by identifying new geolocation patterns based on IP address changes or recognizing hardware device information that deviates from expected configurations. Machine learning models may also detect unusual behavior, such as significant deviations from typical access times, frequencies, or interaction patterns, thereby identifying potential security risks and enhancing the accuracy of session-based activity analysis. As such, in some embodiments, session construction module 120 (and/or any other component of system 100) may employ any suitable machine learning including, but should not be limited to, one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLaMA, LLaMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.30 Session Correlation Engine

The session correlation engine 130 preferably functions to automatically configure one or more session correlations between constructed sessions (e.g., individual session objects or the like). Preferably, session correlation engine 130 may function to configure a session correlation between two distinct constructed sessions (e.g., two distinct individual session objects) based on determining the two distinct sessions are associated with a common actor or entity (e.g., the same actor or entity performed the digital events in each of the two distinct sessions). In one or more embodiments, session correlation engine 130 may be in operable communication with session construction module 120 to receive, as input, each of the constructed sessions.

Session correlation engine 130 preferably functions to automatically identify relationships between constructed sessions (e.g., session objects) by analyzing digital event data attributes associated with each session. In one or more embodiments, session correlation engine 130 determines a correlation between sessions based on common actor identities, temporal alignment of digital events, and shared resources. Correlation between sessions enables system 100 to attribute sequential digital actions to a single actor or entity across multiple digital platforms, forming a comprehensive view of activity within a specified time period. For instance, in such a non-limiting example, session correlation engine 130 may correlate sessions that share one or more common identifiers, timestamps, or network attributes to accurately associate related digital activities and/or related session objects across different computing environments.

In various embodiments, session correlation engine 130 implements correlation algorithms, including temporal proximity matching and attribute-based matching, to detect related sessions. Temporal proximity matching identifies sessions initiated by a common actor within a specified timeframe, defining session boundaries based on predetermined time intervals. Attribute-based matching evaluates specific session properties, such as IP addresses, device identifiers, and user roles, to determine whether two or more sessions belong to a single actor. Using multiple correlation algorithms allows system 100 to establish robust relationships among sessions, enhancing the reliability of actor attribution.

Session correlation engine 130 may further incorporate probabilistic correlation methods to account for ambiguous session attributes. In some embodiments, the session correlation engine assigns a confidence score to each correlation based on factors such as the frequency of shared identifiers, the degree of temporal overlap, and the likelihood of shared actor identity. Probabilistic correlation methods enable system 100 to manage uncertainty, facilitating more accurate correlations when data points are incomplete or inconclusive.

Additionally, session correlation engine 130 supports cross-platform correlation and/or cross-environment correlation by standardizing session properties across diverse digital event data sources. Standardization enables effective comparison of session attributes from distinct digital environments, such as cloud service providers and on-premise systems. In some embodiments, session correlation engine 130 incorporates machine learning models trained on historical data to predict session relationships based on patterns of actor behavior. Integrating machine learning allows session correlation engine 130 to adapt to evolving digital environments, improving correlation accuracy over time.

1.40 Attribution Engine

The attribution engine 140 preferably functions to construct an attribution chain for a target session based on session correlations. As described herein, the term "attribution chain", as generally used herein, may refer to a set of one or more sessions of a distinct session actor that may represent a sequence of digital activity of the distinct session actor across the set of one or more sessions. Preferably, for a given target session, attribution engine 140 may function to construct an attribution chain by identifying any sessions linked to the target session by a session correlation that may precede the target session chronologically. In one or more embodiments, attribution engine 140 may be in operable communication with session correlation engine 130 and/or session construction module 120 to receive, as input, the one or more constructed sessions, including a target session for attribution, and any session correlations between the one or more constructed sessions. In turn, attribution engine 140 may function to construct an attribution chain for the target session that may comprise one or more correlated sessions.

Attribution engine 140 functions to construct attribution chains that trace a series of digital events associated with a target actor across multiple sessions. In various embodiments, attribution engine 140 identifies correlations between sessions based on actor identity, sequence of actions, and contextual properties of digital events. Correlation of sessions enables attribution engine 140 to connect discrete actions within a cohesive activity trail, forming an attribution chain that allows users to analyze behavioral patterns and detect potential security risks.

In one or more embodiments, attribution engine 140 applies temporal correlation methods to establish session links. Temporal correlation involves aligning sessions based on the timing of digital events, with sessions deemed related if timestamps indicate continuity of activity within a specified timeframe. Temporal correlation parameters may be configured to reflect acceptable gaps in user activity, accommodating both continuous and intermittent behavior patterns.

Attribution engine 140 may further employ event similarity correlation, which groups sessions with closely aligned event characteristics. Event similarity is assessed based on digital event types, event outcomes, accessed resources, and other event-specific attributes. Sessions with highly similar event sequences are correlated to reflect the probability of a common actor origin, allowing attribution engine 140 to group related sessions across different digital platforms.

In some embodiments, attribution engine 140 incorporates actor-based correlation methods, linking sessions by a common actor identifier or associated identifiers, such as device IP addresses, account credentials, or geolocation data. Actor-based correlation ensures that digital events attributed to the same user or device are connected across sessions, enabling consistent identity attribution across distinct digital environments.

Attribution engine 140 may also use causal correlation methods to infer relationships between sessions based on the flow of actions or dependencies between digital events. Causal correlation identifies sessions where one session's events trigger or enable actions in a subsequent session. For example, authentication in an initial session followed by resource access in a subsequent session may establish a causal link between sessions, reflecting a logical progression of activity. Stated another way, attribution engine 140 may detect that a digital event recorded in a first session object initiated or enabled an action (e.g., one or more digital events) represented in a second session object, thereby establishing a causal relationship between the two session objects and allowing the system to map the directional flow of activity across computing environments. In a non-limiting example, attribution engine 140 may detect that a user's console login captured in a first session object results in the creation of an API key subsequently used in a second session object to access cloud resources, thereby establishing a causal relationship between the two session objects. In another non-limiting example, attribution engine 140 may detect that a configuration change indicated in a first session object triggers an automated deployment process indicated in a second session object, indicating that the second session object was causally derived from the first session object. In another non-limiting example, attribution engine 140 may detect that a user downloaded sensitive data in a first session object and then, within a short time frame (e.g., 2 minutes or less, 15 minutes or less, etc.), executes an external data transfer in a second session object, establishing a causal relationship between the two session objects.

In various embodiments, attribution engine 140 applies a scoring model to evaluate the strength of each correlation, assigning confidence scores based on alignment across temporal, event similarity, actor-based, and causal criteria. Higher confidence scores are assigned to correlations with multiple aligned criteria, enhancing the accuracy of constructed attribution chains. The scoring model may be configured to filter low-confidence correlations, ensuring attribution chains represent a reliable sequence of actions by a distinct actor.

To support cross-platform correlation, attribution engine 140 applies normalization processes that standardize session properties from diverse digital sources, enabling consistent comparison across platforms. In some embodiments, attribution engine 140 integrates machine learning algorithms that predict correlation likelihood based on historical activity patterns, adapting to changing user behaviors and platform-specific attributes. Machine learning integration enables continuous refinement of correlation accuracy, improving the precision of attribution chains over time.

It shall be further recognized that, in some embodiments, attribution engine 140 may obtain new information (e.g., new data) during or after the attribution process that was not available, considered, or fully understood at an earlier stage of processing by session construction module 120. In such embodiments, attribution engine 140 may provide this newly obtained information as feedback or input to session construction module 120, enabling the system to incorporate additional context or correlations that enhance previously constructed session objects. This backward feedback process allows system 100 to iteratively refine its understanding of digital activity as new information surfaces, ensuring that earlier processing steps remain aligned with the most current and complete data available. The updated and contextually enriched session data may then be stored in data repository module 160 for persistence and use in subsequent analytical or visualization processes. For instance, in a non-limiting example, attribution engine 140 may obtain new information or data indicating that two previously distinct session objects share a previously unrecognized session identifier (e.g., an authentication token or provider-issued session ID), and may provide this information back to session construction module 120 so that the two session objects are merged into a single session object. In another non-limiting example, attribution engine 140 may obtain new information or data indicating that additional digital event data associated with a previously constructed session object has become available from one or more data sources, and may provide the new information or data back to session construction module 120 so that the previously constructed session object can be updated to include the newly obtained digital event data. At least one technical benefit of attribution engine 140 is that it can input newly obtained data into system 100 (or any module of system 100) and propagate backward feedback to earlier processing stages, enabling the system to update or refine previously created session objects as new information and data becomes available.

1.50 Session Data Surfacing Module

Session data surfacing module 150 preferably functions to surface any session data (e.g., constructed session(s), session correlation(s), and/or attribution chain(s)) to one or more users or subscribers (e.g., subscribing entities) of system 100. In one or more embodiments, session data surfacing module 150 may include a user interface that may enable the one or more users or subscribers of system 100 to interact with, direct, and/or configure one or more components of system 100. In one or more embodiments, the user interface may comprise a graphical user interface (GUI), a voice user interface (VUI), and/or any other suitable user interface for receiving input from and providing output to one or more users, subscribers, or subscribing entities of system 100. Additionally, session data surfacing module 150 may support external integrations, including an application programming interface (API) for automated access to session data, export functionality for downloading data in various formats (e.g., CSV, JSON), and a notification system that utilizes webhooks or sends alerts through chat applications. These capabilities enhance flexibility in accessing and distributing session data, allowing users to incorporate system 100 outputs into broader workflows and external monitoring systems.

Session data surfacing module 150 functions to display correlated session data, attribution chains, and digital event summaries to users through an interactive graphical user interface. Session data surfacing module 150 is designed to enhance user accessibility and facilitate analysis of session attributes and correlations. Various display regions within the module organize session data for efficient navigation and detailed inspection of session information.

In one or more embodiments, session data surfacing module 150 includes a session summary region that presents an overview of each session's primary attributes, including session start and end timestamps, session duration, and impact and suspicion scores. Impact and suspicion scores indicate the relative importance and security risk level of each session based on detected behaviors. Providing a quick reference to key session details in the session summary region allows users to rapidly assess sessions requiring further review.

Session data surfacing module 150 includes an attribution chain region, which displays a visual representation of attribution chains constructed by attribution engine 140. The attribution chain region presents each session as a linked node, arranged sequentially to reflect actor activity progression. Each node includes session properties, such as session duration and actor identity, enabling users to trace a continuous trail of activity across multiple sessions. Interactive features, such as expanding or collapsing session nodes, allow users to control the detail level displayed within the attribution chain.

The digital event table region displays individual digital events within each session, organized in a tabular format. Digital event table columns may include event timestamps, event type, actor identity, IP address, device identifier, and event outcome (e.g., success or failure). Users may sort or filter events by column criteria to isolate specific event types or outcomes, providing a focused view of session activities. Each row in the digital event table can be selected to view event-specific details, enhancing flexibility in data exploration.

In various embodiments, session data surfacing module 150 also includes a session alert notification region that displays notifications related to significant session events. Alerts may indicate policy violations, anomalies, or other flagged behaviors within a session. Each alert includes descriptive information about the triggering condition and suggested actions for investigation or remediation. Displaying alerts alongside session data allows users to identify critical events quickly and take appropriate action without needing to switch interfaces.

The session data export feature enables users to export selected session data for offline analysis or recordkeeping. Session data may be exported in various formats, including CSV, JSON, and PDF. Users can select individual sessions, events, or entire attribution chains for export, enabling tailored data retrieval. Data export functions support integration with external reporting and analysis tools, allowing users to manage session data across different platforms as needed.

Additionally, session data surfacing module 150 may incorporate user-configurable settings for customizing display preferences. Settings may include options for adjusting time intervals, session impact score thresholds, and session categorization rules. Configurable settings enable users to align module behavior with specific analysis requirements or organizational policies.

The session user interface within session data surfacing module 150 functions to display session data summaries, correlation information, and session properties to users. The session user interface may include multiple visual regions for presenting key session details, organized to provide an intuitive and accessible display that aligns with system functions.

In one or more embodiments, the session user interface includes a session summary region that displays primary session properties, including session start timestamp, end timestamp, session duration, and session environment. The session summary region may additionally include impact and suspicion scores, which are calculated based on factors such as the sensitivity of accessed resources and frequency of suspicious behaviors within the session. Including impact and suspicion scores enables the user to quickly assess the significance of a session's activities.

The session user interface may also include a session credential region, which displays authentication and authorization details associated with a session. Credential information may include access keys, validity periods, access key age, and session authentication type (e.g., single-factor or multi-factor authentication). Displaying credential details provides transparency regarding access controls associated with a session, enabling users to evaluate session security more effectively.

Additionally, the session user interface includes a session actor identity region to surface actor details associated with a session, including username, role, and location details (e.g., IP address and geolocation). The actor identity region supports quick reference to the user identity involved in session activities, highlighting both human and machine actors based on session properties.

In various embodiments, the session user interface includes an impact and suspicion analysis region that presents calculated scores and visual indicators for each session. Each session's impact score and suspicion score may be represented using visual scales, color-coding, or iconography to signal potential risk levels. Displaying visual indicators in the impact and suspicion analysis region enables rapid assessment of sessions requiring further investigation, based on unusual activity patterns or access levels.

The digital event list region of the session user interface displays individual digital events within a session, presented in a structured table format. Columns in the digital event list may include event timestamp, event type, event outcome (e.g., success or failure), IP address, device identifier, and relevant resources accessed. Sorting and filtering functions enable users to focus on specific event types or outcomes, providing a detailed view of session activities as needed.

In some embodiments, the session user interface includes an alert notification region displaying notifications related to session events. Alert notifications may indicate flagged events or conditions, such as policy violations or detected anomalies within a session. Alert notifications appear alongside detailed descriptions to assist users in identifying specific behaviors or risks requiring prompt attention.

In some preferred embodiments, session data surfacing module 150 may function to enable the one or more users or subscribers to query system 100 for session data associated with one or more target sessions. In such embodiments, session data surfacing module 150 may function to display or otherwise output any or all session data (e.g., digital event data and/or metadata) related to each selected target session. In such embodiments, session data surfacing module 150 may be in operable communication with session construction module 120 and/or session correlation engine 130.

Additionally, or alternatively, session data surfacing module 150 may function to enable the one or more users or subscribers to select one or more target sessions for attribution engine 140. In such embodiments, session data surfacing module 150 may function to surface (e.g., display or otherwise output) an attribution chain constructed by attribution engine 140 for each selected target session. In such embodiments, session data surfacing module 150 may additionally or alternatively be in operable communication with attribution engine 140.

1.60 Session Data Repository

In some embodiments, system 100 may include session data repository 160. In such embodiments, session data repository 160 may function to receive and/or store one or more constructed sessions within computer memory (e.g., sessions constructed by session construction module 120). Additionally, session data repository 160 may function to store digital event data, one or more session correlations (e.g., session correlations generated by session correlation engine 130) and/or one or more attribution chains (e.g., attribution chains generated by attribution engine 140). In one or more embodiments, session data repository 160 may be queried by one or more components of system 100 to provide access to or otherwise deliver any stored data. In some embodiments, system 100 may include a plurality of session data repositories 160. In various embodiments, session data repository 160 may comprise one or more remote computers or servers, one or more local computers or servers, cloud storage, local storage (e.g., hard drives, solid state drives, network-attached storage, flash drives, and/or the like), one or more databases, and/or any other suitable data storage system or device.

1.70 Automated Threat Detection Subsystem

Figure 1B:
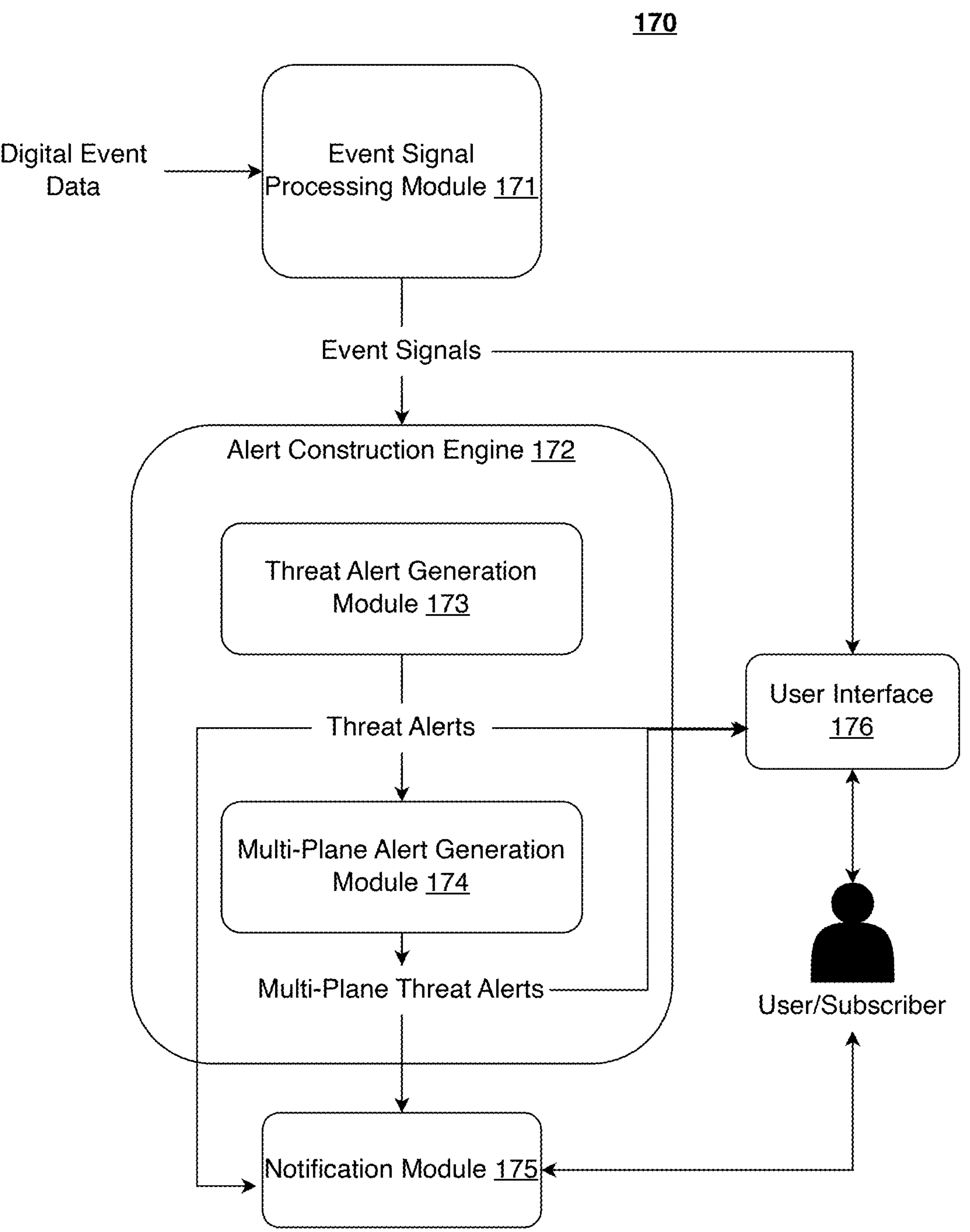
FIG. 1B illustrates a schematic representation of an automated threat detection subsystem in accordance with one or more embodiments of the present application.

As shown in FIG. 1B, a system 100 for automated detection of threats across digital platforms, computing environments, or the like may include automated threat detection subsystem 170. In such embodiments, automated threat detection subsystem 170 may include event signal processing module 171, alert construction engine 172, threat alert generation module 173, multi-plane alert generation module 174, notification module 175, and user interface 176.

1.71 Event Signal Processing Module

The event signal processing module 171 preferably functions to generate one or more event signals based on an input of digital event data. Preferably, event signal processing module 171 may function to ingest, analyze, and/or categorize digital event data from various cloud environments, identity providers, and/or enterprise applications. In various embodiments, event signal processing module 171 may function to apply predefined signal detection rules and/or heuristics to identify event features and generate one or more corresponding event signals. Additionally, or alternatively, event signal processing module 171 may function to implement one or more machine learning models to identify event features and generate corresponding event signals based on input of digital event data. Event signal processing module 171 may additionally function to assign event signals with impact and suspicion scores. In some embodiments, event signal processing module 171 may additionally function to construct a bi-directional mapping of digital events to generated event signals. In one or more embodiments, event signal processing module 171 may output generated event signals (e.g., a plurality of suspicious event signal objects or the like) to one or more components of system 100.

1.72 Alert Construction Engine

The alert construction engine 172 preferably functions to generate one or more threat alerts (e.g., security alerts) and/or one or more multi-plane threat alerts (e.g., multi-plane security alerts) based on event signals (e.g., the plurality of suspicious event signal objects or the like) generated by event signal processing module 171. Alert construction engine 172 may be operably connected to event signal processing module 171 to receive generated event signals, and in turn alert construction engine may function to process event signals to identify potential security incidents that may warrant explicit security alerts. Alert construction engine 172 may include threat alert generation module 173 and multi-plane alert generation module 174. In various embodiments, alert construction engine 172 may function to route received event signals to both alert generation modules 173 and 174 in order to generate corresponding alerts.

1.73 Threat Alert Generation Module

Threat alert generation module 173 preferably functions to generate one or more threat alerts based on one or more received event signals. In various embodiments, threat alert generation module 173 may map received event signals to one or more rules or logical conditions, including logical relationships between multiple signals, to determine when a digital event or sequence of digital events may constitute a potential threat. In some embodiments, threat alert generation module 173 may additionally, or alternatively, generate one or more threat alerts based on implementing one or more machine learning models that may receive event signals as input to identify one or more potential threats. Threat alert generation module 173 may generate alerts with severity scores, detailed descriptions, and contextual metadata, ensuring that security teams and resources receive actionable intelligence regarding detected potential threats.

1.74 Multi-Plane Alert Generation Module

Multi-plane alert generation module 174 preferably functions to generate one or more multi-plane threat alerts based on one or more threat alerts generated across multiple sessions. In such a way, multi-plane threat alert generation module 174 may extend threat detection beyond single-session events, correlating multiple alerts across sessions, users, and/or environments to identify larger potential attack campaigns or patterns. In various embodiments, multi-plane alert generation module 174 may function to aggregate related threat alerts generated by threat alert generation module 173 based on attribution identifiers, such as shared user identities, privilege escalations, or lateral movement patterns, providing a unified view of multi-session security incidents. Accordingly, multi-plane alert generation module 174 may be operably connected to threat alert generation module 173 to receive generated threat alerts. In various embodiments, multi-plane alert generation module 174 may employ logic, heuristics, and/or one or more machine learning models to identify or classify a set of threat alerts as a multi-plane threat alert.

1.75 Notification Module

Notification module 175 preferably functions to generate and transmit one or more notifications to one or more users or subscribers of system 100. In various embodiments, notification module 175 may generate a notification based on a threat alert or multi-plane alert generated by threat alert construction module 172. Notification module 175 may function to ensure that users or subscribers (e.g., SOC entities) receive real-time alerts and actionable insights through integrated communication channels such as email, SMS, third-party notification channels, bi-directional messaging services and/or any other suitable communication channel. In some embodiments, notification module 175 may additionally function to receive notification responses from one or more users or subscribers.

1.76 User Interface

User interface 176 preferably functions to enable one or more users or subscribers to monitor, configure, and/or manage one or more components of system 100 and/or automated threat detection subsystem 170. In various embodiments, user interface 176 may function to surface or display event signals, threat alerts, multi-plane alerts, notifications, and/or digital event data from system 100 and/or automated threat detection subsystem 170. Accordingly, user interface 176 may be operably connected to event signal processing module 171, alert construction engine 172, threat alert generation module 173, multi-plane alert generation module 174, notification module 175, and/or any other component of system 100 to surface or display relevant data from system 100 to one or more users or subscribers as detailed herein. Additionally, in various embodiments, user interface 176 may function to receive one or more user queries, and in turn user interface 176 may function to output filtered or curated digital event data, event signals, threat alerts, multi-plane alerts, and/or other data from system 100 to one or more users based on received user queries.

2. Method for Automated Detection of Threats Across Digital Platforms

As shown in FIG. 2, a method 200 for automated detection of threats across digital platforms includes receiving a corpus of digital event data S210, generating one or more event signals based on the corpus of digital event data S220, constructing one or more threat alerts based on the one or more event signals S230, and transmitting one or more threat notifications based on the one or more threat alerts S240. In some embodiments, method 200 may additionally include constructing one or more multi-plane alerts based on the one or more threat alerts S235.

It shall be further recognized that method 200 and/or system 100 may additionally or alternatively use one or more processes and/or one or more system components described in U.S. patent application Ser. No. 19/394,310, filed on 19 Nov. 2025, titled SYSTEMS AND METHODS FOR AUTOMATICALLY CORRELATING DIGITAL EVENTS FOR ACTOR ATTRIBUTION ACROSS DISPARATE DIGITAL PLATFORMS, which is incorporated herein in its entirety by this reference.

2.10 Receiving a Corpus of Digital Event Data

S210, which includes receiving a corpus of digital event data, may function to receive, source, and/or otherwise ingest a corpus comprising one or more pieces of digital event data that may relate to one or more digital events or actions. In various embodiments, digital event data may comprise one or more pieces of data and/or metadata related to a distinct digital event or action. In one or more embodiments, S210 may function to construct one or more digital event records based on the collected digital event data, wherein each digital event record relates to a distinct digital event.

Digital Event Data and Metadata

Preferably, digital event data may comprise one or more pieces of data and/or metadata associated with a distinct digital event performed or executed in a distinct digital environment (e.g., a cloud computing environment or platform). In one or more embodiments, digital event data for a distinct digital event may relate to the actor and/or entity performing or initiating the digital event, one or more computing resources or services utilized during the distinct digital event, access details of the distinct digital event, activity details of the distinct digital event, and/or any related resources associated with the distinct digital event. Additionally, digital event data may include enriched metadata from external sources to provide further context, such as identity attributes from a distinct system or other identity management platforms. External enrichment may also incorporate data from third-party sources, including threat intelligence information, such as prior threat history associated with an IP address, enhancing the depth and accuracy of information available for subsequent analysis.

In various embodiments, digital event data for a distinct digital event may include, but is not limited to, a start timestamp of the distinct digital event, an event label or event name of the distinct digital event, a service name and/or service type of the distinct digital event, an IP address of the actor or entity performing or initiating the distinct digital event, an identifier (e.g., name, label, and/or the like) of the actor or entity performing or initiating the distinct digital event, an outcome status (e.g., success/failure) of the distinct digital event, one or more event insight features of the distinct digital event, one or more signals generated, sent and/or received by the distinct digital event, one or more resources utilized and/or activated by the distinct digital event, one or more digital event category labels of the distinct digital event, and/or any other data and/or metadata associated with the distinct digital event. Digital event data may further include user-agent information, detailing the browser or application used to access the service, and authentication device information, identifying the device employed for access authentication. The inclusion of user-agent and authentication device details provides additional context for access-related events, supporting more comprehensive analysis and security monitoring.

Stated another way, in one or more embodiments, an identity-based threat detection and response service (e.g., system or service implementing method 200) may function to obtain, by a network of distributed computers, digital event data associated with a subscribing entity and, in response, generate a session object that includes a plurality of distinct digital events performed by a digital account (e.g., single digital account) within a computing environment of the subscribing entity.

Digital Event Data Sources

In one or more embodiments, S210 may function to collect digital event data from one or more digital event data sources. In various embodiments, the one or more digital event data sources may include, but are not limited to, one or more clouds service providers or systems, one or more identity and access management (IAM) providers or systems, one or more single sign-on (SSO) providers or systems, one or more cybersecurity providers or systems, one or more vendor and/or customer APIs, one or more user devices, one or more operating systems, one or more servers or computers, one or more applications, one or more microservices, one or more databases, and/or any other suitable source of digital event data.

The digital event data sources may function as origins for digital event data collected by digital event data intake module 110. In various embodiments, digital event data sources may include, but are not limited to, cloud service providers, identity and access management (IAM) systems, single sign-on (SSO) systems, cybersecurity platforms, network devices, and user devices. Each digital event data source provides unique insights into activity within a digital environment and contributes valuable metadata for accurately tracking and attributing digital events.

In one embodiment, cloud service providers serve as a data source by generating logs related to user and system activities, including access events, service utilization, and account modifications. Identity and access management systems generate authentication and authorization logs, detailing identity verification events, permission grants, and policy enforcement actions. Single sign-on systems provide records of centralized authentication events that unify access credentials across multiple platforms, while cybersecurity platforms capture threat detection and response activities, alerting system 100 to security incidents and anomalous behaviors.

Network devices, such as routers, switches, and firewalls, generate logs that capture network-level events, including IP address usage, packet transfers, and security alerts. User devices, including desktops, mobile devices, and virtual machines, record local activities such as application launches, file accesses, and network connections. These logs contribute data that enables system 100 to attribute actions to specific users or devices across a variety of digital environments.

In various embodiments, digital event data sources may produce data in multiple formats, including but not limited to JSON, XML, CSV, and Syslog formats. Digital event data intake module 110 can parse each data format into a standardized structure, enabling efficient processing and analysis by other system components.

In various embodiments, S210 may function to collect digital event data from one or more digital event data sources in any suitable format including, but not limited to, JSON formats, XML formats, CSV formats, Syslog formats, text-based data formats, and/or any other suitable format for digital event data.

In some embodiments, S210 may function to collect one or more digital event log artifacts comprising one or more digital event logs. In some such embodiments, each digital event log artifact may comprise a time series sequence of digital events that may be parsed into individual digital events and/or into digital event data. In some embodiments, the one or more digital event log artifacts may comprise a series of digital events that may or may not be arranged in chronological order according to a timestamp of each digital event.

Digital Event Data Parsing

In some embodiments, S210 may function to parse the one or more digital event logs to extract digital event data. In one or more embodiments, S210 may function to receive, as input, one or more event logs comprising digital event data (e.g., event logs in any suitable event log format). In turn, S210 may function to extract digital event data associated with one or more digital events. In such embodiments, each piece of digital event data may be associated with a distinct digital event. Additionally, in such embodiments, each distinct digital event may be associated with one or more pieces of digital event data. In some preferred embodiments, S210 may function to associate each piece of digital event data to a distinct digital event, such that S210 may function to construct one or more digital event records, wherein each digital event record may be representative of a distinct digital event. In such embodiments, each digital event record may comprise one or more (or all) pieces of digital event data associated with the corresponding digital event.

As a non-limiting example, a distinct digital event may comprise a user login event in which a user (e.g., the actor or entity of the distinct digital event) logs in to a computing service or platform (e.g., a cloud service provider). In such an example, the login event may be associated with a timestamp identifying the time and date of the user login event. Additionally, the login event may be associated with an IP and/or an identifier of the user, as well as an outcome (e.g., success or failure) of the login event. In certain embodiments, the login event may also involve a second-factor verification process, such as a 6-digit code sent to the user via SMS text message or an authenticator application. Metadata from the second-factor verification may include information about the device, phone number, or email address where the verification code was received. Such metadata can be analyzed to determine whether the device appears expected or may indicate potential suspicious activity, providing an additional layer of context for assessing security and trustworthiness of the login event. S210 may function to parse or extract digital event data sourced from the computing service or platform, and in turn S210 may function to construct a digital event record for the user login event comprising all digital event data associated with the user login event.

Stated another way, in one or more embodiments, an identity-based threat detection and response service (e.g., system or service implementing method 200) may function to obtain, by a network of distributed computers, digital event data associated with a subscribing entity and, in response, generate a plurality of session objects. Each distinct session object (e.g., individual session object or the like), in some embodiments, may include a plurality of distinct digital events performed by a distinct digital account within a distinct computing environment of the subscribing entity. In other words, a session object may correspond to a distinct set of digital events performed by a single digital account within a single computing environment during a defined time span.

Digital Event Data Normalization

In one or more embodiments, S210 may function to normalize digital event data from one or more digital event data sources. In various embodiments, each digital event data source may provide digital event data according to a distinct digital event data format (e.g., a distinct digital event log format). For example, different cloud service providers may have different digital event log formats from which S210 may function to source digital event data. In such embodiments, S210 may function to ensure that the received digital event data is subsequently normalized or standardized into a common digital event data structure or format, which may allow for analysis and comparison of digital events across disparate digital event data sources or environments.

Digital Event Data Streaming

In some embodiments, S210 may function to collect digital event data in real time. As a non-limiting example, S210 may function to receive digital event data from one or more digital event data streams that may be sourced from one or more digital event data sources in real-time as the events occur and/or as the digital events are logged. Such real-time digital event data collection may advantageously enable early or immediate detection of any potential issues related to one or more digital events. Additionally, or alternatively, in some embodiments, S210 may function to collect event data at specified (e.g., predefined) intervals. In some such embodiments, S210 may function to collect batches of digital event data at specified or predetermined intervals.

2.20 Generating one or more Event Signals based on the Corpus of Digital Event Data S220, which includes generating one or more event signals based on the corpus of digital event data, may function to generate one or more event signals (e.g., suspicious event signal objects) based on event signal logic applied to the received corpus of digital event data. The term "event signal," as generally used herein, may refer to a digital indicator or marker that may highlight one or more cybersecurity-relevant aspects or features of a distinct digital event. In various embodiments, an event signal may be derived from one or more elements of digital event data to classify, assess, and/or otherwise contextualize digital events. In some embodiments, an event signal may function as an atomic unit of detection to identify one or more aspects or features of digital events.

In some embodiments, a digital event may be associated with an array or set of one or more event signals. In various embodiments, each event signal may function to indicate a distinct aspect or feature of a distinct digital event. That is, in various embodiments, an event signal of a digital event may function to characterize or represent a distinct aspect or feature of that digital event. As a non-limiting example, given a digital event in which a user disables security logging on a cloud computing service, S220 may function to generate a corresponding "security logging disabled" event signal for that digital event. It shall be noted that this example is non-limiting, and a variety of event signals of different types may be generated to characterize one or more features of a digital event. Additionally, it shall be noted that, in some embodiments, event signals may be associated with any aspect or feature of a digital event, whether malicious, potentially malicious, or non-malicious.

Figure 5:
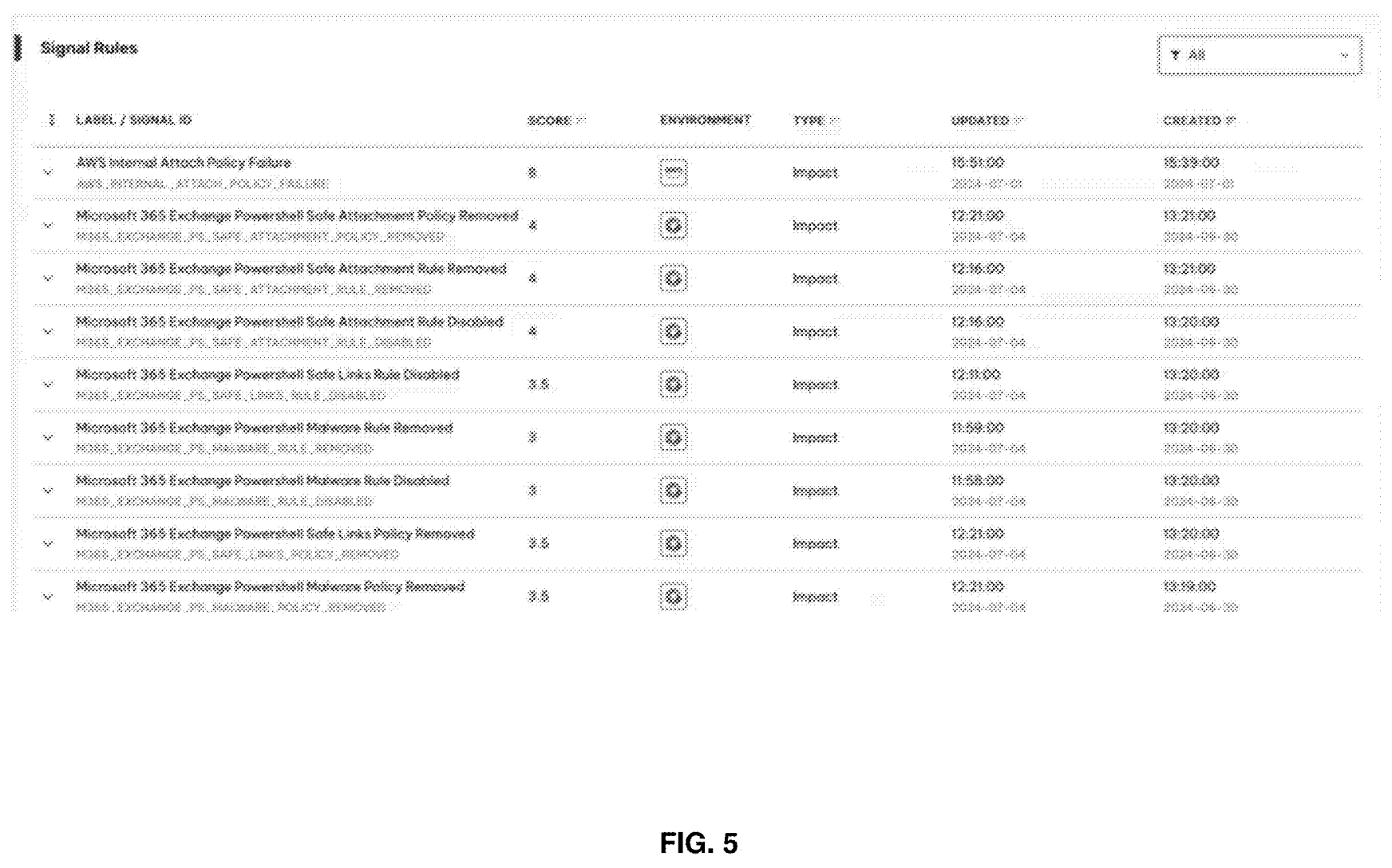

In some embodiments, one or more event signals may be environment-specific; that is, in some embodiments, one or more event signals may be associated with digital events on a particular environment or a particular set of environments (e.g., a distinct computing platform, service, or the like). For instance, as shown in FIG. 5, each event signal may be associated with a distinct environment. Additionally, or alternatively, in some embodiments, one or more event signals may be environment-agnostic; that is, in some embodiments, one or more event signals may be associated with digital events in any environment.

In some embodiments, the one or more event signals generated by S220 may include one or more categorized event signals that may each be classified into one of a plurality of tiers or categories associated with the corresponding event signal type. That is, each type of categorized event signal may be associated with a distinct set of tiers or categories (e.g., "low," "medium," "high", and/or the like) that relates to a respective event signal. In various embodiments, tiers or categories may indicate a severity of the corresponding event signal, a confidence of the corresponding event signal, an impact of the corresponding event signal, and/or any other degree or categorization suitable for classifying a particular categorized event signal. As a non-limiting example, a categorized event signal may comprise an event signal associated with a corresponding tier of "high" selected by S220 from a set of tiers "low," "medium," and "high" associated with the categorized event signal type. In this example, the tier may be associated with a severity of the corresponding event signal (e.g., high severity). It shall be noted that, in some embodiments, categorized event signals may be associated with one or more nominal categories that may represent separate categories or classes of a particular event signal type rather than a set of ordinal tiers.

In some embodiments, S220 may function to generate each distinct event signal independently, such that generation and/or evaluation of each distinct event signal may occur without dependency on other event signals. In such embodiments, each event signal may represent a discrete aspect or feature of a digital event, generated based on associated event signal logic and detection criteria.

Stated another way, in one or more embodiments, in response to generating a session object, the system or service implementing method 200 may function to generate, in real-time or near real-time, a plurality of suspicious event signal objects in response to assessing a plurality of digital events included in the session object against a corpus of suspicious event detection instructions. It shall be recognized that, in some embodiments, a total number of the plurality of suspicious event signal objects generated by the identity-based threat detection and response service may be less than a total number of the plurality of digital events included in the session object. A suspicious event signal object, in some embodiments, may comprise a structured representation of detected suspicious activity derived from one or more digital events (e.g., a single digital event, a plurality of distinct digital events, etc.), the structured representation including at least one of: an identifier of the corresponding digital event, an identifier of the digital account, an identifier of the computing environment, a timestamp, a detection rule identifier, and one or more attribute values associated with the suspicious activity. Stated differently, in some embodiments, a suspicious event signal object may represent an intermediate detection artifact generated prior to generation of a security alert and configured to capture a subset of the digital events that satisfy at least one suspicious event detection instruction.

It shall be recognized that, in one or more embodiments, the one or more attribute values may include an affected resource attribute that identifies a resource created, accessed, modified, or deleted by a respective digital event. For example, when the respective digital event corresponds to a database creation operation (e.g., "CreateDatabase"), the affected resource attribute may identify a database (e.g., "InvoiceDatabase") created by the database creation operation. In other words, the affected resource attribute may represent a distinct attribute type that specifies a target resource (e.g., digital asset, computing resource, etc.) impacted or affected by the respective digital event.

For instance, in a non-limiting example, each suspicious event signal object of the plurality of suspicious event signal objects may be generated based on a respective digital event of the plurality of digital events included in the session object satisfying at least one suspicious event detection instruction of the corpus of suspicious event detection instructions. Accordingly, in such a non-limiting example, the system or service implementing method 200 may function to determine a signal impact score and a signal suspicion score for a respective suspicious event signal object of the plurality of suspicious event signal objects.

The signal impact score determined for the respective suspicious event signal object, in such an embodiment, may specify a first distinct numerical value representing a degree to which the respective digital event corresponding to the respective suspicious event signal object changes an operating state of the computing environment of the subscribing entity. Stated differently, the signal impact score may quantify an extent to which the respective digital event (or the respective suspicious event signal object) results in a modification, enablement, disablement, creation, deletion, or reconfiguration of one or more computing resources within the computing environment. In certain embodiments, digital events that alter logging configurations, modify access control policies, create or delete credentials, or change security-relevant settings may be associated with relatively higher signal impact scores than digital events that retrieve information without modifying the computing environment.

The signal suspicion score determined for the respective suspicious event signal object specifies a second distinct numerical value representing a degree to which the respective digital event corresponding to the respective suspicious event signal object is suspicious. Stated differently, the signal suspicion score may quantify a likelihood that the respective digital event (or the respective suspicious event signal object) is indicative of malicious, unauthorized, anomalous, or policy-violating activity within the computing environment. In some embodiments, the signal suspicion score may be determined based on one or more contextual attributes associated with the respective digital event, including but not limited to a source Internet Protocol address, a geographic location, a user agent string, a time of occurrence, a deviation from historical behavior associated with the digital account, a deviation from a baseline behavioral profile associated with the computing environment, or a correlation with one or more known threat indicators. Digital events occurring from previously unseen network locations, involving atypical privilege use, or exhibiting abnormal access patterns relative to historical baselines may be associated with relatively higher signal suspicion scores than digital events consistent with established usage patterns.

Figure 4:
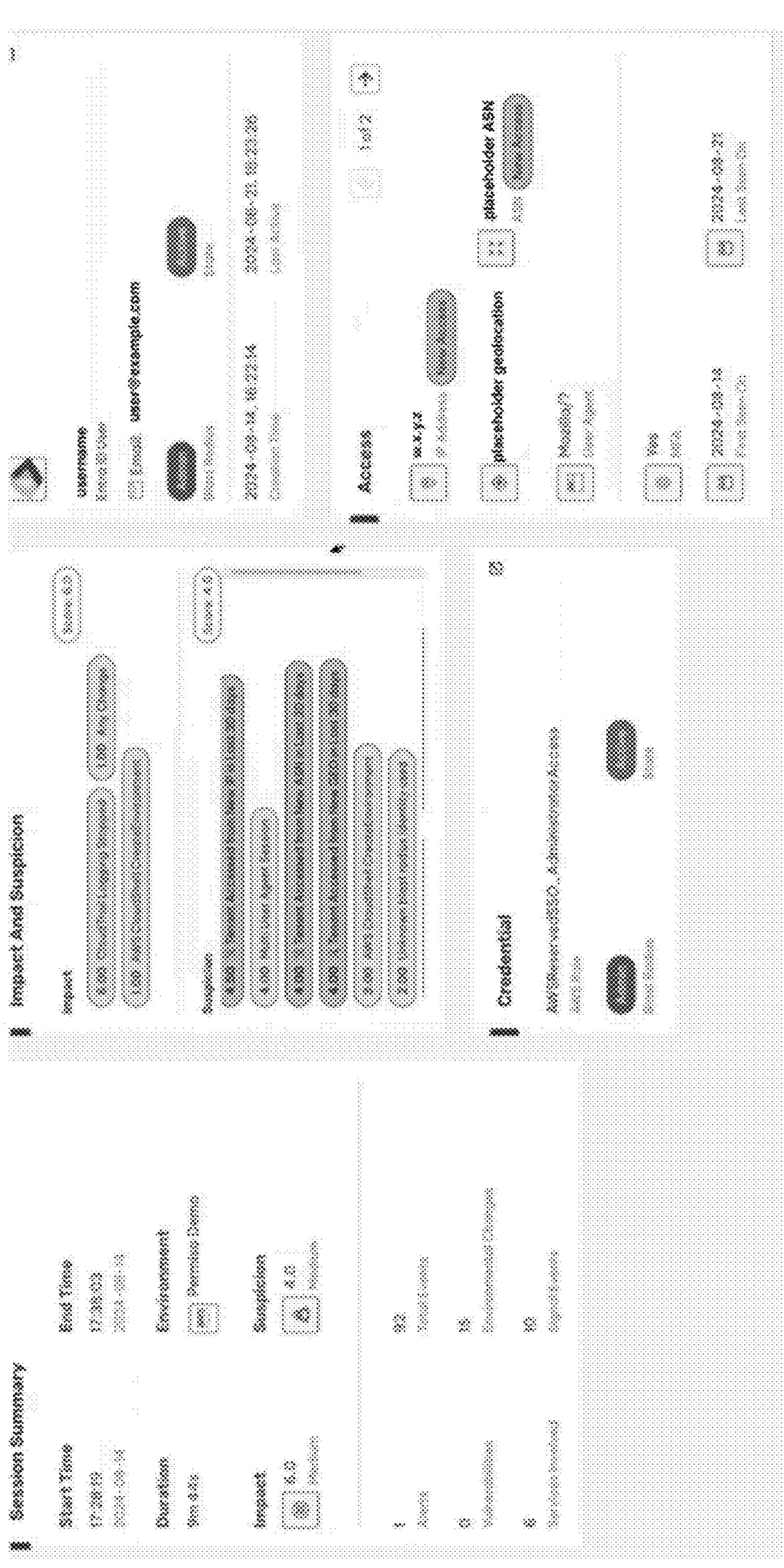
FIG. 4 illustrates an example interface for surfacing event signals in a session in accordance with one or more embodiments of the present application.

Accordingly, in one or more embodiments, the system or service implementing method 200 may function to attribute, in real-time or near real-time, the signal impact score and the signal suspicion score determined for the respective suspicious event signal object to the respective suspicious event signal object and/or display, on a session details graphical user interface, the signal impact score and the signal suspicion score determined for the respective suspicious event signal object in association with the session object, as shown generally by way of example in FIG. 4. Stated another way, in one or more embodiments, the system or service implementing method 200 may function to determine at least one of a signal impact score and a signal suspicion score for each suspicious event signal object of the plurality of suspicious event signal objects.

Additionally, or alternatively, in such an embodiment, the system or service implementing method 200 may function to determine a session impact score for the session object based on identifying a maximum signal impact score from a plurality of signal impact scores collectively corresponding to the plurality of suspicious event signal objects, wherein the session impact score determined for the session object specifies a first distinct numerical value representing a degree to which the plurality of digital events included in the session object changes an operating state of the computing environment of the subscribing entity. Stated another way, the session impact score may represent an aggregate or session-level quantification of an extent to which the collective digital events of the session object modify, enable, disable, create, delete, or reconfigure one or more computing resources within the computing environment. In certain embodiments, the session impact score may correspond to the highest signal impact score among the plurality of suspicious event signal objects, such that the session impact score reflects a most impactful digital event occurring during the session. In other embodiments, the session impact score may be determined based on a weighted combination, average, or other aggregation of the plurality of signal impact scores associated with the plurality of suspicious event signal objects included in the session object.

Additionally, or alternatively, in such an embodiment, the system or service implementing method 200 may function to determine a session suspicion score for the session object based on identifying a maximum signal suspicion score from a plurality of signal suspicion scores collectively corresponding to the plurality of suspicious event signal objects, wherein the session suspicion score determined for the session object specifies a second distinct numerical value representing a degree to which the plurality of digital events included in the session object are suspicious. Stated another way, the session suspicion score may represent a session-level quantification of a likelihood that one or more of the plurality of digital events included in the session object correspond to malicious, unauthorized, anomalous, or policy-violating activity within the computing environment. In certain embodiments, the session suspicion score may correspond to the highest signal suspicion score among the plurality of suspicious event signal objects, such that the session suspicion score reflects a most suspicious digital event occurring during the session. In other embodiments, the session suspicion score may be determined based on a weighted combination, average, cumulative total, or other aggregation of the plurality of signal suspicion scores associated with the plurality of suspicious event signal objects included in the session object.

Accordingly, in one or more embodiments, the system or service implementing method 200 may function to display, on a session details graphical user interface, the session impact score and the session suspicion score determined for the session object in association with the session object, as shown generally by way of example in FIG. 4.

Figure 13:
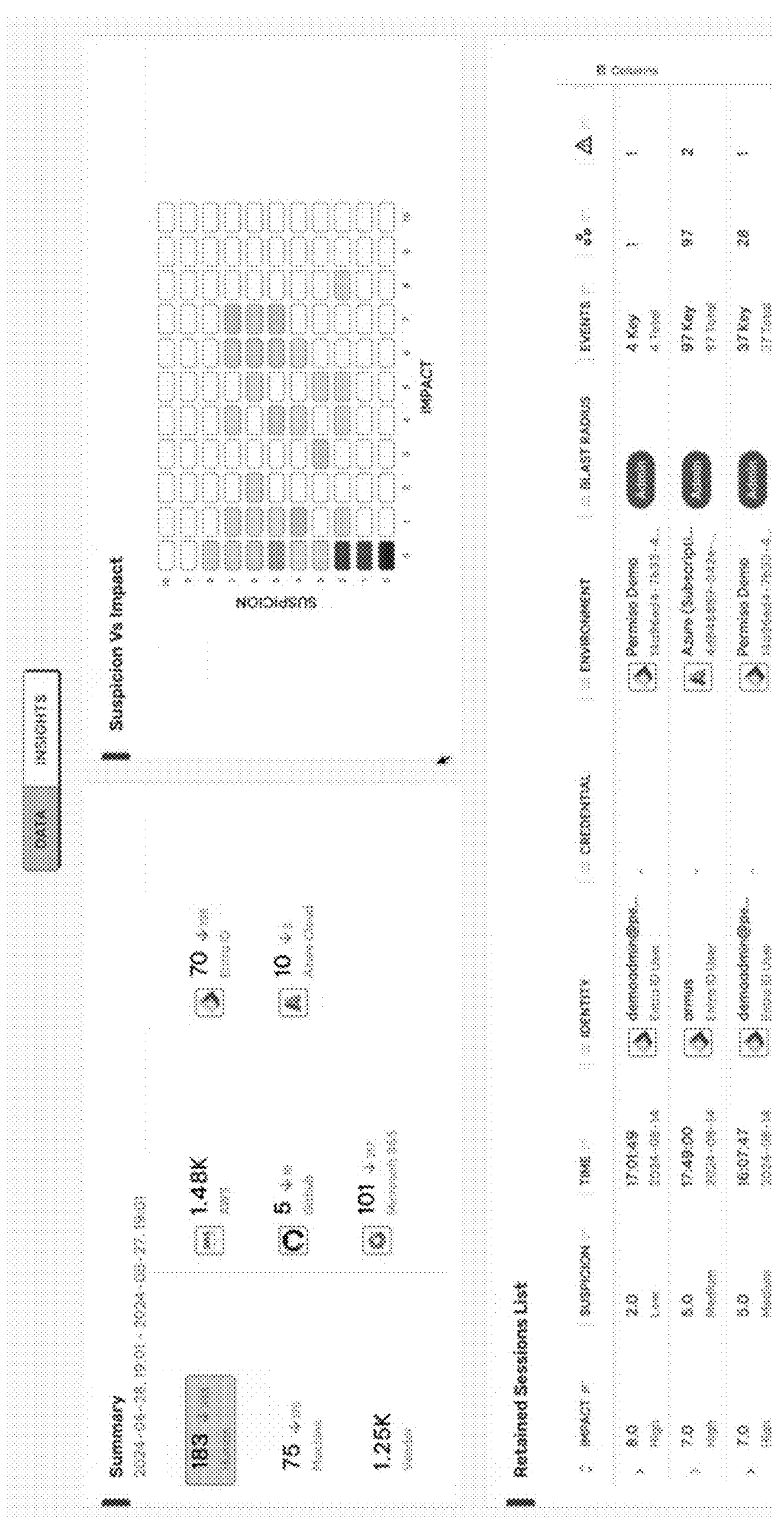
FIGS. 13-18 illustrate example graphical user interfaces in accordance with one or more embodiments of the present application.
Figure 14A:
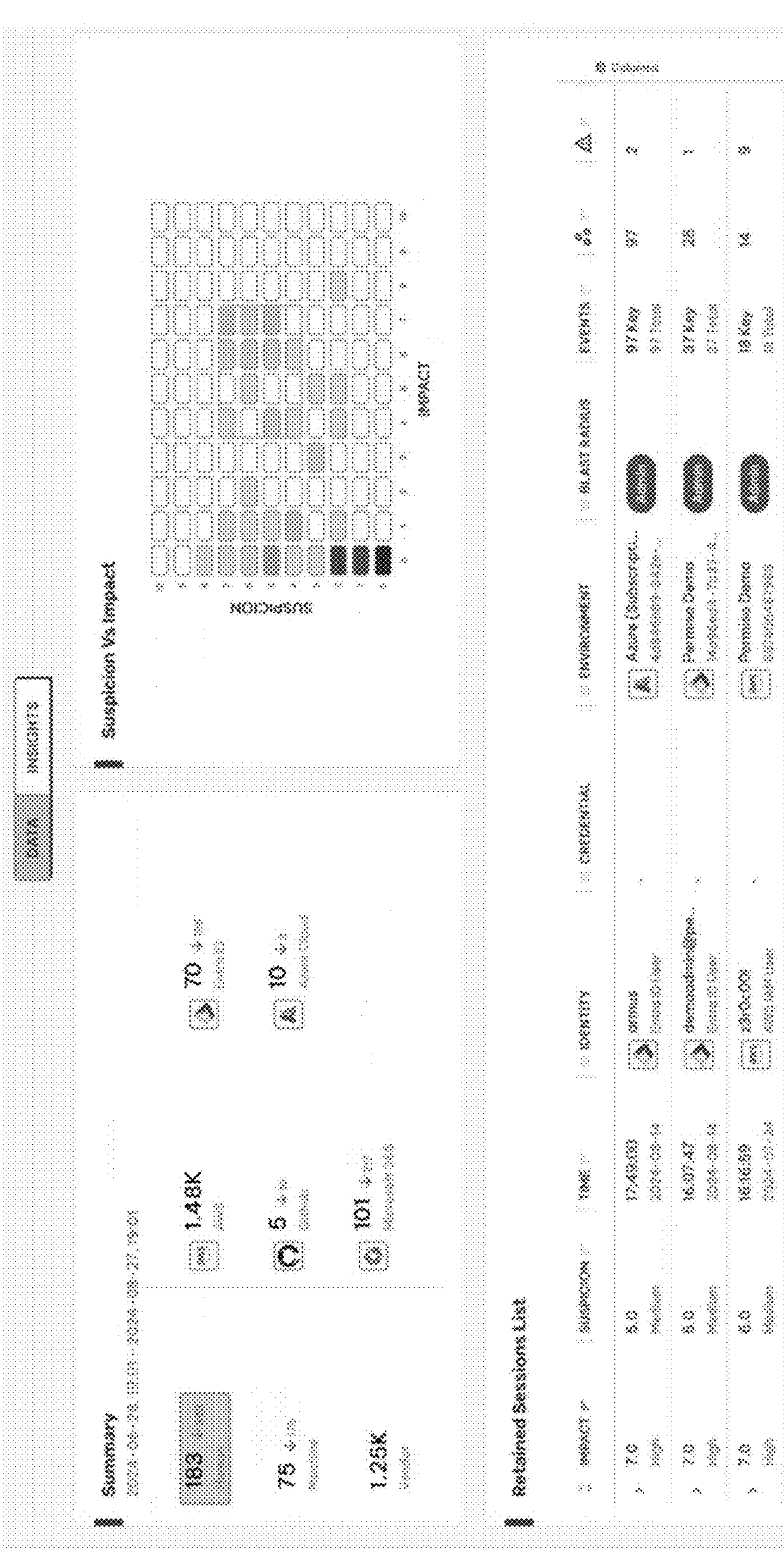
Figure 14B:
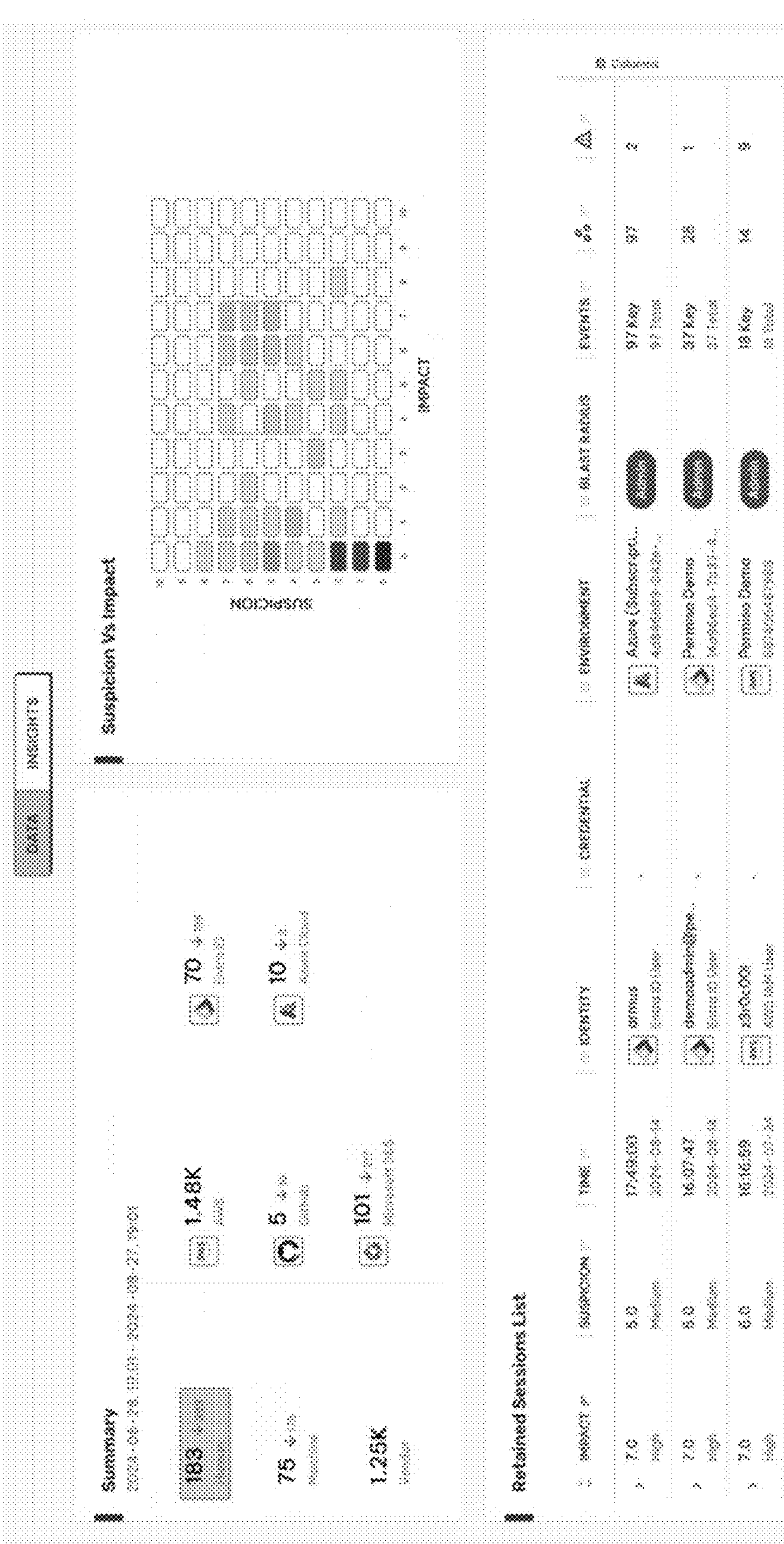

Additionally, or alternatively, in one or more embodiments, the system or service implementing method 200 may enable a user to perform threat hunting based in part on session impact scores and session suspicion scores. In such an embodiment, the system or service implementing method 200 may function to display, on a threat hunting graphical user interface, a session object data table and an interactive heat map, as shown generally by way of example in FIG. 13, FIG. 14A, and FIG. 14B. The session object data table, in one or more embodiments, may include a plurality of session objects generated for a subscribing entity during a target time span. The interactive heat map, in one or more embodiments, may include a first axis corresponding to discrete session impact score values, a second axis corresponding to discrete session suspicion score values, and a plurality of selectable cells arranged in a two-dimensional grid, wherein each cell of the plurality of selectable cells corresponds to a unique combination of (i) a respective session impact score value of the discrete session impact score values and (ii) a respective session suspicion score value of the discrete session suspicion score values. Alternatively, in one or more embodiments, the interactive heat map may include a first axis corresponding to session impact score values and a second axis corresponding to session suspicion score values, wherein the session impact score values and/or the session suspicion score values comprise continuous numerical values, including decimal values such as 0.1, 0.25, 0.5, 1.75, 3.2, 6.85, and 9.95. In such embodiments, the interactive heat map may present a continuous or gradient-based representation along at least one of the first axis or the second axis, and selectable regions of the interactive heat map may correspond to defined ranges of decimal score values (e.g., 2.0-2.5, 4.25-4.75, or 7.5-8.0) rather than solely to individual discrete score pairings.

In one or more embodiments, the system or service implementing method 200 may function to receive a continuous input sequence from the subscribing entity. The subscribing entity generates the continuous input sequence by at least selecting, using a mouse cursor, a first selectable cell of the plurality of selectable cells included in the interactive heat map, moving the mouse cursor across the two-dimensional grid while the first selectable cell is selected, and releasing the mouse cursor at a second selectable cell of the plurality of selectable cells included in the interactive heat map. It shall be recognized that the second selectable cell is distinct from the first selectable cell. Accordingly, in one or more embodiments, in response to receiving the continuous input sequence, the system or service implementing method 200 may function to display a rectangular boundary (e.g., graphical boundary) on the interactive heat map extending between the first selectable cell and the second selectable cell, wherein the first selectable cell and the second selectable cell define opposing corners of the rectangular boundary. Furthermore, in such an embodiment, in response to receiving the continuous input sequence, the system or service implementing method 200 may function update, in real-time or near real-time, the session object data table to display a reduced subset of the plurality of session objects, wherein each session object included in the reduced subset has a session impact score and a session suspicion score corresponding to a respective selectable cell located within the rectangular boundary.

It shall be recognized that, in one or more embodiments, while the subscribing entity moves the mouse cursor across the two-dimensional grid after selecting the first selectable cell, the system or service implementing method 200 may function to dynamically render, in real-time or near real-time, the rectangular boundary as a graphical overlay on the interactive heat map, the rectangular boundary may expand or contract in real-time as the mouse cursor traverses selectable cells. In such embodiments, the graphical overlay may visually indicate the subset of selectable cells currently encompassed between the first selectable cell and the current cursor position (e.g., current position of mouse cursor) prior to release of the mouse cursor. That is, in one or more embodiments, as the mouse cursor moves across the two-dimensional grid after selection of the first selectable cell, the system or service implementing method 200 may continuously adjust the dimensions of the rectangular boundary such that one corner of the rectangular boundary remains anchored to the first selectable cell and an opposing corner tracks the selectable cell currently aligned with the mouse cursor position. Accordingly, the graphical overlay may update in real-time to reflect a current set of selectable cells encompassed by the rectangular boundary prior to release of the mouse cursor.

In one or more embodiments, the system or service implementing method 200 may present, on the threat hunting graphical user interface, an interactive two-dimensional grid in which discrete session impact score values are arranged along a first axis and discrete session suspicion score values are arranged along a second axis, such that each selectable cell of the interactive two-dimensional grid represents session objects having a specific pairing of session impact score and session suspicion score values. The subscribing entity may select a first cell corresponding to a first pairing of session impact score and session suspicion score values and drag across the grid to a second cell corresponding to a second pairing of session impact score and session suspicion score values, thereby defining a rectangular region spanning multiple score pairings. In response to that selection, the system or service implementing method 200 may identify session objects whose session impact scores and session suspicion scores correspond to any of the selectable cells within the defined rectangular region and update the session object data table to display only those identified session objects.

At least one technical benefit of enabling threat hunting using the interactive heat map based on session impact scores and session suspicion scores includes improving computational efficiency and scalability of session object retrieval and filtering operations. By precomputing and assigning discrete session impact score values and session suspicion score values to session objects and organizing the session objects into corresponding score-based buckets represented by selectable cells of the two-dimensional grid, the system reduces the complexity of search operations required to identify candidate session objects. Rather than executing repeated full-table scans or dynamically recomputing filtering conditions across the plurality of session objects, the system may determine membership of session objects within a selected rectangular region by evaluating bounded score ranges corresponding to the selected cells. This score-bucketed architecture reduces processor utilization, memory access operations, and query latency associated with interactive threat hunting across large volumes of session telemetry.

Another technical benefit of enabling threat hunting using the interactive heat map includes accelerating identification of session objects indicative of potentially malicious activity. By arranging session objects according to discrete session impact score values and discrete session suspicion score values and enabling selection of bounded score regions within the interactive heat map, the system reduces the time required to identify session objects that satisfy defined risk thresholds. Rather than sequentially evaluating individual session objects, the system enables rapid detection of session objects whose respective score values fall within a selected range, thereby accelerating detection of high-risk sessions objects within large volumes of session objects.

Event Signal Generation

S220 may function to generate one or more event signals based on mapping or applying one or more heuristic-based signal rules and/or logic to the corpus of digital event data. In some such embodiments, the one or more heuristic-based signal rules may be predefined based on one or more aspects or features of digital events (e.g., one or more action types). In some embodiments, S220 may function to evaluate the digital event data for a given digital event, and in turn S220 may function to generate one or more event signals indicating one or more aspects of the given digital event. As a non-limiting example, S220 may function to determine that a signal rule maps as valid for a digital event if one or more conditions defined by that signal rule are satisfied by that digital event (e.g., based on evaluating one or more aspects or features of that digital event in the collected digital event data).

In various embodiments, S220 may function to generate a variety of different types of event signals. Additionally, in some embodiments, one or more of the generated event signals may be generated based on mapping digital event data to a corresponding signal rule. As a non-limiting example, as illustrated in FIG. 5, S220 may function to generate, based on received digital event data, an internal attach policy failure signal, a safe attachment policy removed signal, a safe attachment rule removed signal, a safe attachment rule disabled signal, a safe links rule disabled signal, a malware rule removed signal, a malware rule disabled signal, a links policy removed signal, a malware policy removed signal, and/or one or more other event signals. In this example, an event signal of a corresponding event signal type may be generated if S220 receives event data that matches the corresponding event signal rule. For instance, if a safe attachment policy is removed by an actor in a distinct digital event, S220 may function to map the digital event data that identifies the attachment policy has been removed to the "safe attachment policy removed" event signal rule, and in turn S220 may function to generate a safe attachment policy removed event signal for the distinct digital event.

In some embodiments, signal rules and/or logic may function to map one or more digital events to one or more event signals. In various embodiments, signal rules and/or logic may be encoded in one or more rule data objects (e.g., in programming code). Additionally, or alternatively, in some embodiments, signal rules and/or logic may be defined in one or more JSON configuration files. Therefore, in one or more embodiments, S220 may function to evaluate signal rules and/or logic from one or more data objects comprising programming code and/or one or more JSON configuration files against collected digital event data. In such embodiments, when S220 identifies one or more distinct digital events in the collected digital event data that satisfy or match the signal rules and/or logic for a given event signal, S220 may function to apply that given event signal to each of the one or more distinct digital events.

Additionally, or alternatively, S220 may function to generate one or more event signals based on providing digital event data from the corpus of digital event data to an event signal generation model. In such embodiments, the event signal generation model may comprise a machine learning model, or an ensemble of machine learning models, that may be trained to identify and generate one or more event signals based on an input of digital event data. In some embodiments, the event signal generation model may function to identify anomalous behavior in one or more digital events based on the input digital event data, and in turn the event signal generation model may function to output one or more corresponding event signals that may indicate anomalous behavior in one or more digital events associated with the input digital event data.

For instance, in a non-limiting example, the event signal generation model may receive digital event data associated with a distinct digital event, and in turn the event signal generation model may function to classify the distinct digital event as either a digital event with a human actor or a digital event with a machine actor. In such an example, the event signal generation model may then function to output either a human actor event signal or a machine actor event signal that may be associated with the distinct digital event. It shall be noted that this example is non-limiting, and the event signal generation model may function to generate a variety of other types of event signals associated with one or more digital events.

Stated another way, in one or more embodiments, in response to generating a session object that includes a plurality of digital events, the system or service implementing method 200 may function to provide the session object to an actor-type machine learning classification mode and, in response, the actor-type machine learning classification model may function to compute an actor-type classification inference comprising a probability of a machine actor using the digital account to perform the plurality of digital events included in the session object. In such an embodiment, the system or service implementing method 200 may function to assess, in real-time or near real-time, a security threat of the session object using one of: a first set of suspicious event detection instructions of the corpus of suspicious event detections instructions operably configured to assess the plurality of digital events included in the session object as machine activity when the probability satisfies a predetermined threshold, and a second set of suspicious event detection instructions of the corpus of suspicious event detections instructions operably configured to assess the plurality of digital events included in the session object as human activity when the probability fails to satisfy the predetermined threshold.

In one or more embodiments, S220 may function to determine, based on one or more algorithms, heuristics (e.g., a plurality of actor-type classification heuristics or the like), and/or rules, whether the session actor of a constructed session object is a machine (artificial) actor (e.g., a computer, a serverless function, and/or the like) or a human actor (e.g., a human user). In some embodiments, upon determining that the session actor is a machine actor, S220 may further function to classify the machine actor as a service actor (service activity) or a vendor actor (vendor activity). Additionally, in some embodiments, S220 may function to determine whether the session is an API session, which may include digital events initiated or performed via API calls or functions, or a console session, which may include digital events initiated or performed via a console or user interface.

In some embodiments, S220 may function to employ a human-machine classification model to determine whether the session actor of a session is a machine actor or a human actor. In one or more such embodiments, the human-machine classification model may be trained based on a training corpus of digital event data to classify digital event actors (entities) as machine actors or human actors. In some such embodiments, S220 may function to provide the digital event data of the digital events of the session as input to the human-machine classification model. In turn, the human-machine classification model may function to output an actor classification label that may identify the session actor as a machine actor (e.g., a machine actor label) or a human actor (e.g., a human actor label).

In one or more embodiments, in response to constructing (e.g., generating) a respective (e.g., individual) session object, the system or service implementing method 200 may function to provide, as input, the respective individual session object to an actor-type machine learning classification model and, in turn, the actor-type machine learning classification model may function to compute an actor-type classification inference comprising a confidence score indicating a probability of a machine actor using the distinct digital account of the respective individual session object to perform the distinct set of digital events included in the respective individual session object. Accordingly, in such an embodiment, the system or service implementing method 200 may function to assess, in real-time or near real-time, a security threat of the respective individual session object using a first set of threat detection instructions operably configured to assess the distinct set of digital events of the respective individual session object as machine activity when the confidence score satisfies a predetermined confidence score threshold or a second set of threat detection instructions operably configured to assess the distinct set of digital events of the respective individual session object as human activity when the confidence score fails to satisfy the predetermined confidence score threshold. Stated another way, the actor-type machine learning classification model may enable the system to automatically differentiate between automated and human-driven digital activity in real-time, allowing the system to dynamically tailor subsequent threat detection, response, and signal attribution processes based on the nature of the actor performing the activity. In one or more embodiments, the actor-type machine learning classification model may be trained using a corpus of labeled training data samples, where each labeled training data sample of the corpus of labeled training data samples includes a distinct session object and a corresponding label indicating whether the digital activity (e.g., digital events) represented by the session object was performed by a human actor or a machine actor. The training process may include extracting session-level features from the corpus of labeled training data samples, such as event timing distributions, action frequency, and interaction diversity, and using those features to train a machine learning model to distinguish between human and machine activity based on learned behavioral patterns.

In one or more embodiments, human activity may be characterized by irregular or varied interaction patterns, such as non-uniform timing between digital events, diverse sequences of actions, and contextual pauses that reflect decision-making or navigation behavior within an interface. Human-initiated sessions may also include evidence of manual interaction, such as console-based logins, user-interface actions, or commands entered through interactive sessions. In contrast, machine activity may be characterized by highly consistent or repetitive event sequences, uniform timing intervals, and sustained or periodic bursts of digital activity that occur without interactive context. Machine actors may also perform operations through APIs or service accounts, often executing large volumes of requests (e.g., hundreds of digital events, etc.) within a narrow time window (e.g., 5 minutes, etc.).

In one or more embodiments, in response to constructing a respective individual session object, the system or service implementing method 200 may function to assess the distinct set of digital events associated with the respective individual session object and detect, based on the assessment, that the respective individual session object corresponds to an application programming interface-type session when metadata included in the distinct set of digital events of the respective individual session object indicates that access to a respective computing environment of the respective individual session object was obtained using an application programming interface (API) key or a console-type session when the distinct set of digital events of the respective individual session object is indicative of a human user using one or more graphical user interfaces of the respective computing environment of the respective individual session object to perform the distinct set of digital events associated with the respective individual session object. Accordingly, in such an embodiment, the system or service implementing method 200 may function to attribute an API session label to the respective individual session object when the respective individual session object is detected to be the application programming interface-type session or a console session label to the respective individual session object when the respective individual session object is detected to be the console-type session.

It shall be noted that, in one or more embodiments, S220 may additionally or alternatively function to employ both the event signal generation model and heuristic-based signal rules and/or logic to generate or construct one or more event signals. As a non-limiting example, S220 may function to generate one or more event signals using heuristic-based signal rules based on predefined behavior or threat patterns. In this example, S220 may additionally function to employ the event signal generation model to identify activity that may deviate from normal operational activity or expected user behavior based on an input of digital event data, and in turn the event signal generation model may function to generate one or more event signals that may indicate distinct anomalous deviations in one or more digital events. It shall be noted that the above example is non-limiting, and S220 may function to employ heuristic-based signal rules and/or the event signal generation model to identify and/or generate event signals in any suitable manner to generate event signals for one or more digital events.

In one or more embodiments, S220 may function to additionally construct a bi-directional map of event signals to digital events. In such embodiments, the bi-directional map may function to link each generated event signal to the digital event that it marks, and vice-versa, such that the bi-directional map may function to associate each digital event to its corresponding event signals, and each event signal to its corresponding digital event.

Additionally, or alternatively, in one or more embodiments, S220 may function to generate a machine learning-informed suspicious event signal object for the session object based in part on the plurality of digital events included in the session object. In such an embodiment, generating the machine learning-informed suspicious event signal object may include providing the plurality of digital events included in the session object as input to one or more machine learning models (e.g., large language models, machine learning classification models, anomaly detection machine learning models, etc.), detecting, by the one or more machine learning models, that at least one access attribute associated with at least one digital event of the plurality of digital events has not been previously observed for the digital account within a predefined historical time period (e.g., last 30 days), and generating, in real-time or near real-time, the machine learning-informed suspicious event signal object that includes the at least one access attribute in response to detecting that the at least one access attribute has not been previously associated with the digital account within the predefined historical time period (e.g., last 30 days). For instance, in a non-limiting example, the machine learning-informed suspicious event signal object may indicate that a respective tenant was accessed from a new internet protocol address (IP) in the last 30 days. In another non-limiting example, the machine learning-informed suspicious event signal object may indicate that a respective tenant was accessed from a new geographical location in the last 30 days.

It shall be recognized that, in such an embodiment, the one or more machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the one or more machine learning models may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), a large language model (e.g., GPT, GPT-2, GPT-3, GPT-3.5, GPT-4, any suitable generative pretrained transformer model, and the like), a language model, an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

It shall be recognized that, in some embodiments, the plurality of digital events included in a respective session object may be provided as input to a suspicious event signal object generator. In such an embodiment, the suspicious event signal object generator may assess each digital event of the plurality of digital events against a corpus of suspicious event detection instructions to determine whether a respective digital event satisfies at least one suspicious event detection instruction included in the corpus of suspicious event detection instructions. For a respective digital event determined to satisfy at least one suspicious event detection instruction, the suspicious event signal object generator may generate a corresponding suspicious event signal object associated with the respective digital event. In one or more embodiments, each suspicious event signal object generated by the suspicious event signal object generator may include an identifier of the respective digital event, an identifier of the suspicious event detection instruction satisfied, and one or more associated attributes including a signal impact score and a signal suspicion score. Digital events that do not satisfy any suspicious event detection instruction may not result in generation of a suspicious event signal object. In some implementations, the suspicious event signal object generator may operate in real-time or near real-time as digital events are ingested into the session object, thereby enabling incremental generation of suspicious event signal objects contemporaneously with occurrence of the underlying digital events.

At least one technical benefit of generating a plurality of suspicious event signal objects from the plurality of digital events included in a session object includes improving computational efficiency and signal-to-noise ratio in threat detection processing. By evaluating each digital event against the corpus of suspicious event detection instructions and generating a suspicious event signal object only when a respective digital event satisfies at least one suspicious event detection instruction, the system filters and transforms a high-volume stream of digital events into a reduced set of structured signal objects representing suspicious activity. This transformation reduces memory consumption, processor cycles, and downstream analytic overhead otherwise required to repeatedly evaluate non-relevant digital events (e.g., not suspicious digital events or the like). Additionally, because each suspicious event signal object encapsulates structured metadata and associated signal impact and signal suspicion scores, subsequent session-level scoring and alert generation operations may be performed on a smaller, enriched dataset, thereby reducing computational latency and improving responsiveness of the identity-based threat detection and response service.

For instance, in a non-limiting example, in response to assessing a plurality of digital events included in a session object against a corpus of suspicious event detection instructions, the system or service implementing method 200 may function to generate a first suspicious event signal object of the plurality of suspicious event signal objects in response to detecting that a first distinct digital event of the plurality of digital events included in the session object satisfies a first suspicious event detection instruction included in the corpus of suspicious event detection instructions. Additionally, or alternatively, in such a non-limiting example, in response to assessing the plurality of digital events included in the session object against the corpus of suspicious event detection instructions, the system or service implementing method 200 may function to generate a second suspicious event signal object of the plurality of suspicious event signal objects in response to detecting that a second distinct digital event of the plurality of digital events included in the session object satisfies a second suspicious event detection instruction included in the corpus of suspicious event detection instructions. Additionally, or alternatively, in such a non-limiting example, in response to assessing the plurality of digital events included in the session object against the corpus of suspicious event detection instructions, the system or service implementing method 200 may function to generate a third suspicious event signal object of the plurality of suspicious event signal objects in response to detecting that the second distinct digital event of the plurality of digital events included in the session object satisfies a third suspicious event detection instruction included in the corpus of suspicious event detection instructions. Additionally, or alternatively, in such a non-limiting example, in response to assessing the plurality of digital events included in the session object against the corpus of suspicious event detection instructions, the system or service implementing method 200 may function to foregoing generating any suspicious event signal objects for a third distinct digital event included in the session object in response to detecting that the third distinct digital event fails to satisfy any suspicious event detection instruction included in the corpus of suspicious event detection instructions.

Stated another way, for a given digital event included in the session object, the system or service implementing method 200 may generate one suspicious event signal object, a plurality of distinct suspicious event signal objects, or no suspicious event signal objects depending on whether, and how many, suspicious event detection instructions of the corpus of suspicious event detection instructions are satisfied by the given digital event. In certain embodiments, a single digital event may satisfy multiple distinct suspicious event detection instructions, thereby resulting in generation of multiple distinct suspicious event signal objects corresponding to the same digital event. Conversely, digital events that fail to satisfy any suspicious event detection instruction may not result in generation of a suspicious event signal object. Accordingly, the plurality of suspicious event signal objects generated for the session object may represent a filtered and instruction-specific subset of the plurality of digital events included in the session object that are suspicious.

Impact and Suspicion Scores

In one or more embodiments, S220 may function to assign an impact score and/or a suspicion score to each generated event signal (e.g., suspicious event signal object or the like). The term "impact score," as generally used herein, may refer to a value assigned to an event signal that may quantify a degree of change introduced into a digital environment by the specific aspect or feature of a digital event represented by the event signal. The term "suspicion score," as generally used herein, may refer to a value assigned to an event signal that may quantify the likelihood that the aspect or feature of a digital event represented by the event signal is anomalous or indicative of malicious activity within a digital environment. In various embodiments, the impact score and the suspicion score of an event signal may enable a prioritization of security resources on more critical event signals.

In some embodiments, S220 may function to assign an impact score and a suspicion score to each generated event signal based on the event signal type of the event signal. In some such embodiments, each event signal type may be associated with a predefined impact score and/or a predefined suspicion score that may be applied to generated event signals of that type. Additionally, or alternatively, in some embodiments S220 may function to compute an impact score and/or a suspicion score for a given event signal based on logic and/or computations applied to event data associated with the corresponding event of the event signal. Additionally, or alternatively, in some embodiments, S220 may function to implement an impact and suspicion scoring model comprising one or more machine learning models that may receive, as input, digital event data associated with a distinct event signal, and compute, as output, an impact and/or suspicion score for the distinct event signal.

In some embodiments, each signal impact score and each signal suspicion score of a distinct event and/or session may affect an impact score and suspicion score of the distinct event and/or session. In some such embodiments, the maximum signal impact score and the maximum signal suspicion score for a distinct digital event or session may be applied as the impact score and suspicion score of that distinct event or session; that is, in some embodiments, each distinct event or session may have an impact and suspicion score that may be based on the highest impact and suspicion scores among its associated event signals. Accordingly, in such embodiments, impact and suspicion scores for digital events or sessions may reflect the most critical or important event signals associated with those digital events or sessions. Additionally, or alternatively, impact and suspicion scores for distinct digital events or sessions may be determined based on other logic and/or computations applied to the digital event data associated with the distinct digital events or sessions. Additionally, or alternatively, in some embodiments, the impact and suspicion scoring model may additionally or alternatively function to receive, as input, digital event data associated with a distinct digital event or session, and compute, as output, an impact score and/or a suspicion score for the distinct digital event or session.

User Interface: Event Signal Surfacing

Figure 3:
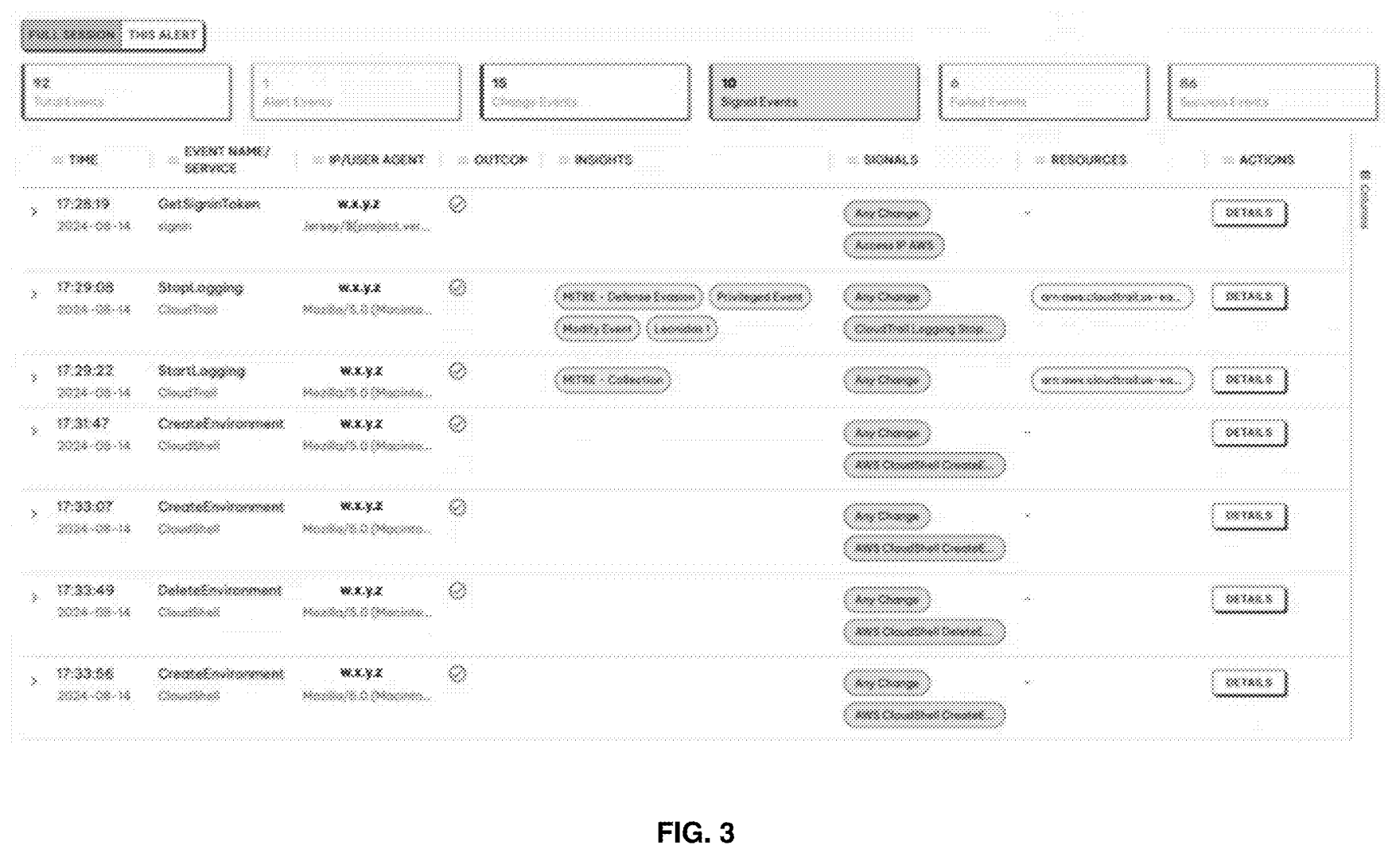

In some embodiments, S220 may function to display or surface one or more generated event signals via a cybersecurity intelligence user interface (e.g., a graphical user interface). In some embodiments, the cybersecurity intelligence user interface may include a window or region that may function to display a list of digital events included in a respective session object, as shown by way of example in FIG. 3. In such embodiments, the list of digital events associated with the respective session object may be arranged in a table comprising a set of rows, where each row may correspond to a distinct digital event. In some such embodiments, the table may include a set of columns, each column corresponding to a distinct property or attribute of a digital event. The columns may include, but are not limited to, a digital event timestamp column, a digital event name or service column, a digital event actor IP address column, a digital event outcome status column, a digital event insights column, a digital event signals column, a digital event resources column, and a digital event user actions column. In some embodiments, each digital event signal (e.g., signal tag, single object, etc.) generated by S220 for a corresponding digital event may be displayed in the digital event signals column in the row associated with the corresponding digital event, as shown by way of example in FIG. 3.

In some embodiments, the cybersecurity intelligence user interface may include a window or region that may function to display a session summary, as shown by way of example in FIG. 4. In such embodiments, each session may be associated with a set of one or more digital events, and the session summary window or region may include an impact and suspicion region that may surface or display the event signals generated by S220 for the associated set of one or more digital events. Additionally, in some such embodiments, the impact and suspicion region may surface or display the impact and suspicion scores for the displayed event signals. For instance, as shown byway of example in FIG. 4, the impact and suspicion region in a session summary window may include an impact sub-region and a suspicion sub-region, and each sub-region may include a graphical user interface object such as an event signal label for each event signal (e.g., suspicious event signal object) generated for digital events in the session (e.g., session object) that includes a corresponding impact score and/or a corresponding suspicion score. In this example, event signals with impact scores may be displayed in the impact sub-region and event signals with suspicion scores may be displayed in the suspicion sub-region, as illustrated in FIG. 4. In this example, each event signal label may include the name or identifier of the corresponding event signal. Additionally, in this example, each event signal label may include either the impact score or the suspicion score of the corresponding event signal, based on whether the event signal label is displayed in the impact sub-region or the suspicion sub-region, respectively.

2.30 Constructing One or More Threat Alerts Based on the One or More Event Signals S230, which includes constructing one or more threat alerts based on the one or more event signals, may function to construct one or more threat alerts based on identifying one or more specific event signals or one or more combinations of specific event signals. The term "threat alert," as generally used herein, may refer to a data construct comprising intelligence data that may provide information about potential or detected threats, anomalies, policy violations, and/or the like within a digital environment. S230 may function to construct a threat alert (e.g., security alert or the like) when specific event signals or a combination of event signals for a digital event meet predefined conditions that may suggest potential malicious or suspicious activity, including but not limited to unauthorized access attempts, policy violations, anomalous activities, and/or any other malicious or potentially malicious activity or activity pattern.

In one or more embodiments, S230 may function to construct one or more threat alerts based on identifying one or more specific event signals or one or more combinations of specific event signals. In some embodiments, each threat alert may be associated with a corresponding set of one or more event signals, such that S230 may function to construct a threat alert upon detecting that one or more event signals of the corresponding set of event signals has been generated for a given digital event (e.g., generated by S220). In some embodiments, S230 may function to evaluate input or incoming event signals against a mapping of threat alerts to event signal combinations. In such embodiments, S230 may function to initiate construction of a distinct threat alert when the corresponding set of event signals mapped to that threat alert are detected.

In some embodiments, S230 may function to evaluate each set of event signals based on an alert-specific logical detection framework that may determine when a threat alert should be constructed. In such embodiments, each set of event signals may comprise a logical structure of event signals that may incorporate logical conditions including, but not limited to, AND, OR, and NOT. In such embodiments, the logical structure may function to define one or more combinations of event signals of each set of event signals that S230 may evaluate to determine whether to construct the associated threat alert. As a non-limiting example, a distinct threat alert may be associated with a corresponding set of event signals comprising Signal A, Signal B, Signal C, and Signal D. In this example, the logical structure of the set of event signals may comprise: (Signal A OR Signal B) AND (Signal C OR Signal D). In this example, S230 may function to construct the distinct threat alert when S230 detects, for a given digital event, that either Signal A or Signal B is present as well as either Signal C or Signal D. It shall be noted that this example is non-limiting, and a logical structure of a set of event signals may comprise other suitable logical combinations of event signals.

Additionally, in some embodiments, S230 may function to identify a threat actor for a constructed threat alert. In such embodiments, S230 may function to identify the actor of the digital events of the set event signals associated with a constructed threat alert, and in turn S230 may function to identify that actor as a threat actor of the constructed threat alert. In such a way, S230 may function to identify potentially malicious or suspicious actors associated with threat alerts triggered by one or more suspicious or malicious event signals.

In one or more embodiments, the system or service implementing method 200 may function to generate, in real-time or near real-time, one or more security alerts for the session object based on assessing the plurality of suspicious event signal objects against predetermined alerting criteria. The predetermined alerting criteria, in some embodiments, may include a plurality of distinct alert rules. In such an embodiment, each alert rule of the plurality of distinct alert rules may include a condition for generating a respective security alert and an alert explainability template explaining the respective security alert. Accordingly, in one or more embodiments, at least a subset of a plurality of suspicious event signal objects may satisfy the condition of a respective alert rule of the plurality of distinct alert rules and, in turn, the system or service implementing method 200 may function to automatically generate a natural language description explaining a respective security alert by automatically inserting at least one target piece of data (e.g., an affected trail, etc.) included in the subset of the plurality of suspicious event signal objects into the alert explainability template of the respective alert rule.

Stated another way, in one or more embodiments, the system or service implementing method 200 may function to generate the respective security alert and a corresponding natural-language explanation by first identifying a subset of suspicious event signal objects that satisfy a condition specified by a respective alert rule and then programmatically populating the alert explainability template associated with the respective alert rule using one or more data elements extracted from the subset of suspicious event signal objects. In such embodiments, the alert explainability template may define fixed explanatory text and one or more dynamic insertion fields corresponding to attributes of the suspicious event signal objects, including without limitation identifiers of digital events, signal impact scores, signal suspicion scores, identifiers of digital accounts, identifiers of computing resources, timestamps, and network attributes. By binding structured data from the suspicious event signal objects to predefined insertion fields of the alert explainability template, the system may generate a consistent, deterministic natural-language description corresponding to the respective security alert without requiring manual analyst input.

Stated differently, in one or more embodiments, when a subset of the plurality of suspicious event signal objects satisfies the condition of a respective alert rule, the system or service implementing method 200 may function to generate the respective security alert and populate the alert explainability template associated with the respective alert rule using one or more attributes extracted from the subset of suspicious event signal objects. For example, the alert explainability template may include predefined explanatory text describing a security risk associated with a particular signal type and one or more insertion fields configured to receive structured data elements, such as an identifier of an affected computing resource, a timestamp, or an identifier of a digital account. In such embodiments, the system may automatically insert a structured resource identifier (e.g., an affected trail, a uniform resource name or cloud resource identifier) corresponding to a computing resource specified within the subset of suspicious event signal objects into the insertion field of the alert explainability template, thereby generating a natural-language description that explains the security alert and identifies the affected computing resource. It shall be recognized that an affected trail may be a cloud logging resource within the computing environment that was the target of a logging-related digital event (such as cloudtrail:StopLogging) and whose logging functionality, configuration, or recording state was altered as a result of that event.

For instance, in a non-limiting example, the predetermined alerting criteria may specify a respective alert rule, and the respective alert rule may specify generating a subject security alert when the identity-based threat detection and response service generates a subject suspicious event signal object corresponding to a target type. In such a non-limiting example, the respective alert rule may generate one of the one or more security alerts in response detecting that one of the plurality of suspicious event signal objects corresponds to the target type.

In another non-limiting example, the predetermined alerting criteria may specify a respective alert rule, and the respective alert rule may specify generating a subject security alert when the identity-based threat detection and response service generates a first subject suspicious event signal object of a first target type and a second subject suspicious event signal object of a second target type. In such a non-limiting example, the respective alert rule may generate one of the one or more security alerts in response detecting that a first suspicious event signal object of the plurality of suspicious event signal objects corresponds to the first target type and a second suspicious event signal object of the plurality of suspicious event signal objects corresponds to the second target type In another non-limiting example, the predetermined alerting criteria may specify a respective alert rule, and the respective alert rule may specify generating a subject security alert when the identity-based threat detection and response service generates a first subject suspicious event signal object of a first target type and does not generate a second subject suspicious event signal object of a second target type. In such a non-limiting example, the respective alert rule may generate one of the one or more security alerts in response to detecting that a first suspicious event signal object of the plurality of suspicious event signal objects corresponds to the first target type and that no suspicious event signal objects of the plurality of suspicious event signal objects corresponds to the second target type.

In another non-limiting example, the predetermined alerting criteria may specify a respective alert rule, and the respective alert rule may specify generating a subject security alert when the identity-based threat detection and response service generates a first subject suspicious event signal object of a first target type or a second subject suspicious event signal object of a second target type. In such a non-limiting example, the respective alert rule may generate one of the one or more security alerts in response detecting that a first suspicious event signal object of the plurality of suspicious event signal objects corresponds to the first target type or the second target type.

At least one technical benefit of generating the one or more security alerts based on suspicious event signal objects rather includes improving scalability and computational efficiency of the identity-based threat detection and response service. Because the plurality of suspicious event signal objects represents a reduced and instruction-filtered subset of the plurality of digital events included in the session object, alert rule evaluation is performed over a smaller and semantically enriched dataset. This reduces the number of rule comparisons, conditional evaluations, and correlation operations required to determine whether predetermined alerting criteria is satisfied. Additionally, each suspicious event signal object encapsulates structured attributes, including signal impact scores, signal suspicion scores, and target type classifications, thereby enabling alert rules to operate on normalized and security-relevant representations instead of heterogeneous raw event data. This pre-processing and transformation of raw digital events into structured suspicious event signal objects reduces memory usage, processor cycles, and latency associated with rule execution, particularly in high-volume or distributed computing environments where large numbers of digital events are generated continuously. Accordingly, by decoupling alert generation from direct analysis of raw digital events and instead operating on structured suspicious event signal objects, the system improves real-time responsiveness, enhances throughput of alert evaluation pipelines, and reduces computational overhead required to detect security-relevant activity within the computing environment.

Additionally, or alternatively, in one or more embodiments, S230 may function to provide the plurality of suspicious event signal objects generated in S220 as input to an alert generation module (e.g., alert construction engine 172, threat alert generation module 173, etc.) and, in response, the alert generation module may function to output one or more security alerts that corresponds to a respective session object. The alert generation module, in one or more embodiments, may assess, in real-time or near real-time, the plurality of suspicious event signal objects against one or more predetermined alerting criteria to determine whether generation of a security alert is warranted and, if so, to construct the one or more security alerts based on attributes associated with the plurality of suspicious event signal objects.

Threat Alert Profile

In some embodiments, each type of threat alert may be defined in a threat alert profile (sometimes referred to herein as a threat alert rule or alert rule). The term "threat alert profile" (or "threat alert rule"), as generally used herein, may relate to a data structure comprising a set of threat alert attributes that may define a particular type of threat alert. In one or more embodiments, S230 may function to construct a variety of threat alerts based on a corresponding variety of threat alert rules or profiles, as shown by way of example in FIG. 7. In various embodiments, the set of threat alert attributes in a threat alert profile may include, but are not limited to, a unique alert ID or signature, a textual description of the corresponding threat alert type, a priority score and/or a severity score associated with the threat alert type, an environment associated with the corresponding threat alert type, one or more tags associated with a malicious activity category of the corresponding threat alert type (e.g., MITRE tactic type(s) and/or MITRE technique), a textual description of recommended remediation actions for the corresponding threat alert type, one or more potential threat actors associated with the corresponding threat alert type, and/or any other suitable attribute or property that may define a distinct threat alert type. In some embodiments, S230 may function to construct the one or more threat alerts based on one or more corresponding threat alert profiles. That is, in such embodiments, threat alert profiles may define types of threat alerts, and one or more threat alerts constructed by S230 may be distinct threat alert instances of one or more threat alert profiles.

Figure 7:
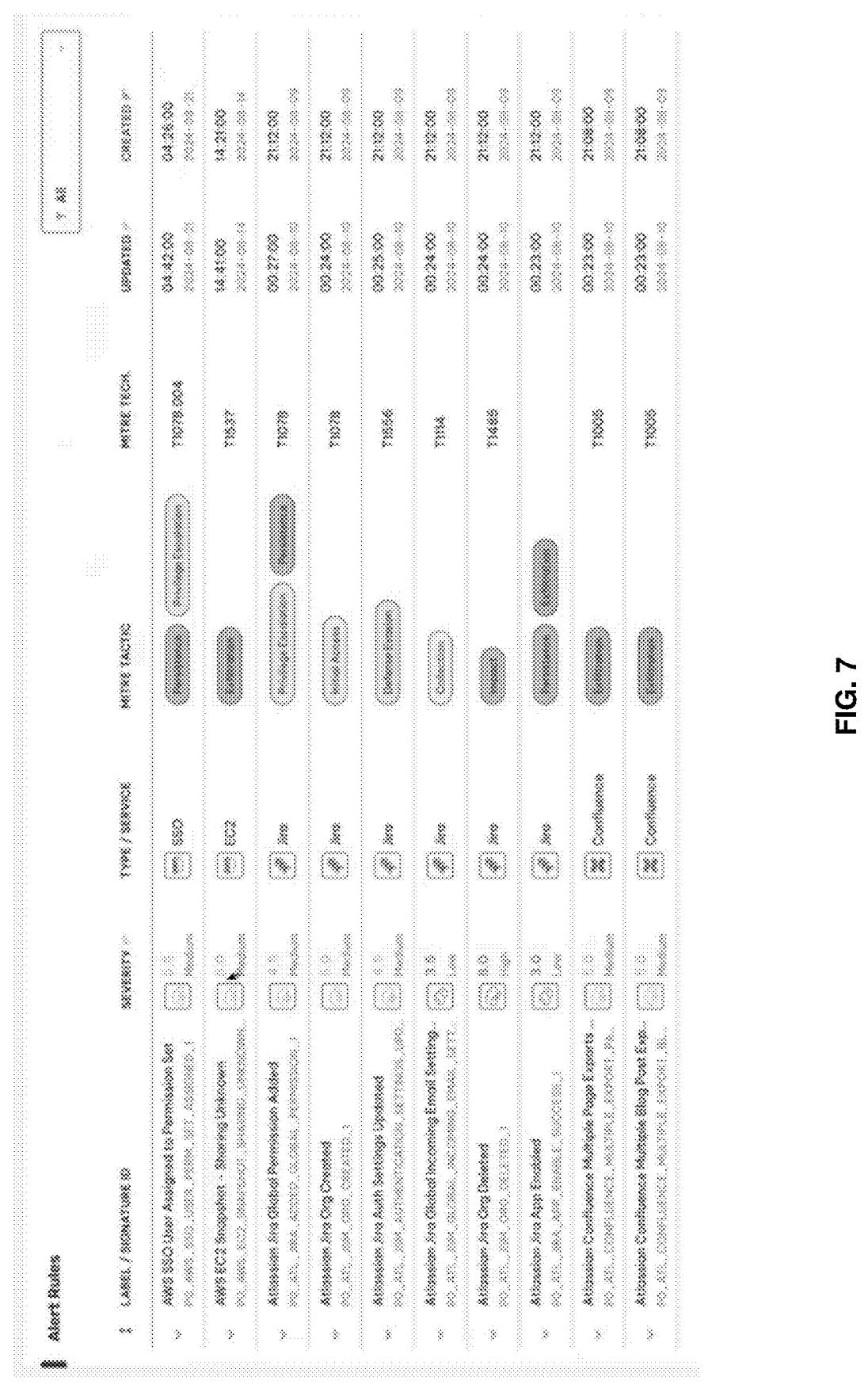

For instance, S230 may function to reference a list of threat alert profiles or rules, as shown by way of the non-limiting example in FIG. 7. In this example, the one or more threat alert profiles or rules may include an "AWS SSO User Assigned to Permission Set" profile or rule, with a corresponding "Medium" severity score of "5.5," an associated environment type of AWS SSO, associated MITRE Tactic tags of "Persistence" and "Privilege Escalation," and an associated MITRE Technique of "T1078.004." In this example, S230 may function to construct a threat alert based on this threat alert rule or profile that may represent an AWS SSO user has been assigned to a permission set.

Additionally, in one or more embodiments, each threat alert profile may include the corresponding set of event signals or event signal states that must be detected for S230 to construct a threat alert of the corresponding type. Additionally, in some such embodiments, each threat alert profile may include the alert-specific logical detection framework that may determine when a threat alert should be constructed. Therefore, in some embodiments, S230 may function to evaluate event signals relative to one or more sets of event signals and/or logical detection frameworks defined in one or more threat alert profiles. In such embodiments, when S230 detects that the logical combination based on the set of event signals and/or the logical detection criteria of a distinct threat alert profile have been satisfied, S230 may function to construct a threat alert corresponding to that distinct threat alert profile.

Threat Alert Summary Constructs

In some embodiments, S230 may function to generate one or more threat alert summary constructs (sometimes referred to herein as "threat alert summaries") that may be included in each constructed threat alert. In such embodiments, a threat alert summary construct may comprise a data construct that may include alert-specific content that may explain one or more elements of the associated threat alert. In one or more embodiments, a threat alert summary construct may provide contextualized security insights that may enable one or more cybersecurity remediation entities (e.g., SOC entities or resources) to assess the nature, severity, and/or potential impact of a threat alert.

In some embodiments, each threat alert constructed by S230 may be associated with a predefined textual threat alert description. In such embodiments, the threat alert summary for a distinct threat alert may include the predefined threat alert description. In some such embodiments, the threat alert description may be a predefined textual description included in and/or based on the corresponding threat alert profile of the distinct threat alert.

Additionally, or alternatively, in some embodiments, S230 may function to dynamically construct the threat alert summary for a distinct threat alert based on a threat alert summary template. In some such embodiments, the threat alert summary template for a distinct threat alert may comprise textual data and one or more fields that may be automatically filled with values extracted from digital event data relevant to the distinct threat alert. In such embodiments, S230 may function to extract tokens from digital event data and/or the event signals associated with the distinct threat alert that may correspond to the fields in the threat alert summary template. Subsequently, S230 may function to insert the extracted tokens into the corresponding fields of the threat alert summary template. As a non-limiting example, S230 may function to extract an IP address and a username from digital event data associated with a distinct threat alert, and S230 may subsequently generate a threat alert summary based on inserting the extracted IP address and username into a threat alert summary template associated with the distinct threat alert. In some embodiments, the threat alert summary template for a distinct threat alert may be included in the corresponding threat alert profile. Additionally, or alternatively, in some embodiments, S230 may function to construct the threat alert summary template based on a predefined threat alert description.

In some embodiments, S230 may additionally or alternatively function to incorporate one or more remediation recommendations into the threat alert summary for a distinct threat alert. In such embodiments, the one or more remediation recommendations may include and/or describe actions that may be recommended to cybersecurity remediation entities to address or resolve the associated threat alert. In some such embodiments, the one or more remediation recommendations may be included in and/or extracted from the predefined threat alert description for a distinct threat alert. Alternatively, in some embodiments, the one or more remediation recommendations may be dynamically generated based on the threat alert summary template associated with the distinct threat alert.

Additionally, or alternatively, in some embodiments S230 may function to implement a threat alert summarization model that may function to receive, as input, a distinct threat alert, associated event signals, and any digital event data or metadata associated with the distinct threat alert. In turn, the threat alert summarization model may function to output a threat alert summary and/or one or more remediation recommendations for the distinct threat alert. In some embodiments, the threat alert summarization model may comprise a machine learning model, or an ensemble of machine learning models. In some embodiments, the threat alert summarization model may comprise a large language model that may function to output the threat alert summary in a text format.

User Interface: Threat Alert Surfacing

Figure 8:
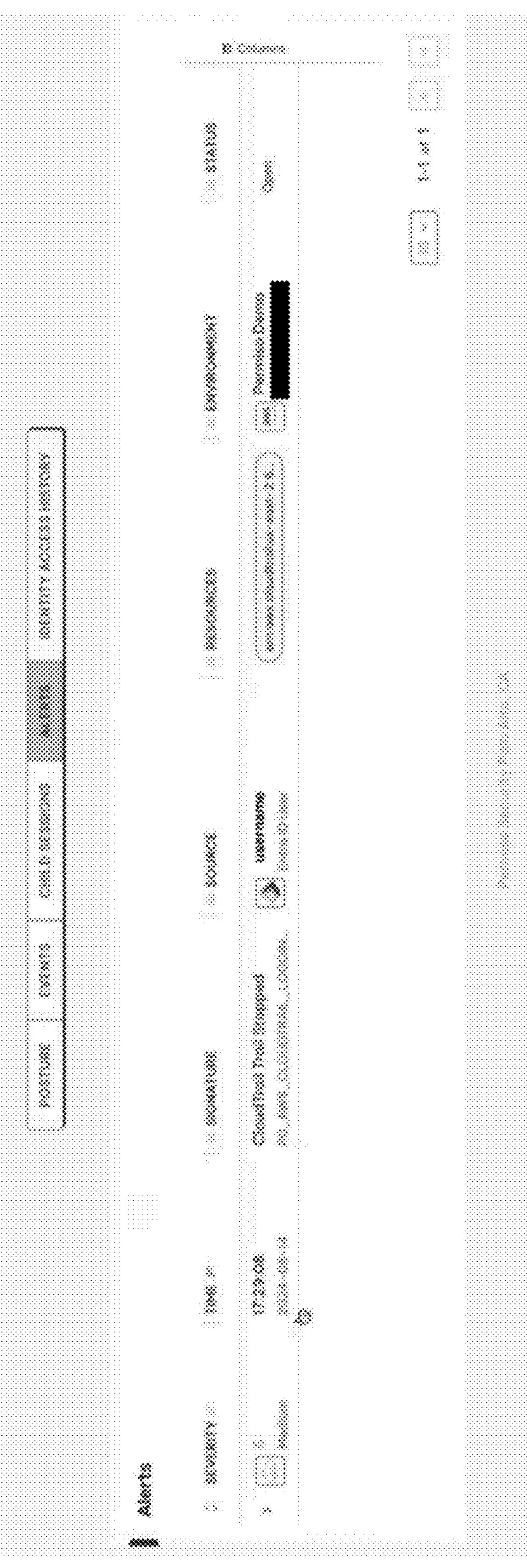
FIG. 8 illustrates an example interface for surfacing threat alerts of a session in accordance with one or more embodiments of the present application.

In some embodiments, S220 may function to display or surface one or more constructed threat alerts via the cybersecurity intelligence user interface. In some embodiments, the cybersecurity intelligence user interface may include a window or region that may function to display a list of one or more threat alerts, as shown by way of example in FIG. 8. In such embodiments, the list of threat alerts may be arranged in a table comprising a set of rows, where each row may correspond to a distinct threat alert. In some such embodiments, the table may include a set of columns, each column corresponding to a distinct property or attribute of a threat alert. The columns may include, but are not limited to, a threat alert severity column, a threat alert timestamp column, a threat alert signature column (e.g., a signature, name, and/or ID of the threat alert), a threat alert source column (e.g., the username or ID of the actor associated with the threat alert), a threat alert resources column, a threat alert environment column, and a threat alert status column (e.g., open or closed).

Figure 6:
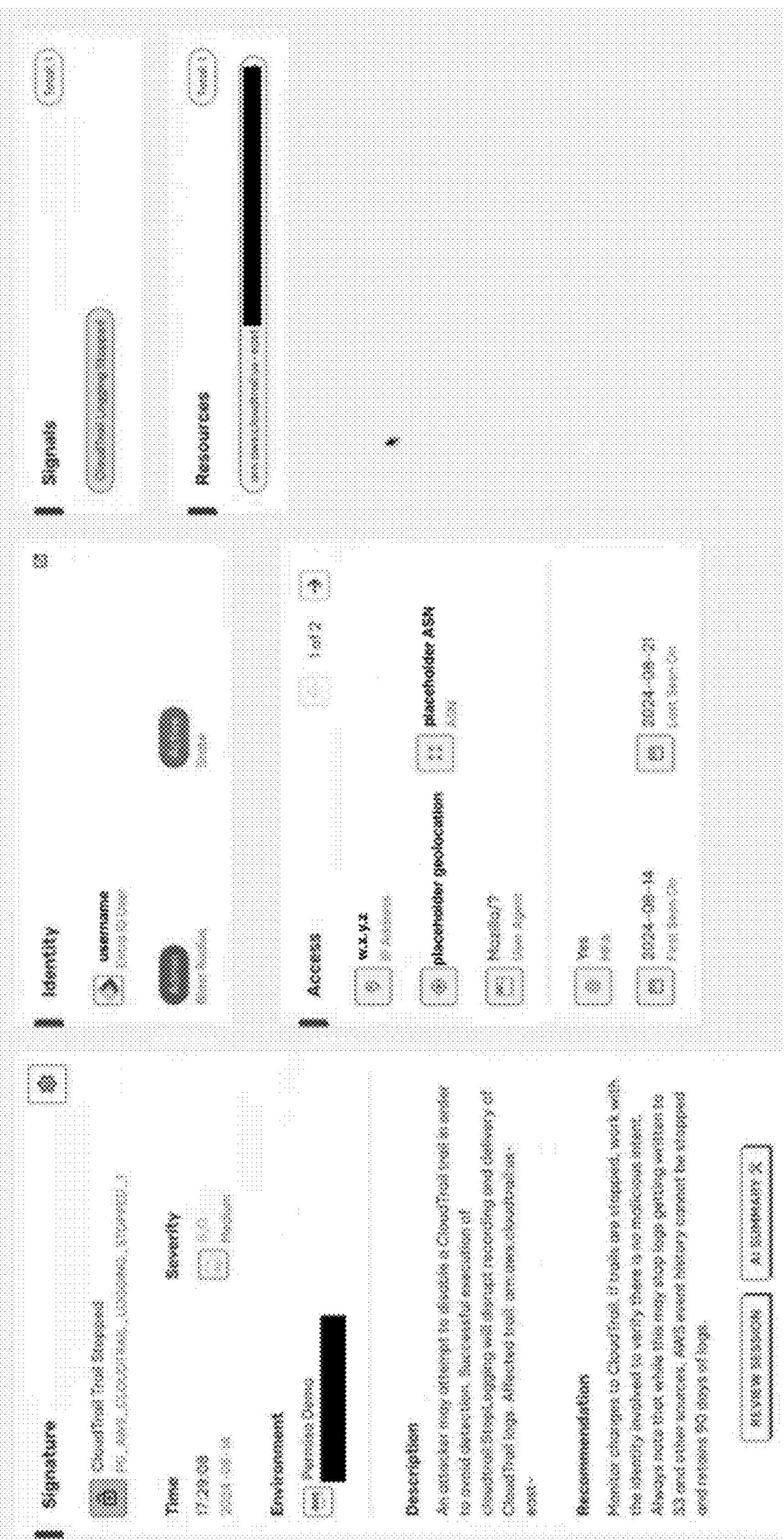
FIG. 6 illustrates an example interface for surfacing a threat alert in accordance with one or more embodiments of the present application.

In some embodiments, the cybersecurity intelligence user interface may include a threat alert overview window or region that may function to display one or more threat alert properties of a user-selected threat alert, as shown by way of example in FIG. 6. In some embodiments, a user may select (e.g., via a GUI control) a distinct threat alert to be viewed in the threat alert overview window. In one or more embodiments, the threat alert overview window may include a signature sub-region, an identity sub-region, an access sub-region, a signals sub-region, and a resources sub-region, as illustrated by way of example in FIG. 6. In some embodiments, the signature sub-region may function to display, via one or more GUI elements, a signature (e.g., an ID or name) of the selected threat alert, a timestamp of the selected threat alert, a severity score of the selected threat alert, the environment of the selected threat alert, and/or the threat alert summary construct of the selected threat alert. In some embodiments, the identity sub-region may function to display, via one or more GUI elements, a username of the actor associated with the selected threat alert (e.g., a suspicious or malicious actor username), a potential scope of the selected threat alert (e.g., a "blast radius" of the actor or threat alert), and/or an activity status of the actor associated with the selected threat alert (e.g., active or inactive). In one or more embodiments, the access sub-region may function to display, via one or more GUI elements, an IP address associated with the selected threat alert (e.g., the IP address used by a suspicious or malicious actor associated with the threat alert), a geolocation associated with the selected threat alert (e.g., a geolocation associated with the IP address and/or with a suspicious or malicious actor), an ASN associated with the selected threat alert, a user agent associated with the selected threat alert, a multi-factor authentication status of the actor associated with the selected threat alert, a first-seen-on timestamp of the actor associated with the selected threat alert, and a last-seen-on timestamp of the actor associated with the selected threat alert. In some embodiments, the signals sub-region may function to display, via one or more GUI elements, one or more event signals (e.g., event signal identifiers, names, labels, and/or the like) associated with the selected threat alert. In some embodiments, the resources sub-region may function to display, via one or more GUI elements, a list of resources (e.g., cloud computing resources) associated with the selected threat alert.

Figure 15:
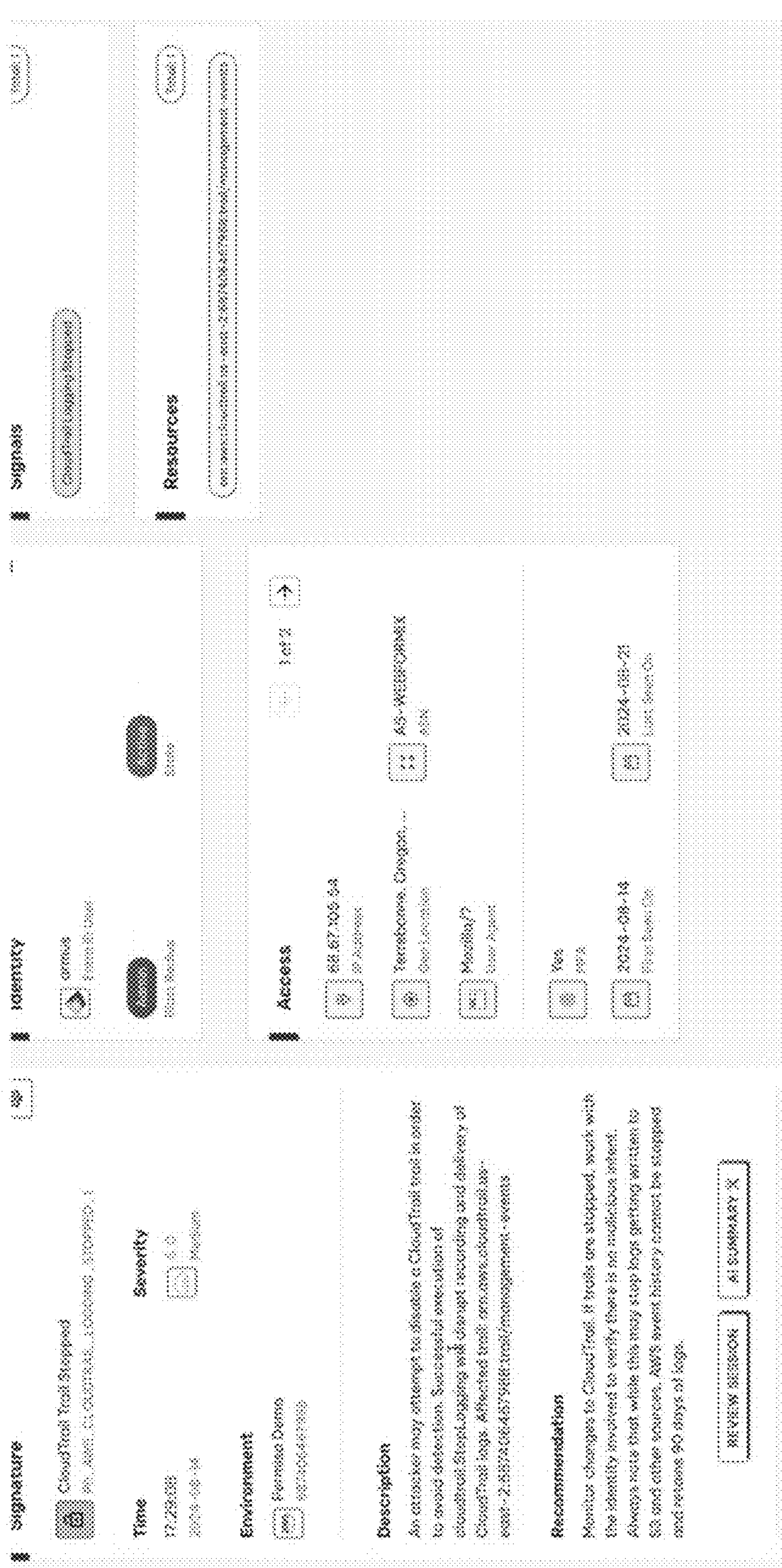
Figure 16:
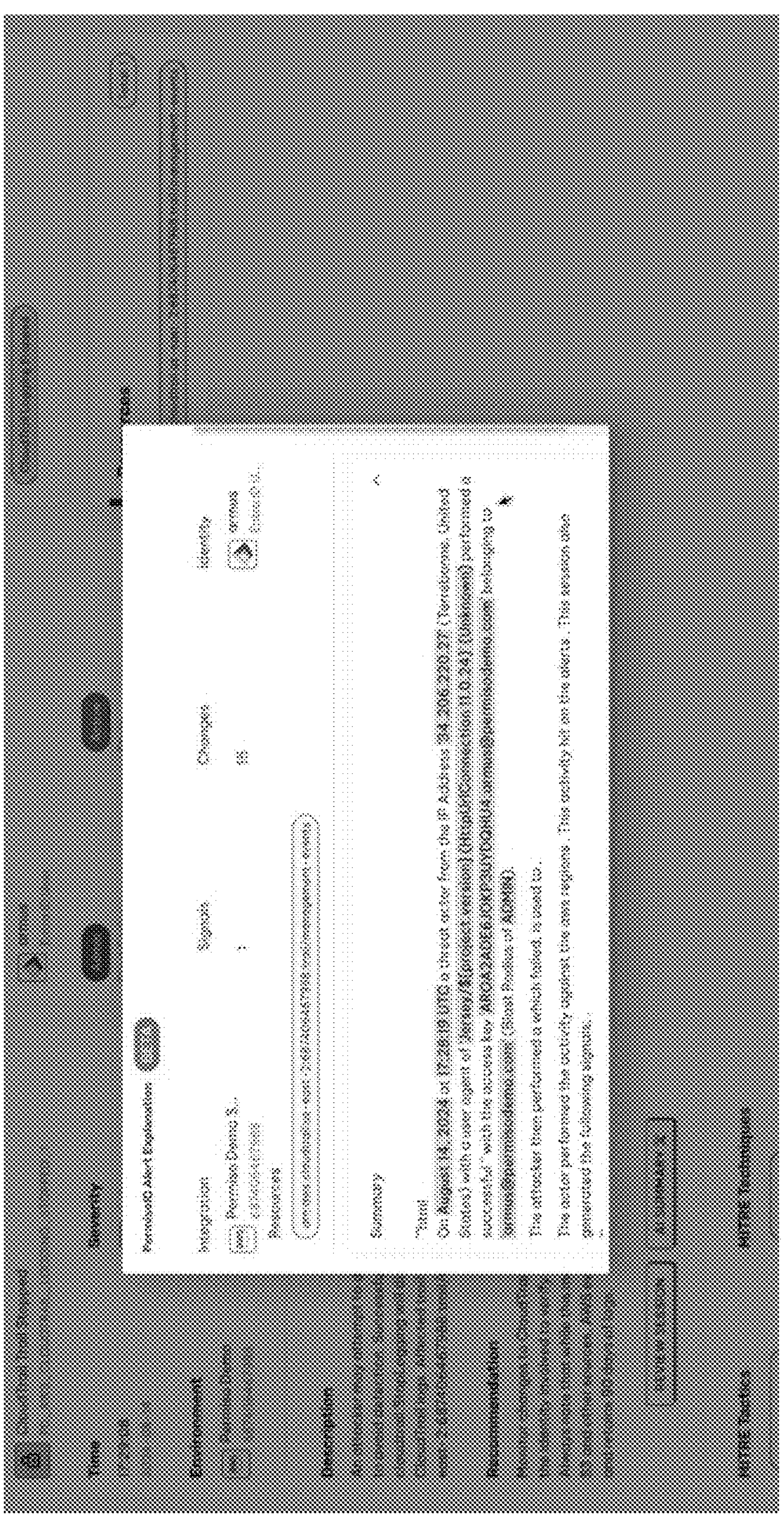

Turning to FIG. 15 and FIG. 16, in one or more embodiments, based on or in response to generating one or more security alerts for a session object, the system or service implementing method 200 may function to display a target security alert of the one or more security alerts on a graphical user interface accessible to a subscribing entity. In such an embodiment, the system or service implementing method 200 may function to receive an input from the subscribing entity selecting an alert explanation button displayed on the graphical user interface and, in response, the system or service implementing method 200 may function to (i) instantiate an alert explanation popover on the graphical user interface, (ii) automatically create an alert explanation prompt that includes the target security alert and all associated suspicious event signal objects (e.g., the plurality of suspicious event signal objects generated in response to assessing the plurality of digital events included in the session object against a corpus of suspicious event detection instructions), (iii) generate, using a large language model, an alert explanation for the target security alert based on providing the alert explanation prompt as input to the large language model, and (iv) display, by the alert explanation popover, the alert explanation generated for the target security.

It shall be recognized that, in one or more embodiments, the alert explanation may be streamed to the identity-based threat detection and response service (e.g., system or service implementing method 200) while the large language model is generating the alert explanation for the target security alert. Accordingly, in such an embodiment, the system or service implementing method 200 may function to update, in real-time, the alert explanation displayed in the alert explanation popover as new portions of the alert explanation are received.

It shall be further recognized that, in one or more embodiments, the graphical user interface displaying the target security alert may include a first region that displays one or more of a time and a date that the identity-based threat detection and response service generated the target security alert, an alert title specified within the target security alert, an alert severity score determined for the target security alert, an identifier of the computing environment where the plurality of digital events included in the session object occurred, a natural language description explaining the target security alert, and one or more recommended threat mitigation actions to mitigate a security threat associated with the target security alert, as shown generally by way of example in FIG. 15. Stated another way, in one or more embodiments, the first region of the graphical user interface may present alert-level attributes arranged in distinct labeled fields, each field corresponding to a respective attribute corresponding to the target security alert. In such embodiments, the first region may include a temporal field specifying when the target security alert was generated by the identity-based threat detection and response service, a title field identifying a classification of the target security alert, a severity field specifying a numerical or categorical severity value determined for the target security alert, an environment field identifying the computing environment in which the plurality of digital events included in the session object occurred, a description field containing a natural-language explanation of the security condition associated with the target security alert, and a mitigation field specifying one or more recommended remedial or threat mitigation actions associated with the target security alert.

Additionally, or alternatively, in one or more embodiments, the graphical user interface displaying the target security alert may include a second region that displays an identifier of the digital account that performed the plurality of digital events included in the session object, an indication of whether the digital account is active or inactive within the computing environment of the subscribing entity, a blast radius that specifies a privilege level associated with the digital account, and access data associated with the plurality of digital events, as shown generally by way of example in FIG. 15. For instance, in a non-limiting example, the second region may include an identity section specifying a username and an associated identity provider classification, a state indicator specifying whether the digital account is active, and a privilege indicator specifying whether the digital account has administrative privileges within the computing environment. The second region may further include an access section specifying an internet protocol (IP) address associated with one or more of the plurality of digital events, a geographic location corresponding to the IP address, an autonomous system number (ASN) associated with the IP address, a user agent associated with the plurality of digital events, an indication of whether multi-factor authentication (MFA) was used during at least one of the plurality of digital events, and temporal indicators specifying a first-seen date and a last-seen date associated with the digital account within the session object.

Additionally, or alternatively, in one or more embodiments, the graphical user interface displaying the target security alert may include a third region that displays an indication of one or more suspicious event signal objects of the plurality of suspicious event signal objects that contributed to the generation of the target security alert, and one or more computing resources of the computing environment referenced or involved in the target security alert. Stated differently, in one or more embodiments, the graphical user interface displaying the target security alert may include a third region that identifies the subset of suspicious event signal objects of the plurality of suspicious event signal objects that satisfied the predetermined alerting criteria for generation of the target security alert, along with one or more computing resources of the computing environment implicated by that subset of suspicious event signal objects. For instance, in a non-limiting example, the third region may include a signals subsection specifying a total number of the suspicious event signal objects that satisfied the predetermined alerting criteria and surfacing a respective signal identifier or graphical tag for each suspicious event signal objects that satisfied the predetermined alerting criteria, and a resources subsection specifying a total number of computing resources associated with those suspicious event signal objects and presenting a structured identifier or tag for each such computing resource.

Turning to FIG. 16, in one or more embodiments, the alert explanation popover may include a first distinct region and a second distinct region. The first distinct region of the alert explanation popover, in one or more embodiments, may include an identifier of a respective computing environment where the plurality of digital events included in the session object occurred, a count of the plurality of suspicious event signal objects generated for the session object, an identifier of a respective digital account that performed the plurality of digital events included in the session object, and an identifier of a computing resource within the computing environment that is specified by the target security alert. Stated another way, in one or more embodiments, the first distinct region of the alert explanation popover may present metadata associated with the target security alert, including environmental context, identity attribution, signal count information, and resource identification, thereby providing a summarized overview of the session object and the security-relevant objects implicated by the target security alert.

Stated differently, in one or more embodiments, the first distinct region of the alert explanation popover may include a plurality of labeled fields. The plurality of labeled fields, in one or more embodiments, may include: (i) an integration field identifying the computing environment in which the plurality of digital events included in the session object occurred, (ii) a signals field specifying a total number of the plurality of suspicious event signal objects generated for the session object, (iii) a changes field specifying a total number of digital events of the plurality of digital events included in the session object that modified an operating state of one or more computing resources within the computing environment, (iv) an identity field identifying a digital account that performed the plurality of digital events included in the session object, and (v) a resources field identifying the one or more computing resources within the computing environment.

Additionally, or alternatively, in such an embodiment, the second distinct region of the alert explanation popover may include the alert explanation generated for a security alert to which the alert explanation popover corresponds. The alert explanation, in one or more embodiments, may include (i) a first set of text strings that explains, in natural language, how a threat actor accessed the computing environment of the subscribing entity, (ii) a second set of text strings that explains, in natural language, what the threat actor did after accessing the computing environment of the subscribing entity, and (iii) a third set of text strings that explains, in natural language, how the plurality of suspicious event signal objects contributed to the generation of the security alert. Stated another way, in one or more embodiments, the second distinct region of the alert explanation popover may surface a natural-language narrative describing actions performed by a threat actor beginning with a login to the computing environment and proceeding through subsequent digital events up to a last digital event of the plurality of digital events included in the session object, and further explaining how the plurality of suspicious event signal objects resulted in generation of the security alert.

For instance, in a non-limiting example, the alert explanation may include text strings specifying a date and a time corresponding to a first digital event included in the session object, an internet protocol (IP) address associated with the threat actor, a geographic location associated with the IP address, and a user agent associated with the first digital event. The alert explanation may further specify an identifier of a digital account used to access the computing environment and an authorization level or blast radius associated with the digital account. The alert explanation, in some embodiments, may additionally describe one or more subsequent digital events performed by the threat actor after logging in to the computing environment, including attempts to access, modify, enable, disable, create, delete, or reconfigure one or more computing resources within the computing environment. The alert explanation, in some embodiments, may further correlate one or more of the subsequent digital events to respective suspicious event signal objects generated in response to assessing the plurality of digital events, and may explain how satisfaction of one or more suspicious event detection instructions resulted in generation of the security alert.

In another non-limiting example, the alert explanation may include text strings specifying a date and a time of a login to the computing environment, an internet protocol address and associated geographic location of a threat actor, a user agent associated with the login, and an identifier and privilege level of a digital account used to access the computing environment. The alert explanation may further describe one or more subsequent digital events performed by the threat actor within the computing environment up to a last digital event included in the session object and explain how one or more corresponding suspicious event signal objects satisfied predetermined alerting criteria to result in generation of the security alert.

In one or more embodiments, the system or service implementing method 200 may function to transform structured security telemetry associated with the session object-including the target security alert and the plurality of suspicious event signal objects-into a natural-language narrative explanation presented within the alert explanation popover. In certain embodiments, the alert explanation prompt may provide structured context to the large language model, including identifiers of digital events, associated signal impact scores, associated signal suspicion scores, and attributes of the computing environment, thereby enabling the large language model to generate a coherent explanation describing a progression of activity occurring during the session object. The alert explanation displayed within the alert explanation popover may therefore present an interpretable summary of the session object from a first digital event to a last digital event, including attribution to a digital account and identification of one or more computing resources associated with the target security alert.

Stated differently, in one or more embodiments, in response to receiving the input selecting the alert explanation button, the system or service implementing method 200 may populate data associated with the target security alert and/or the plurality of suspicious event signal objects into the alert explanation prompt and provide the alert explanation prompt to the large language model. The large language model may process the alert explanation prompt to generate a sequence of text strings forming the alert explanation. The system or service implementing method 200 may then render the generated alert explanation within the alert explanation popover overlaid on the graphical user interface such that the subscribing entity may view the alert explanation concurrently with the target security alert. The alert explanation prompt may include identifiers of the plurality of digital events included in the session object, identifiers of satisfied suspicious event detection instructions, corresponding signal impact scores and signal suspicion scores, identifiers of a digital account associated with the session object, and identifiers of one or more computing resources included in the target security alert. By providing the large language model with structured representations of the session object and associated suspicious event signal objects, the system enables generation of a contextual explanation specific to the target security alert without exposing raw event logs directly to the subscribing entity.

At least one technical benefit of providing the large language model with structured representations of the target security alert and the associated suspicious event signal objects includes improving operation of the computing system itself. Rather than supplying raw event logs comprising a potentially large and unbounded volume of digital events, the system first transforms the plurality of digital events into a reduced plurality of suspicious event signal objects based on satisfaction of suspicious event detection instructions. This transformation restructures high-volume telemetry data into a bounded, security-relevant dataset having defined attributes, including signal impact scores and signal suspicion scores. As a result, the large language model operates on a reduced and structured input space, which decreases memory consumption, processor utilization, and input token length relative to processing raw event logs. This reduction in computational load improves throughput and reduces latency in generating alert explanations, thereby enhancing performance of the identity-based threat detection and response service as a whole.

Threat Alert Event Mapping

In one or more embodiments, S230 may function to map each constructed threat alert to one or more associated digital events. In some embodiments, this mapping may be based on mapping or linking each distinct threat alert to the digital events that are mapped to the event signals that are associated with the distinct threat alert. For instance, a distinct threat alert may be associated with a set of one or more event signals, as detailed above. In this case, S230 may function to identify the digital events that are mapped to the set of one or more event signals (e.g., via the bi-directional event to event signal mapping described above), and in turn S230 may function to map the distinct threat alert to those digital events. In such a way, S230 may function to identify the distinct digital events that are associated with a distinct threat alert.

Figure 9:
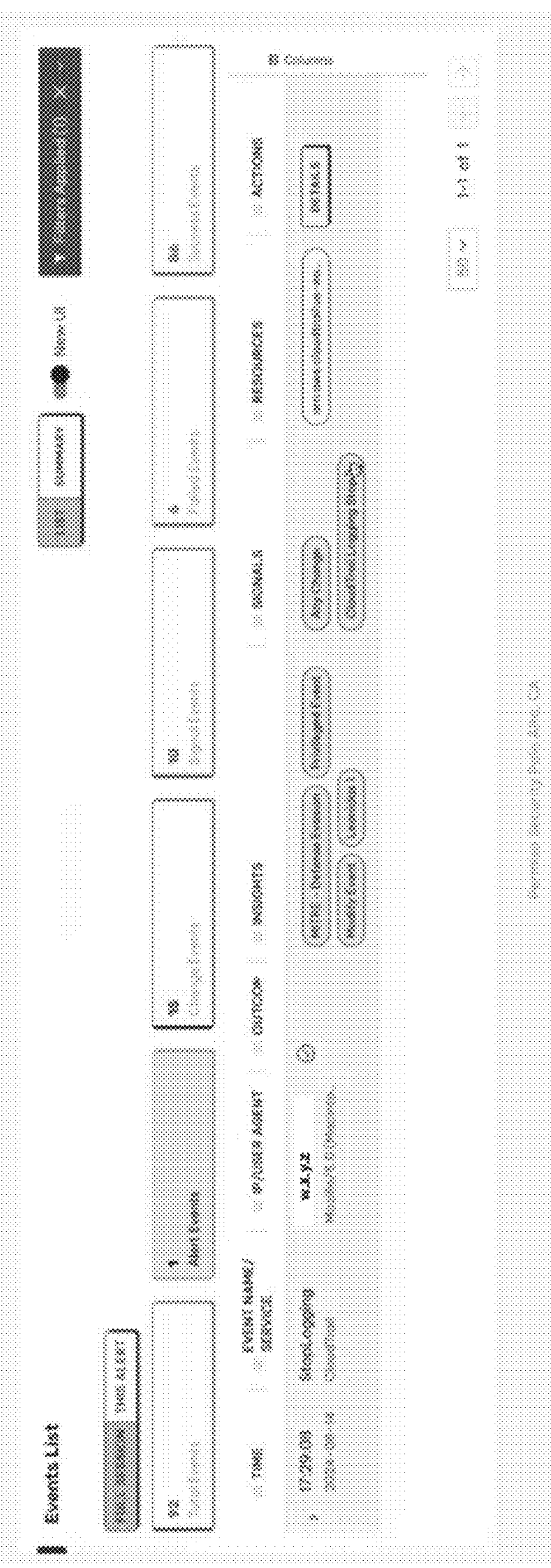
FIGS. 9 and 10 illustrate an example interface for surfacing threat alert events in accordance with one or more embodiments of the present application.
Figure 10:
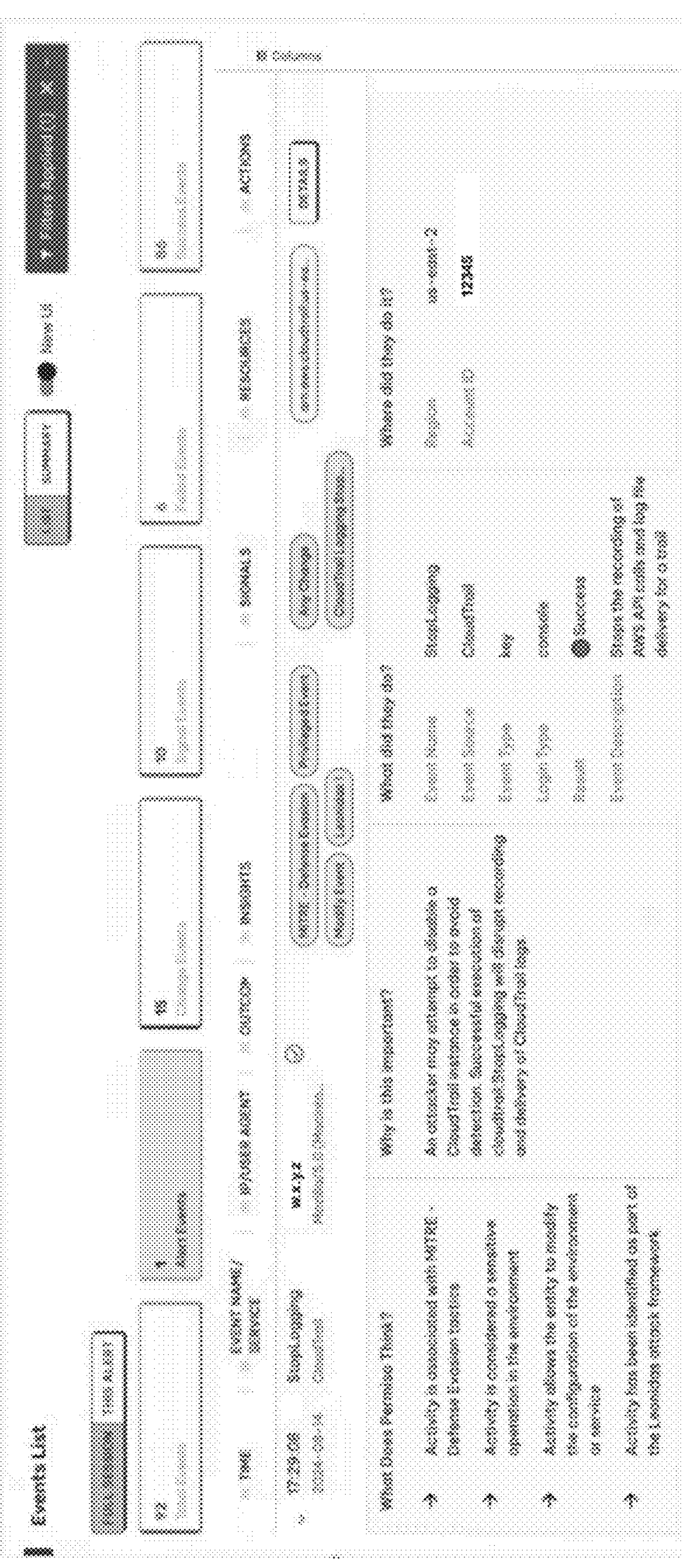

In some embodiments, S230 may additionally function to surface or display the one or more digital events associated with a selected threat alert via a threat alert event window or region cybersecurity intelligence user interface, as shown by way of example in FIGS. 9 and 10. For instance, as shown in FIG. 9, a distinct threat alert may be selected by a user in the cybersecurity intelligence user interface, and the user may subsequently select a user interface element or control to display a list of digital events associated with the selected threat alert in a threat alert event window. In this example, the list of digital events in the threat alert event window may be displayed in a digital event table structure, where each row may correspond to a distinct digital event associated with the selected threat alert and each column may be associated with a digital event attribute or property. In this example, the columns in the threat alert event window may include a digital event timestamp column, a digital event name or service column, a digital event actor IP address column, a digital event outcome column, a digital event insights column, a digital event signals column, a digital event resources column, and/or any other suitable column for surfacing a digital event attribute.

Additionally, in some embodiments, each digital event (e.g., each row) in the digital event table structure of the threat alert event window may be expanded based on user selection (e.g., when a row is selected or otherwise interacted with by a user of the cybersecurity intelligence user interface), as shown by way of example in FIG. 10. In such embodiments, the expanded region of a row may include one or more items of digital event intelligence data that may function to provide additional context regarding the selected digital event to the user. In such embodiments, the items of digital event intelligence data may include one or more statements (e.g., textual or natural language statements) that may characterize the selected digital event, one or more statements (e.g., textual or natural language statements) that may describe an importance or criticality of the selected digital event, one or more attributes of the selected digital event (e.g., event name, event source, event type, login type, event result, event description), and one or more location-specific attributes of the selected digital event (e.g., a region and/or an account ID associated with the selected digital event).

2.35 Constructing One or More Multi-Plane Alerts Based on the One or More Threat Alerts In some embodiments, method 200 may include constructing one or more multi-plane alerts (e.g., multi-plane security alerts or the like) based on the one or more threat alerts S235. In such embodiments, S235 may function to construct one or more multi-plane alerts based on detecting or identifying one or more threat alerts constructed or generated across one or more different sessions, environments, and/or users. The term "multi-plane alert," as generally used herein, may refer to a threat alert that may be constructed when multiple related threat alerts, originating from different sessions, users, or environments, may be correlated. In one or more embodiments, S235 may function to evaluate threat alert correlation criteria against one or more threat alerts to determine if the one or more threat alerts are correlated. In some embodiments, a constructed multi-plane alert may function to identify a broader cybersecurity threat pattern and/or a coordinated or evolving cybersecurity threat.

In one or more embodiments, a multi-plane alert may function to aggregate threat alerts across multiple distinct sessions (e.g., multiple distinct session objects or the like). As generally used herein, the term "session" may refer to a series of digital events performed or initiated by a distinct actor or entity (sometimes referred to herein as a "session actor," "a threat actor," or the like) that may occur within a specific timespan. In one or more embodiments, each session may be associated with a distinct digital event data source or environment (e.g., a distinct cloud service provider), such that each session may represent the activity of an actor or entity, within a specific period of time, on a platform or service associated with the distinct digital event data source or environment. In some embodiments, each session may additionally or alternatively represent a distinct login instance on a service or environment for a distinct user, such that each instance of a user logging into a service or environment is associated with a distinct session.

As a non-limiting example, S230 may function to construct a (e.g., first) threat alert associated with a malicious user who resets MFA settings in an identity provider service, a (e.g., second) threat alert associated with the same user modifying inbox rules in an email service, a (e.g., third) threat alert associated with the same user disabling security logging in a cloud computing service, and a (e.g., fourth) threat alert associated with the same user activity in a different cloud computing service. In this example, each threat alert may be associated with a distinct session corresponding to the service or environment associated with the threat alert. In turn, S235 may function to correlate these threat alerts with one another based on a same-actor threat alert correlation criterion, which may refer to a threat alert correlation criterion that may be satisfied if distinct threat alerts are associated with the same actor (e.g., the same threat actor). In turn S235 may function to construct a multi-plane alert based on identifying these threat alerts associated with the same user across different sessions. In this example, the multi-plane alert may function to represent and surface the cross-session cybersecurity threat pattern or threat strategy of malicious user activities across environments. It shall be noted that the above example is non-limiting, and in some examples a multi-plane alert may be constructed based on a plurality of threat alerts from within the same environment or service rather than different environments or services. For example, a multi-plane alert may be constructed based on S235 identifying threat alerts associated with different login sessions, where each session is associated with a different login instance by the same user in the same environment or service.

In one or more embodiments, S235 may function to construct a multi-plane alert based on identifying correlated threat alerts. In such embodiments, S235 may function to identify correlated threat alerts based on one or more threat alert correlation criteria that may include attribution identifiers such as shared user identities, access behaviors, or session properties. That is, S235 may function to identify a set of correlated threat alerts that are each attributed to the same user identity, or other session property, and in turn S235 may function to construct a multi-plane alert based on aggregating each threat alert of the set of threat alerts. As a non-limiting example, S235 may function to identify a threat alert associated with a distinct user identity in one session, and S235 may additionally identify a correlated threat alert associated with the same distinct user identity in a different session. In this example, S235 may function to construct a multi-plane alert based on the two correlated threat alerts. It shall be noted that the above example is non-limiting, and S235 may function to identify a different number of correlated threat alerts across a different number of sessions based on different attribution identifiers or session properties.

In some embodiments, S235 may function to construct a multi-plane alert based on identifying one or more user related user identities, credentials, and/or tokens between threat alerts. In some such embodiments, S235 may function to identify a threat alert associated with a distinct original user identity or credential, and S235 may function to identify one or more distinct subsequent user identities, credentials, and/or tokens that may be related with the original user identity. In turn, S235 may function to link the one or more distinct subsequent user identities, credentials, and/or tokens to the distinct original user identity or credential. In such embodiments, S235 may then function to evaluate threat alerts based on a related-identity and/or related-credential threat alert correlation criterion, where the original user identity or credential and the one or more distinct subsequent user identities, credentials, and/or tokens may be identified as related user identities or credentials. In such an example, S235 may function to identify threat alerts associated with the original user identity or credential and the one or more subsequent user identities, credentials, and/or tokens as correlated threat alerts, and in turn S235 may function to construct one or more multi-plane alerts based on the identified correlated threat alerts.

As a non-limiting example, S235 may function to identify a "create new user" event wherein an original user identity adds a new user identity to an environment. In such embodiments, S235 may function to identify any threat alerts associated with the original user identity and any threat alerts associated with the new user identity as correlated threat alerts, and in turn S235 may function to construct a multi-plane alert based on the correlated threat alerts. In this way, S235 may function to identify a malicious user who may attempt to mask their suspicious or malicious activity by using multiple user identities. It shall be noted that the above example is non-limiting, and S235 may function to identify related user identities based on applying different user identity correlation logic, heuristics, and/or models to constructed threat alerts and/or associated digital event data.

In some embodiments, S235 may function to identify one or more parallel correlated threat alerts and/or one or more sequential correlated threat alerts. In such embodiments, parallel correlated threat alerts may indicate one or more correlated threat activities that may occur or have occurred in parallel, while sequential correlated threat alerts may indicate one or more threat activities that may occur or have occurred in a chronological sequence. In various embodiments, S235 may function to construct a multi-plane alert based on one or more parallel correlated threat alerts, one or more sequential correlated threat alerts, and/or a combination of one or more parallel and sequential correlated threat alerts.

In some embodiments, S235 may function to map a constructed multi-plane threat alert to one or more known or predetermined malicious actor patterns. The term "known or predetermined malicious actor pattern," as generally used herein, may refer to a combination of one or more actions that may be associated with a known malicious threat strategy and/or a known malicious actor. In some such embodiments, a known malicious actor pattern may comprise a set of distinct threat alerts. In such embodiments, S235 may function to map a set of distinct threat alerts of a known malicious actor pattern to the threat alerts of a constructed multi-plane threat alert. In such embodiments, if the threat alerts of a constructed multi-plane threat alert match the set of threat alerts of a known malicious actor pattern, S235 may function to apply a known malicious actor classification or tag to the constructed multi-plane threat alert. In such embodiments, the known malicious actor classification or tag may comprise a name or label of a known malicious actor associated with the known malicious actor pattern.

In one or more embodiments, the system or service implementing method 200 may function to generate, based on assessing digital event data associated with a subscribing entity, a session object that includes a plurality of digital events performed by a digital account within a computing environment of the subscribing entity and, in turn, generate one or more security alerts for the session object in analogous ways described above. Furthermore, in such an embodiment, the system or service implementing method 200 may function to generate a plurality of additional session objects in response to obtaining additional digital event data associated with the subscribing entity and, in turn, generate, for each additional session object of the plurality of additional session objects, a plurality of distinct security alerts in analogous ways described above.

Accordingly, in such an embodiment, the system or service implementing method 200 may function to provide, as input to a multi-plane alert generation module (e.g., multi-plane alert generation module 174 or the like), (i) the plurality of distinct security alerts generated for each of the plurality of additional session objects and (ii) the one or more security alerts generated for the session object. In one or more embodiments, in response to the multi-plane alert generation module assessing the plurality of distinct security alerts generated for each of the plurality of additional session objects and the one or more security alerts generated for the session object, the multi-plane alert generation module may generate, in real-time or near real-time, a multi-plane security alert that specifies a multi-stage attack performed across a plurality of distinct computing environments of the subscribing entity. A multi-plane security alert, in some embodiments, may include (i) identifiers of the plurality of distinct security alerts determined to be correlated, (ii) identifiers of the distinct session objects associated with the correlated security alerts, (iii) one or more attribution identifiers linking the correlated security alerts, and (iv) a temporal ordering of digital events underlying the correlated security alerts. In such embodiments, the multi-plane security alert may represent an aggregated alert construct that spans multiple sessions, digital accounts, credentials, tokens, and/or computing environments and that captures a coordinated or multi-stage attack pattern. It shall be recognized that, in one or more embodiments, the multi-plane security alert may additionally specify an alert correlation rationale indicating which threat alert correlation criteria were satisfied to link the plurality of distinct security alerts. For example, the multi-plane security alert may specify that the correlated security alerts share a common user identity, a related credential, a shared network attribute, a common computing resource, a related access token, or a defined temporal proximity. In such embodiments, the multi-plane security alert may function to surface relationships between otherwise independent security alerts and consolidate them into a single alert (e.g., multi-plane alert or the like) that reflects cross-session or cross-environment malicious activity.

In one or more embodiments, the multi-plane alert generation module may have generated the multi-plane security alert in response to detecting that the one or more security alerts generated for the session object and the plurality of distinct security alerts generated for each of the plurality of additional session objects are attributable to a single root actor (e.g., same identity, same digital account, same threat actor or the like) and/or the one or more security alerts generated for the session object and the plurality of distinct security alerts generated for each of the plurality of additional session objects occurred within a predetermined time span. The predetermined time span, in some embodiments, may be set to 1 minute, 5 minutes, 30 minutes, 1 hour, 1 day, 2 days, 3 days, 4 days, 5 days, 30 days, etc. Alternatively, in one or more embodiments, the multi-plane alert generation module may have generated the multi-plane security alert in response to detecting that the one or more security alerts generated for the session object and the plurality of distinct security alerts generated for each of the plurality of additional session objects were generated by the identity-based threat detection and response service at the same time or within a defined temporal proximity relative to one another. In such embodiments, the multi-plane alert generation module may determine that concurrent or near-concurrent generation of the security alerts indicates coordinated or related threat activity across multiple sessions, environments, or digital accounts and may therefore construct the multi-plane security alert based on the temporally correlated security alerts.

Additionally, or alternatively, in one or more embodiments, the predetermined alerting criteria described above may specify a respective multi-plane alert instruction and the respective multi-plane alert instruction may specify generating a subject multi-plane security alert when the identity-based threat detection and response service generates, within a predetermined time span (e.g., 1 minute, 5 minutes, 30 minutes, 1 hour, 1 day, 2 days, 3 days, 4 days, 5 days, 30 days), a combination of security alerts associated with a subject subscribing entity that collectively correspond to a target combination of security alert types. Accordingly, in one or more embodiments, the respective multi-plane alert instruction may automatically generate the multi-plane security alert in response to detecting that at least a subset of (a) the plurality of distinct security alerts generated for each of the plurality of additional session objects and (b) the one or more security alerts generated for the session object collectively correspond to the target combination of security alert types.

Figure 17:
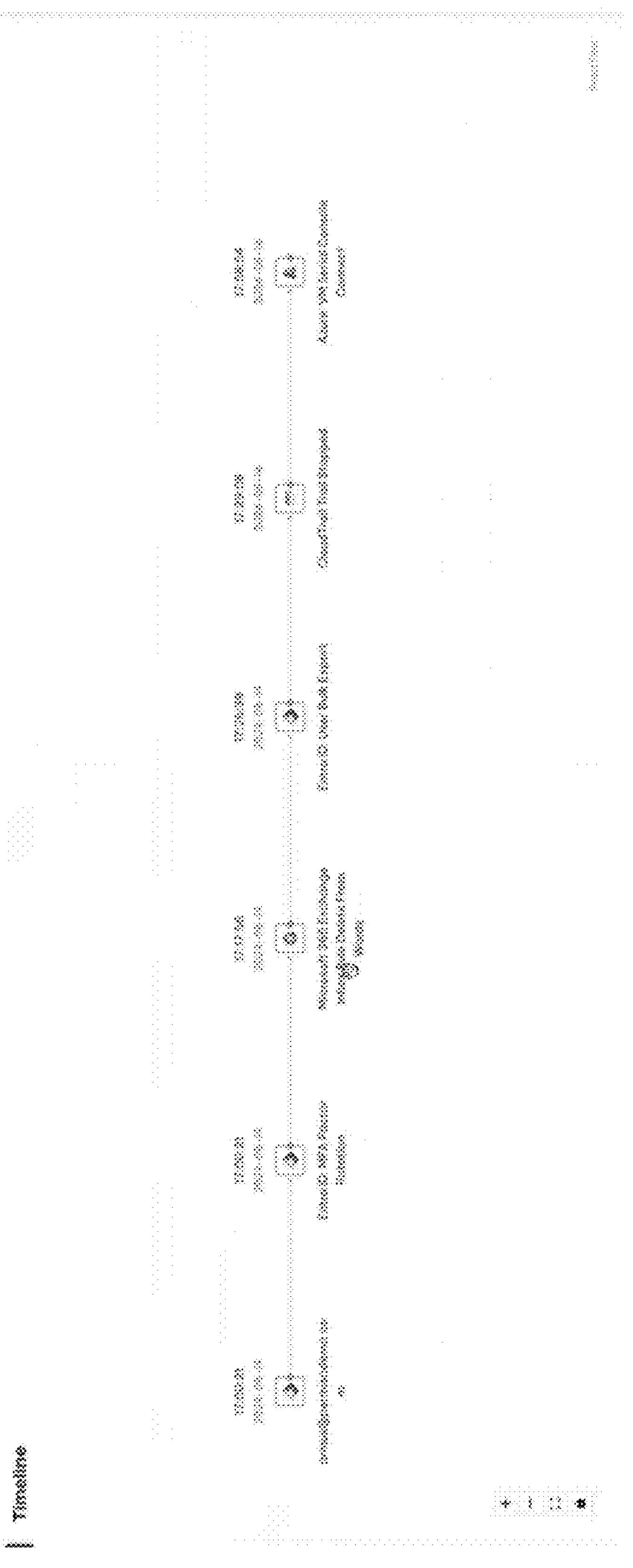

Turning to FIG. 17, in one or more embodiments, in response to generating the multi-plane security alert, the system or service implementing method 200 may function to automatically generate, in real-time or near real-time, a multi-plane alert explainability artifact that corresponds to the multi-plane security alert. The multi-plane alert explainability artifact (e.g., a multi-plane alert graphical user interface (GUI) object or the like) may include a graphical identity node corresponding to the single root actor, a plurality of graphical security alert nodes corresponding to the plurality of distinct security alerts generated for each of the plurality of additional session objects and the one or more security alerts generated for the session object, and a plurality of graphical alert connection links that directly or indirectly couple the plurality of graphical security alert nodes to the graphical identity node to form a connected alert sequence representing the multi-stage attack performed across the plurality of distinct computing environments of the subscribing entity.

For instance, in a non-limiting example, the system or service implementing method 200 may first generate a plurality of distinct security alerts for a plurality of distinct session objects occurring across a plurality of distinct computing environments. In such an example, a first security alert may correspond to MFA factor rotation activity within an identity provider environment (e.g., Entra ID), a second security alert may correspond to inbox rule modification activity within an email service environment (e.g., Microsoft 365 Exchange), a third security alert may correspond to user bulk export activity within the identity provider environment, a fourth security alert may correspond to logging configuration modification activity within an Amazon Web Services (AWS) cloud infrastructure environment (e.g., an AWS CloudTrail trail stopped event), and a fifth security alert may correspond to virtual machine serial console connection activity within a Microsoft Azure cloud computing environment. Subsequently, in response to determining that the plurality of distinct security alerts generated across the respective computing environments are attributable to a single root actor (e.g., armus@permisodemo.com) and/or occurred within a predetermined time span, the multi-plane alert generation module may generate a multi-plane security alert that represents the plurality of distinct security alerts as a single multi-stage attack sequence spanning the identity provider environment, the email service environment, the AWS cloud infrastructure environment, and the Azure cloud computing environment.

In such a non-limiting example, the system or service implementing method 200 may function to generate a multi-plane alert explainability artifact that corresponds to the multi-plane security alert. The multi-plane alert explainability artifact, in such an embodiment, may include a graphical identity node corresponding to the single root actor and a plurality of graphical security alert nodes corresponding to the plurality of distinct security alerts generated across the plurality of distinct computing environments. In such an embodiment, a first graphical alert connection link may directly couple the graphical identity node to a first graphical security alert node corresponding to the first security alert; a second graphical alert connection link may directly couple the first graphical security alert node to a second graphical security alert node corresponding to the second security alert; a third graphical alert connection link may directly couple the second graphical security alert node to a third graphical security alert node corresponding to the third security alert; a fourth graphical alert connection link may directly couple the third graphical security alert node to a fourth graphical security alert node corresponding to the fourth security alert; and a fifth graphical alert connection link may directly couple the fourth graphical security alert node to a fifth graphical security alert node corresponding to the fifth security alert, as shown generally by way of example in FIG. 17. In such an embodiment, the plurality of graphical alert connection links may be arranged chronologically to visually represent progression of the multi-stage attack across the plurality of distinct computing environments attributable to the single root actor.

At least one technical benefit of the multi-plane alert explainability artifact includes graphically connecting, within a single user interface object, a plurality of correlated security alerts attributable to a single root actor. By graphically linking the graphical security alert nodes using graphical alert connection links, the system enables a subscribing entity to view a progression of alerts associated with multiple distinct computing environments and/or session objects that would otherwise appear as independent and unrelated security alerts. That is, the multi-plane alert explainability artifact accelerates detection of coordinated, cross-environment attacks that would otherwise have gone unnoticed.

At least one technical benefit of the multi-plane security alert includes enabling the system to represent a plurality of otherwise independent security alerts as a single structured alert that encodes cross-session and cross-environment relationships. By transforming the plurality of distinct security alerts into a unified multi-plane security alert, the system reduces fragmentation of security telemetry and eliminates the need to independently evaluate each security alert in isolation. This structured aggregation accelerates identification of coordinated multi-stage attack patterns attributable to a single root actor and reduces computational overhead associated with repeated cross-alert correlation processing. Additionally, encoding the relationships between the plurality of distinct security alerts within the multi-plane security alert allows subsequent analysis, filtering, prioritization, and explainability operations to be performed against a single correlated alert object rather than against multiple discrete alert objects.

Figure 18:
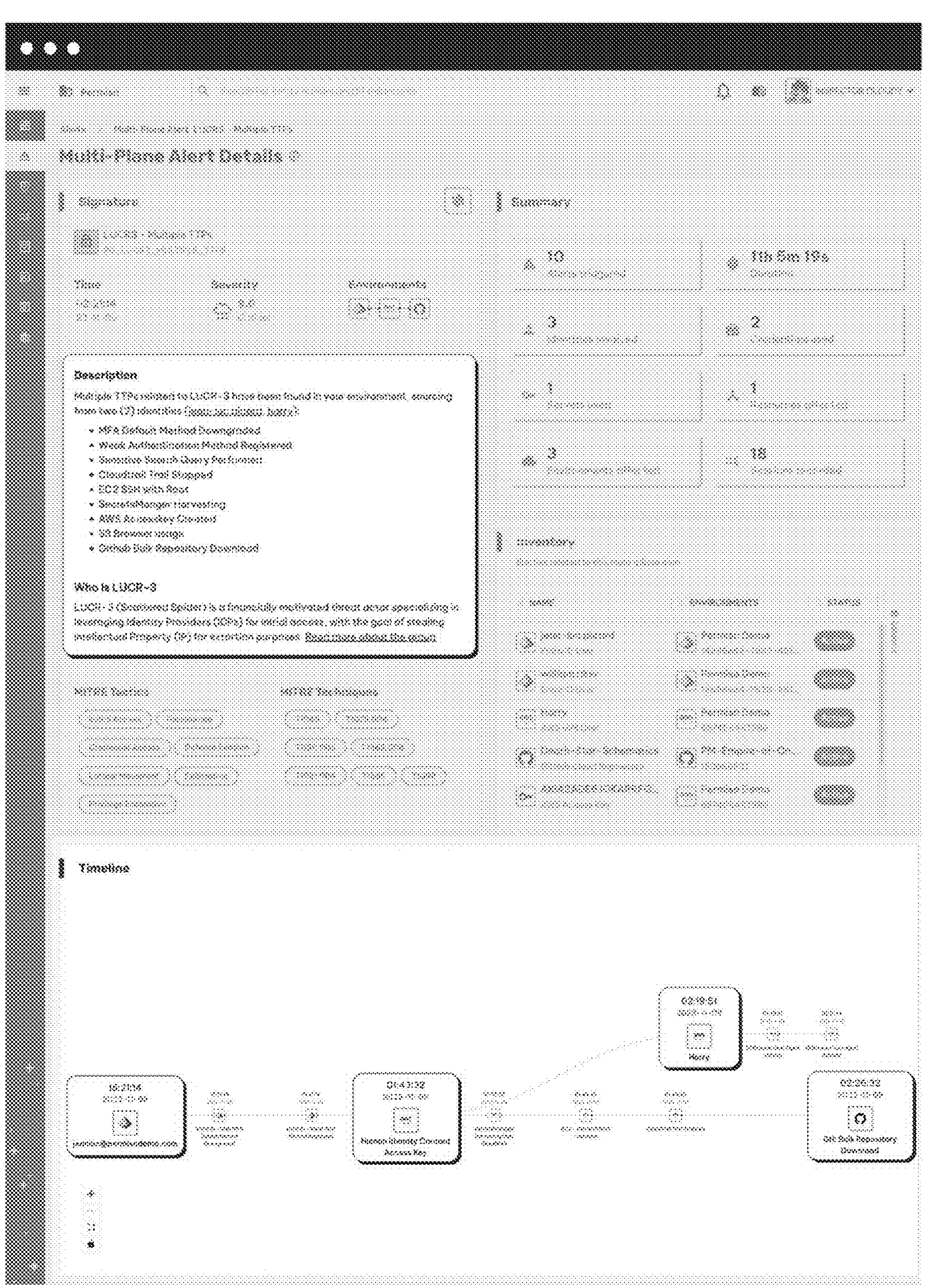

Turning to FIG. 18, in one or more embodiments, the multi-plane security alert corresponds to a multi-stage attack initiated by a first distinct digital account (e.g., jeanluc@permisodemo.com) within an identity provider environment and subsequently propagated into a cloud infrastructure environment. The multi-plane security alert may include a first security alert corresponding to a multi-factor authentication (MFA) default method downgrade event generated based on digital activity performed by the first distinct digital account within the identity provider environment and a second security alert corresponding to a weak authentication method registration event generated based on additional digital activity performed by the first distinct digital account within the identity provider environment. The multi-plane security alert, in one or more embodiments, may further include a third security alert corresponding to creation, by the first distinct digital account, of a second distinct digital account and associated access key within a cloud infrastructure environment (e.g., creation of a human identity and access key within an Amazon Web Services (AWS) environment). The multi-plane security alert may further include, in one or more embodiments, a fourth security alert and a fifth security alert corresponding to S3 browser user agent events performed by the second distinct digital account within the cloud infrastructure environment. The multi-plane security alert may further include, in one or more embodiments, a sixth security alert corresponding to a Secrets Manager harvesting event from CloudShell performed within the cloud infrastructure environment, a seventh security alert corresponding to an EC2 secure shell (SSH) login event using a root username within the cloud infrastructure environment, an eighth security alert corresponding to a CloudTrail trail stopped event within the cloud infrastructure environment, and a ninth security alert corresponding to a bulk repository download event within an external version control environment (e.g., GitHub). It shall be recognized that the sixth security alert, the seventh security alert, the eighth security alert, and the ninth security alert was generated based on digital activity performed by the first distinct digital account after creation of the second distinct digital account.

In such an embodiment, the multi-plane security alert aggregates the first through ninth security alerts, which span the identity provider environment, the cloud infrastructure environment, and the external version control environment, into a single correlated alert object representing coordinated, cross-environment malicious activity attributable to the first distinct digital account. In such a non-limiting example, the system or service implementing method 200 may function to generate a multi-plane alert explainability artifact that corresponds to the multi-plane security alert.

For instance, the multi-plane alert explainability artifact corresponding to the multi-plane security alert may include a first graphical identity node corresponding to the first distinct digital account (e.g., jeanluc@permisodemo.com), a second graphical identity node corresponding to the second distinct digital account (e.g., Harry) that was created by the first distinct digital account, a plurality of graphical security alert nodes corresponding to the first through ninth security alerts, and a plurality of graphical alert connection links interconnecting the graphical identity nodes (e.g., the first graphical identity node and the second graphical identity node) and the graphical security alert nodes.

In such a non-limiting example, a first graphical alert connection link may directly couple the first graphical identity node to a first graphical security alert node corresponding to the first security alert; a second graphical alert connection link may directly couple the first graphical security alert node to a second graphical security alert node corresponding to the second security alert; and a third graphical alert connection link may directly couple the second graphical security alert node to a third graphical security alert node corresponding to the third security alert, wherein the third graphical security alert node corresponds to the security alert indicating that the first distinct digital account created the second distinct digital account and associated access key.

In one or more embodiments, a fourth graphical alert connection link may directly couple the third graphical security alert node to the second graphical identity node corresponding to the second distinct digital account (e.g., Harry). A fifth graphical alert connection link may directly couple the second graphical identity node to a fourth graphical security alert node corresponding to the fourth security alert; and a sixth graphical alert connection link may directly couple the fourth graphical security alert node to a fifth graphical security alert node corresponding to the fifth security alert. It shall be recognized that the fourth and fifth graphical security alert nodes represent digital activity performed by the second distinct digital account.

Additionally, a seventh graphical alert connection link may directly couple the third graphical security alert node to a sixth graphical security alert node corresponding to the sixth security alert; an eighth graphical alert connection link may directly couple the sixth graphical security alert node to a seventh graphical security alert node corresponding to the seventh security alert; a ninth graphical alert connection link may directly couple the seventh graphical security alert node to an eighth graphical security alert node corresponding to the eight security alert; and a tenth graphical alert connection link may directly couple the eighth graphical security alert node to a ninth graphical security alert node corresponding to the ninth security alert.

In such an embodiment, a subset of the plurality of graphical alert connection links may define a plurality of diverging alert paths originating from the third graphical security alert node, wherein a first distinct alert path includes the second graphical identity node and the fourth and fifth graphical security alert nodes associated with digital activity performed by the second distinct digital account, and wherein a second distinct alert path includes the sixth through ninth graphical security alert nodes associated with digital activity performed by the first distinct digital account after creation of the second distinct digital account.

Stated another way, in one or more embodiments, the single root actor is associated with a first distinct digital account and at least one graphical security alert node of the plurality of graphical security alert nodes corresponds to a respective security alert indicating that the first distinct digital account created a second distinct digital account. Accordingly, in such an embodiment, a subset of the plurality of graphical alert connection links defines a plurality of diverging alert paths originating from the at least one graphical security alert node, wherein: a first distinct alert path of the plurality of diverging alert paths includes a first subset of the plurality of graphical security alert nodes representing security alerts generated based in part on digital activity performed by the second distinct digital account, and a second distinct alert path of the plurality of diverging alert paths includes a second subset of the plurality of graphical security alert nodes representing security alerts generated based in part on digital activity performed by the first distinct digital account after creation of the second distinct digital account.

User Interface: Multi-Plane Threat Alert Surfacing

Figure 11:
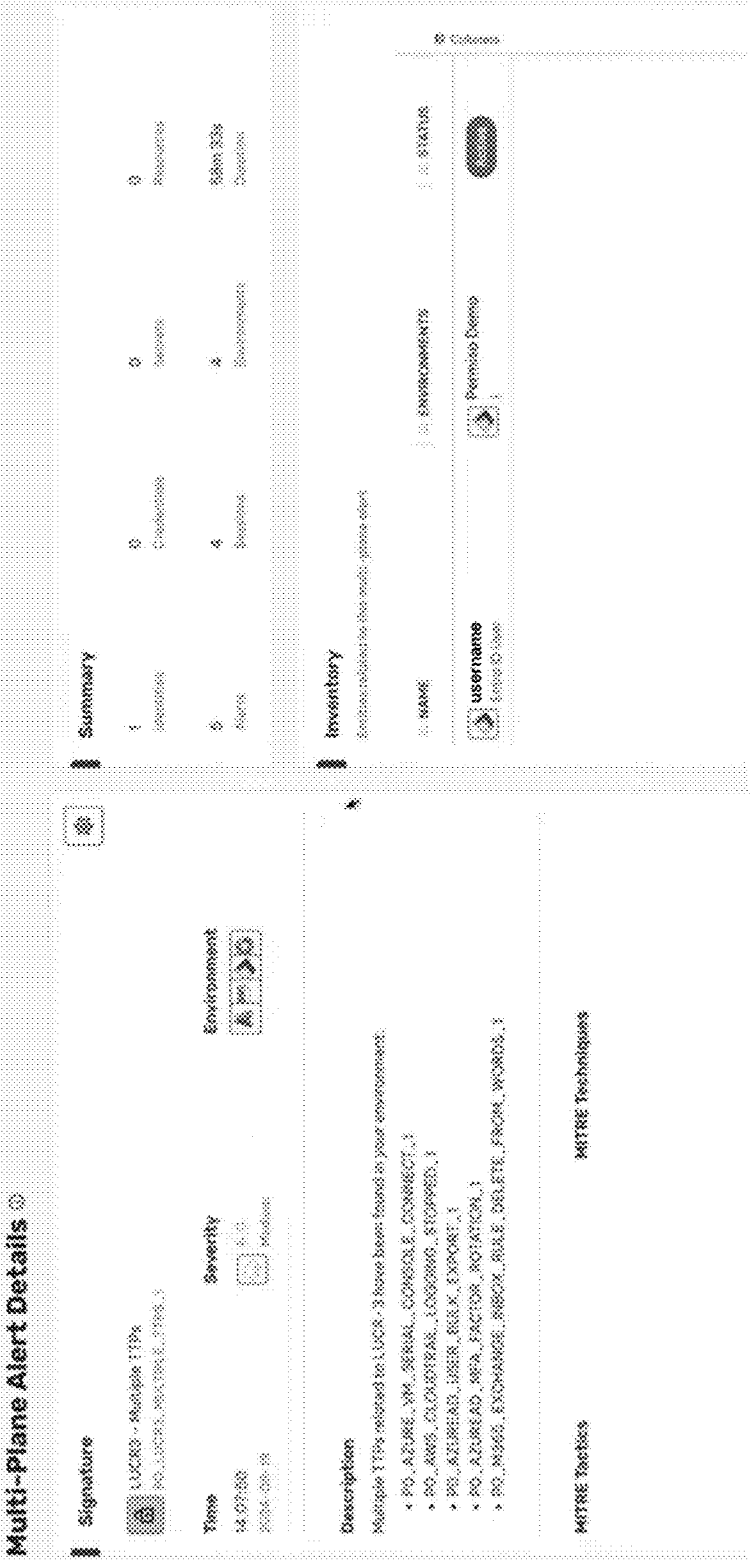
FIG. 11 illustrates an example interface for surfacing multi-plane threat alerts in accordance with one or more embodiments of the present application.

In some embodiments, the cybersecurity intelligence user interface may include a multi-plane threat alert overview window or region that may function to display one or more properties of a user-selected multi-plane threat alert, as shown by way of example in FIG. 11. In some embodiments, a user may select (e.g., via a GUI control) a distinct multi-plane threat alert to be viewed in the multi-plane threat alert overview window. In one or more embodiments, the multi-plane threat alert overview window may include a signature sub-region, a summary sub-region, and an inventory sub-region, as illustrated by way of example in FIG. 11.

In some embodiments, the signature sub-region of the multi-plane threat alert overview window may function to display, via one or more GUI elements, a signature (e.g., an ID or name) of the selected multi-plane threat alert, a timestamp of the selected multi-plane threat alert, a severity score of the selected multi-plane threat alert, the environment(s) of the selected multi-plane threat alert, MITRE Tactics and/or MITRE Techniques associated with the selected multi-plane threat alert, a list of the correlated threat alerts of the multi-plane threat alert, and/or any other suitable attribute or property of the selected multi-plane threat alert.

In some embodiments, the summary sub-region of the multi-plane threat alert overview window may function to display, via one or more GUI elements, a count of identities (e.g., threat actor identities) associated with the selected multi-plane threat alert, a count of credentials and/or secrets associated with the selected multi-plane threat alert, a count of resources associated with the selected multi-plane threat alert, a count of threat alerts (e.g., correlated threat alerts) associated with the selected multi-plane threat alert, a count of sessions associated with the selected multi-plane threat alert, a count of environments associated with the selected multi-plane threat alert, and a duration (e.g., a timespan) of the selected multi-plane threat alert.

In one or more embodiments, the inventory sub-region of the multi-plane threat alert overview window may function to display, via one or more GUI elements, a list of entities or actors (e.g., threat actors) associated with the selected multi-plane threat alert. In some such embodiments, the list of entities or actors may be displayed in a table format, where each row corresponds to a distinct entity/actor and each column corresponds to an attribute or property of an entity/actor. For instance, as shown in FIG. 11, the list of entities/actors may include a column for the name of an entity/actor (e.g., a username), a column for the environments in which the entity/actor operated, and a status of the entity/actor (e.g., active or inactive).

Figure 12:
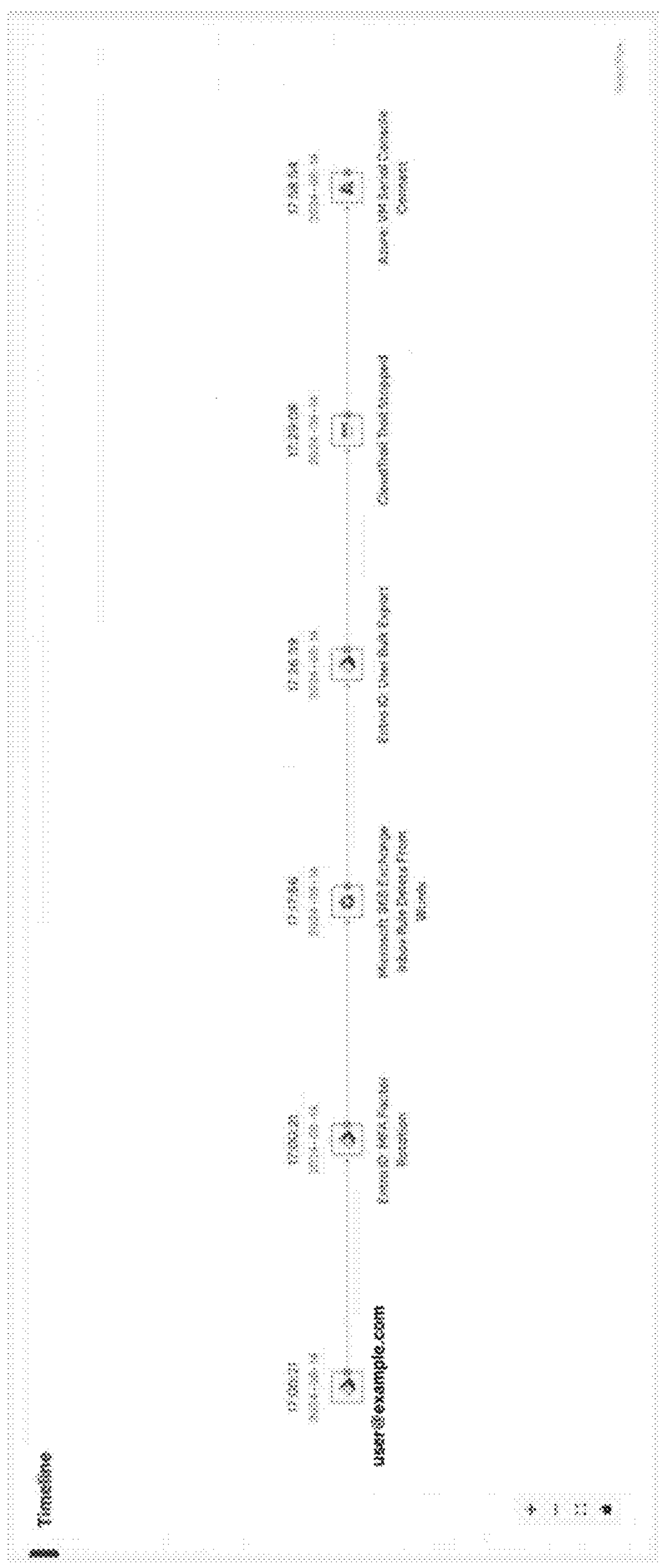
FIG. 12 illustrates an example interface for surfacing a multi-plane threat alert timeline in accordance with one or more embodiments of the present application.

In some embodiments, the cybersecurity intelligence user interface may include a multi-plane threat alert timeline window or region that may function to display or surface a timeline of correlated threat alerts associated with a user-selected multi-plane threat alert, as shown by way of example in FIG. 12. In such embodiments, a user of the cybersecurity intelligence user interface may select, via one or more user interface controls, a distinct multi-plane threat alert to view a timeline of that multi-plane threat alert. In such embodiments, the timeline window may display each correlated threat alert in a timeline, where each correlated threat alert may be represented visually by a node. In such embodiments, each threat alert node may be linked to the threat alert that follows it chronologically by a graphical edge, such that the timeline may consist of threat alert nodes linked by edges to indicate a chronology of the correlated threat alerts of the selected multi-plane threat alert.

In some embodiments, each threat alert node in the timeline may include a graphical element (e.g., an icon) that may visually indicate an environment of the associated threat alert. In one or more embodiments, each threat alert node may additionally include a timestamp label that may function to display a timestamp of the associated threat alert. Additionally, in some embodiments, each threat alert node in the timeline may include a label that may function to display a name of the associated threat alert and/or any other property of the associated threat alert (e.g., an identity of the threat actor of the associated threat alert).

At least one technical benefit of the multi-plane alert explainability artifact includes explicitly encoding user-creation relationships and identity lineage within a structured alert graph, thereby enabling the system to represent and distinguish malicious activity performed by a first distinct digital account from malicious activity performed by a second distinct digital account created by the first distinct digital account. By anchoring diverging alert paths to a security alert corresponding to user creation, the system preserves causal attribution between identities and downstream activity, reduces fragmentation of identity context across independent alert records, and accelerates detection of coordinated multi-identity attack campaigns spanning multiple computing environments.

Additionally, or alternatively, in one or more embodiments, the system or service implementing method 200 may function to display, via a multi-plane graphical user interface, the multi-plane alert explainability artifact in association with the multi-plane security alert. The multi-plane graphical user interface, in some embodiments, may further include a total number of computing environments of the plurality of distinct computing environments involved in the multi-plane security alert, a total number of distinct digital identities involved in the multi-plane security alert, a total number of computing resources within the plurality of distinct computing environments that are involved in the multi-plane security alert, a total number of access credentials involved in the multi-plane security alert, and a total number of non-human identities involved in the multi-plane security alert.

2.40 Transmitting One or More Threat Notifications Based on the One or More Threat Alerts S240, which includes transmitting one or more threat notifications based on the one or more threat alerts, may function to transmit or surface one or more threat notifications associated with one or more threat alerts to one or more entities and/or endpoints. The term "threat notification," as generally used herein, may refer to an automated electronic communication or message generated by S240 to inform one or more entities of a potential cybersecurity risk, suspicious activity, and/or potential threat. In one or more embodiments, each threat notification may be associated with a distinct threat alert (or a distinct multi-plane alert) and may include the corresponding threat alert summary for the distinct threat alert.

In one or more embodiments, S240 may function to transmit the one or more threat notifications via one or more electronic communication platforms, services, or channels including, but not limited to, email, SMS, third party messaging platforms, webhooks, and/or the like. It shall be noted that, in some embodiments, S240 may function to implement multi-channel notification to transmit threat notifications via a variety of communication platforms or services. Additionally, or alternatively, S240 may function to transmit the one or more threat notifications to one or more user devices such as computers, mobile phones, and/or the like. In some embodiments, S240 may function to use multiple mediums or services to transmit the one or more threat notifications to a plurality of user devices.

In one or more embodiments, the one or more threat notifications may include one or more prompts or queries that may request and/or require a response from one or more entities to whom the threat notifications are transmitted. In some such embodiments, S240 may additionally function to receive one or more responses to one or more transmitted threat notifications from one or more entities. In some such embodiments, S240 may function to receive a response to a corresponding transmitted threat notification via the same electronic communication platforms, entities, or channels used to transmit the corresponding threat notification. Additionally, or alternatively, in some embodiments, S240 may function to receive a response to a corresponding transmitted threat notification via any other suitable electronic communication platform, entity, and/or channel.

In some embodiments, S240 may function to prioritize the one or more threat notifications, such that entities receiving the one or more threat notifications may identify the relative severity of threats associated with the one or more threat notifications. In some embodiments, S240 may function to automatically escalate an alert if, in a predefined timespan, no response is received to a corresponding threat notification, and/or if, in a predefined timespan, no action is taken to remediate a threat alert after a corresponding threat notification has been transmitted.

Additionally, or alternatively, in one or more embodiments, the system or service implementing method 200 may function to generate a plurality of distinct security alerts for a respective session object. In such an embodiment, in response to generating the plurality of distinct security alerts, the system or service implementing method 200 may function to electronically transmit, in real-time or near real-time, the plurality of distinct security alerts to a target subscribing entity using a bi-directional messaging service.

Additionally, or alternatively, in one or more embodiments, the system or service implementing method 200 may function to generate a plurality of distinct security alerts for a respective session object. In such an embodiment, in response to generating the plurality of distinct security alerts, the system or service implementing method 200 may function to electronically transmit, in real-time or near real-time, the plurality of distinct security alerts to a target application programming interface endpoint specified by the subscribing entity.

3. Computer-Implemented Method and Computer Program Product

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The systems and methods of the preferred embodiments may additionally, or alternatively, be implemented on an integrated software application and/or software architecture such as those offered by Permiso Security Inc.

Although omitted for conciseness, the preferred embodiments include every combination and permutation of the implementations of the systems and methods described herein in real-time or near real-time, asynchronously (e.g., sequentially), concurrently (e.g., in parallel), or in any other suitable order by and/or using one or more instances of the systems, elements, and/or entities described herein. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the application without departing from the scope of the various described embodiments.

We claim:

1. A computer-implemented method comprising:

at an identity-based threat detection and response service implemented by a network of distributed computers:

obtaining, by the network of distributed computers, digital event data associated with a subscribing entity;

generating, based on assessing the digital event data, a session object that includes a plurality of digital events performed by a digital account within a computing environment of the subscribing entity;

generating, in real-time or near real-time, a plurality of suspicious event signal objects in response to assessing the plurality of digital events included in the session object against a corpus of suspicious event detection instructions, wherein:

a total number of the plurality of suspicious event signal objects generated by the identity-based threat detection and response service is less than a total number of the plurality of digital events included in the session object;

generating, in real-time or near real-time, one or more security alerts for the session object based on assessing the plurality of suspicious event signal objects against predetermined alerting criteria;

after generating the one or more security alerts for the session object:

displaying a target security alert of the one or more security alerts on a graphical user interface accessible to the subscribing entity;

receiving an input from the subscribing entity selecting an alert explanation button displayed on the graphical user interface; and in response to receiving the input from the subscribing entity selecting the alert explanation button:

instantiating an alert explanation popover on the graphical user interface;

automatically creating an alert explanation prompt that includes the plurality of suspicious event signal objects and the target security alert;

generating, using a large language model, an alert explanation for the target security alert based on providing the alert explanation prompt as input to the large language model; and displaying, by the alert explanation popover, the alert explanation generated for the target security alert.

2. The computer-implemented method according to claim 1, further comprising:

while the large language model is generating the alert explanation for the target security alert:

streaming the alert explanation to the identity-based threat detection and response service; and updating, in real-time, the alert explanation displayed in the alert explanation popover as new portions of the alert explanation are received.

3. The computer-implemented method according to claim 1, wherein:

the alert explanation popover includes a first distinct region and a second distinct region, the first distinct region of the alert explanation popover includes:

an identifier of the computing environment where the plurality of digital events included in the session object occurred, a count of the plurality of suspicious event signal objects generated for the session object, an identifier of the digital account that performed the plurality of digital events included in the session object, and an identifier of a computing resource within the computing environment that is specified by the target security alert, and the second distinct region of the alert explanation popover includes the alert explanation generated for the target security alert, wherein the alert explanation generated for the target security alert includes:

a first set of text strings that explains, in natural language, how a threat actor accessed the computing environment of the subscribing entity, a second set of text strings that explains, in natural language, what the threat actor did after accessing the computing environment of the subscribing entity, and a third set of text strings that explains, in natural language, how the plurality of suspicious event signal objects contributed to the generation of the target security alert.

4. The computer-implemented method according to claim 1, wherein the graphical user interface displaying the target security alert includes:

a first region that displays:

a time and a date that the identity-based threat detection and response service generated the target security alert, an alert title specified within the target security alert, an alert severity score determined for the target security alert, an identifier of the computing environment where the plurality of digital events included in the session object occurred, a natural language description explaining the target security alert, and one or more recommended threat mitigation actions to mitigate a security threat associated with the target security alert, a second region that displays:

an identifier of the digital account that performed the plurality of digital events included in the session object, an indication of whether the digital account is active or inactive within the computing environment of the subscribing entity, a blast radius that specifies a privilege level associated with the digital account, and access data associated with the plurality of digital events, and a third region that displays:

an indication of one or more suspicious event signal objects of the plurality of suspicious event signal objects that contributed to the generation of the target security alert, and one or more computing resources of the computing environment referenced in the target security alert.

5. The computer-implemented method according to claim 4, wherein:

the predetermined alerting criteria includes a plurality of distinct alert rules, each of the plurality of distinct alert rules includes:

a condition for generating a respective security alert, and an alert explainability template explaining the respective security alert, at least a subset of the plurality of suspicious event signal objects satisfies the condition of a respective alert rule of the plurality of distinct alert rules, and the natural language description explaining the target security alert is automatically generated by the identity-based threat detection and response service by inserting at least one target piece of data included in the subset of the plurality of suspicious event signal objects into the alert explainability template of the respective alert rule.

6. The computer-implemented method according to claim 1, wherein:

each suspicious event signal object of the plurality of suspicious event signal objects is generated based on a respective digital event of the plurality of digital events included in the session object satisfying at least one suspicious event detection instruction of the corpus of suspicious event detection instructions, and the computer-implemented method further includes:

determining, by the identity-based threat detection and response service, a signal impact score and a signal suspicion score for a respective suspicious event signal object of the plurality of suspicious event signal objects, wherein:

the signal impact score determined for the respective suspicious event signal object specifies a first distinct numerical value representing a degree to which the respective digital event corresponding to the respective suspicious event signal object changes an operating state of the computing environment of the subscribing entity, and the signal suspicion score determined for the respective suspicious event signal object specifies a second distinct numerical value representing a degree to which the respective digital event corresponding to the respective suspicious event signal object is suspicious;

attributing, in real-time or near real-time, the signal impact score and the signal suspicion score determined for the respective suspicious event signal object to the respective suspicious event signal object; and displaying, on a session details graphical user interface, the signal impact score and the signal suspicion score determined for the respective suspicious event signal object in association with the session object.

7. The computer-implemented method according to claim 1, further comprising:

determining, by the identity-based threat detection and response service, at least one of a signal impact score and a signal suspicion score for each suspicious event signal object of the plurality of suspicious event signal objects;

determining, by the identity-based threat detection and response service, a session impact score for the session object based on identifying a maximum signal impact score from a plurality of signal impact scores collectively corresponding to the plurality of suspicious event signal objects, wherein the session impact score determined for the session object specifies a first distinct numerical value representing a degree to which the plurality of digital events included in the session object changes an operating state of the computing environment of the subscribing entity;

determining, by the identity-based threat detection and response service, a session suspicion score for the session object based on identifying a maximum signal suspicion score from a plurality of signal suspicion scores collectively corresponding to the plurality of suspicious event signal objects, wherein the session suspicion score determined for the session object specifies a second distinct numerical value representing a degree to which the plurality of digital events included in the session object are suspicious; and displaying, on a session details graphical user interface, the session impact score and the session suspicion score determined for the session object in association with the session object.

8. The computer-implemented method according to claim 1, further comprising:

generating a machine learning-informed suspicious event signal object for the session object based in part on the plurality of digital events included in the session object, wherein generating the machine learning-informed suspicious event signal object includes:

providing the plurality of digital events included in the session object as input to one or more machine learning models;

detecting, by the one or more machine learning models, that at least one access attribute associated with at least one digital event of the plurality of digital events has not been previously observed for the digital account within a predefined historical time period; and generating, in real-time or near real-time, the machine learning-informed suspicious event signal object that includes the at least one access attribute in response to detecting that the at least one access attribute has not been previously associated with the digital account within the predefined historical time period.

9. The computer-implemented method according to claim 1, wherein:

in response to assessing the plurality of digital events included in the session object against the corpus of suspicious event detection instructions:

generating a first suspicious event signal object of the plurality of suspicious event signal objects in response to detecting that a first distinct digital event of the plurality of digital events included in the session object satisfies a first suspicious event detection instruction included in the corpus of suspicious event detection instructions, generating a second suspicious event signal object of the plurality of suspicious event signal objects in response to detecting that a second distinct digital event of the plurality of digital events included in the session object satisfies a second suspicious event detection instruction included in the corpus of suspicious event detection instructions, generating a third suspicious event signal object of the plurality of suspicious event signal objects in response to detecting that the second distinct digital event of the plurality of digital events included in the session object satisfies a third suspicious event detection instruction included in the corpus of suspicious event detection instructions, and foregoing generating any suspicious event signal objects for a third distinct digital event included in the session object in response to detecting that the third distinct digital event fails to satisfy any suspicious event detection instruction included in the corpus of suspicious event detection instructions.

10. The computer-implemented method according to claim 1, further comprising:

displaying, on a threat hunting graphical user interface, a session object data table and an interactive heat map, wherein:

the session object data table includes a plurality of session objects generated for the subscribing entity during a target time span, the interactive heat map includes:

a first axis corresponding to discrete session impact score values, a second axis corresponding to discrete session suspicion score values, and a plurality of selectable cells arranged in a two-dimensional grid, wherein each cell of the plurality of selectable cells corresponds to a unique combination of (i) a respective session impact score value of the discrete session impact score values and (ii) a respective session suspicion score value of the discrete session suspicion score values;

receiving a continuous input sequence from the subscribing entity, wherein the subscribing entity:

selects, using a mouse cursor, a first selectable cell of the plurality of selectable cells included in the interactive heat map;

moves the mouse cursor across the two-dimensional grid while the first selectable cell is selected; and releases the mouse cursor at a second selectable cell of the plurality of selectable cells included in the interactive heat map;

displaying, in response to receiving the continuous input sequence, a rectangular boundary on the interactive heat map extending between the first selectable cell and the second selectable cell, wherein the first selectable cell and the second selectable cell define opposing corners of the rectangular boundary; and in response to receiving the continuous input sequence, updating, in real-time or near real-time, the session object data table to display a reduced subset of the plurality of session objects, wherein each session object included in the reduced subset has a session impact score and a session suspicion score corresponding to a respective selectable cell located within the rectangular boundary.

11. The computer-implemented method according to claim 1, wherein:

generating the one or more security alerts for the session object includes generating a plurality of distinct security alerts for the session object, and the computer-implemented method further includes:

in response to generating the plurality of distinct security alerts, electronically transmitting, in real-time or near real-time, the plurality of distinct security alerts to the subscribing entity using a bi-directional messaging service.

12. The computer-implemented method according to claim 1, wherein:

generating the one or more security alerts for the session object includes generating a plurality of distinct security alerts for the session object, and the computer-implemented method further includes:

in response to generating the plurality of distinct security alerts, electronically transmitting, in real-time or near real-time, the plurality of distinct security alerts to a target application programming interface endpoint specified by the subscribing entity.

13. The computer-implemented method according to claim 1, further comprising:

in response to generating the session object:

providing the session object to an actor-type machine learning classification model;

computing, using the actor-type machine learning classification model, an actor-type classification inference comprising a probability of a machine actor using the digital account to perform the plurality of digital events included in the session object; and assessing, in real-time or near real-time, a security threat of the session object using one of:

a first set of suspicious event detection instructions of the corpus of suspicious event detections instructions operably configured to assess the plurality of digital events included in the session object as machine activity when the probability satisfies a predetermined threshold, and a second set of suspicious event detection instructions of the corpus of suspicious event detections instructions operably configured to assess the plurality of digital events included in the session object as human activity when the probability fails to satisfy the predetermined threshold.

14. The computer-implemented method according to claim 1, further comprising:

generating a plurality of additional session objects in response to obtaining additional digital event data associated with the subscribing entity;

generating, for each additional session object of the plurality of additional session objects, a plurality of distinct security alerts;

providing, as input to a multi-plane alert generation module, (i) the plurality of distinct security alerts generated for each of the plurality of additional session objects and (ii) the one or more security alerts generated for the session object; and in response to the multi-plane alert generation module assessing the plurality of distinct security alerts generated for each of the plurality of additional session objects and the one or more security alerts generated for the session object, generating, in real-time or near real-time, a multi-plane security alert that specifies a multi-stage attack performed across a plurality of distinct computing environments of the subscribing entity.

15. The computer-implemented method according to claim 14, wherein:

the multi-plane alert generation module generates the multi-plane security alert in response to detecting that:

the one or more security alerts generated for the session object and the plurality of distinct security alerts generated for each of the plurality of additional session objects are attributable to a single root actor, and the one or more security alerts generated for the session object and the plurality of distinct security alerts generated for each of the plurality of additional session objects occurred within a predetermined time span.

16. The computer-implemented method according to claim 14, wherein:

the predetermined alerting criteria specifies a respective multi-plane alert instruction, the respective multi-plane alert instruction specifies generating a subject multi-plane security alert when the identity-based threat detection and response service generates, within a predetermined time span, a combination of security alerts associated with a subject subscribing entity that collectively correspond to a target combination of security alert types, and the respective multi-plane alert instruction automatically generates the multi-plane security alert in response to detecting that at least a subset of (a) the plurality of distinct security alerts generated for each of the plurality of additional session objects and (b) the one or more security alerts generated for the session object collectively correspond to the target combination of security alert types.

17. The computer-implemented method according to claim 14, wherein:

the multi-stage attack performed across the plurality of distinct computing environments of the subscribing entity is attributable to a single root actor, the computer-implemented method further includes generating a multi-plane alert explainability artifact that corresponds to the multi-plane security alert, wherein the multi-plane alert explainability artifact includes:

a graphical identity node corresponding to the single root actor, a plurality of graphical security alert nodes corresponding to the plurality of distinct security alerts generated for each of the plurality of additional session objects and the one or more security alerts generated for the session object, and a plurality of graphical alert connection links that directly or indirectly couple the plurality of graphical security alert nodes to the graphical identity node to form a connected alert sequence representing the multi-stage attack performed across the plurality of distinct computing environments of the subscribing entity.

18. The computer-implemented method according to claim 17, wherein:

the single root actor is associated with a first distinct digital account, at least one graphical security alert node of the plurality of graphical security alert nodes corresponds to a respective security alert indicating that the first distinct digital account created a second distinct digital account, and a subset of the plurality of graphical alert connection links defines a plurality of diverging alert paths originating from the at least one graphical security alert node, wherein:

a first distinct alert path of the plurality of diverging alert paths includes a first subset of the plurality of graphical security alert nodes representing security alerts generated based in part on digital activity performed by the second distinct digital account, and a second distinct alert path of the plurality of diverging alert paths includes a second subset of the plurality of graphical security alert nodes representing security alerts generated based in part on digital activity performed by the first distinct digital account after creation of the second distinct digital account.

19. The computer-implemented method according to claim 17, further comprising:

displaying, via a multi-plane alert graphical user interface, the multi-plane alert explainability artifact in association with the multi-plane security alert, wherein the multi-plane alert graphical user interface further includes a multi-plane alert summary region comprising:

a total number of computing environments of the plurality of distinct computing environments involved in the multi-plane security alert, a total number of distinct digital identities involved in the multi-plane security alert, a total number of computing resources within the plurality of distinct computing environments that are involved in the multi-plane security alert, a total number of access credentials involved in the multi-plane security alert, and a total number of non-human identities involved in the multi-plane security alert.

20. The computer-implemented method according to claim 1, further comprising:

generating a plurality of additional session objects in response to obtaining additional digital event data associated with the subscribing entity;

generating, for each additional session object of the plurality of additional session objects, a plurality of distinct security alerts;

providing, as input to a multi-plane alert generation module, the plurality of distinct security alerts generated for each of the plurality of additional session objects and the one or more security alerts generated for the session object;

in response to the multi-plane alert generation module assessing the plurality of distinct security alerts generated for each of the plurality of additional session objects and the one or more security alerts generated for the session object, generating, in real-time or near real-time, a multi-plane security alert that aggregates at least a subset of the plurality of distinct security alerts generated for each of the plurality of additional session objects and the one or more security alerts generated for the session object into a single security alert representing a cross-environment attack that occurred or is occurring across a plurality of distinct computing environments of the subscribing entity; and transmitting, over a computer network, the multi-plane security alert in real-time or near real-time to the subscribing entity.

21. A computer-implemented system comprising:

one or more processors;

a memory;

a computer-readable medium operably coupled to the one or more processors, the computer-readable medium having computer-readable instructions stored thereon that, when executed by the one or more processors, cause a computing device to perform operations comprising:

obtaining digital event data associated with a subscribing entity;

generating, based on assessing the digital event data, a session object that includes a plurality of digital events performed by a digital account within a computing environment of the subscribing entity;

generating, in real-time or near real-time, a plurality of suspicious event signal objects in response to assessing the plurality of digital events included in the session object against a corpus of suspicious event detection instructions, wherein:

a total number of the plurality of suspicious event signal objects is less than a total number of the plurality of digital events included in the session object;

generating, in real-time or near real-time, one or more security alerts for the session object based on assessing the plurality of suspicious event signal objects against predetermined alerting criteria;

after generating the one or more security alerts for the session object:

displaying a target security alert of the one or more security alerts on a graphical user interface accessible to the subscribing entity;

receiving an input from the subscribing entity selecting an alert explanation button displayed on the graphical user interface; and in response to receiving the input from the subscribing entity selecting the alert explanation button:

instantiating an alert explanation popover on the graphical user interface;

automatically creating an alert explanation prompt that includes the plurality of suspicious event signal objects and the target security alert;

generating, using a machine learning model, an alert explanation for the target security alert based on providing the alert explanation prompt as input to the machine learning model; and displaying, by the alert explanation popover, the alert explanation generated for the target security alert.

* * * * *